(12) United States Patent
Brinkerhoff et al.

(10) Patent No.: US 12,218,328 B1
(45) Date of Patent: Feb. 4, 2025

(54) SYSTEMS AND METHODS FOR THERMAL MANAGEMENT OF AN ENERGY STORAGE SYSTEM

(71) Applicant: Element Energy, Inc., Menlo Park, CA (US)

(72) Inventors: Nathan Thomas Brinkerhoff, Santa Clara, CA (US); Corrado Cammi, Mountain View, CA (US); Arnaud Devie, Menlo Park, CA (US); Rainer Johannes Fasching, Mill Valley, CA (US); Seth Marshall Kahn, Sonoma, CA (US)

(73) Assignee: Element Energy, Inc., Menlo Park, CA (US)

( * ) Notice: Subject to any disclaimer, the term of this patent is extended or adjusted under 35 U.S.C. 154(b) by 0 days.

(21) Appl. No.: 18/611,645

(22) Filed: Mar. 20, 2024

(51) Int. Cl.
*H01M 10/633* (2014.01)
*H01M 10/44* (2006.01)
*H01M 10/48* (2006.01)
*H01M 10/613* (2014.01)
*H01M 10/615* (2014.01)

(52) U.S. Cl.
CPC ........ *H01M 10/633* (2015.04); *H01M 10/443* (2013.01); *H01M 10/486* (2013.01); *H01M 10/613* (2015.04); *H01M 10/615* (2015.04)

(58) Field of Classification Search
CPC ............. H01M 10/633; H01M 10/443; H01M 10/486; H01M 10/613; H01M 10/615
See application file for complete search history.

(56) References Cited

U.S. PATENT DOCUMENTS

| | | | |
|---|---|---|---|
| 10,992,149 B1* | 4/2021 | Kahn | H01M 10/482 |
| 11,258,279 B1 | 2/2022 | Kahn et al. | |
| 11,269,012 B1 | 3/2022 | Kahn et al. | |
| 11,664,670 B1 | 5/2023 | Devie et al. | |
| 11,699,909 B1 | 7/2023 | Kahn et al. | |
| 11,735,934 B2 | 8/2023 | Kahn et al. | |
| 11,791,642 B2 | 10/2023 | Kahn et al. | |
| 11,831,192 B2 | 11/2023 | Kahn et al. | |
| 2014/0121869 A1* | 5/2014 | Lee | H01M 10/625 701/22 |
| 2017/0062885 A1 | 3/2017 | Cutright et al. | |
| 2017/0232864 A1* | 8/2017 | Kim | H01M 10/425 307/10.7 |
| 2018/0304765 A1* | 10/2018 | Newman | B60L 58/26 |
| 2022/0115879 A1* | 4/2022 | Kahn | H02J 7/0036 |
| 2022/0140626 A1* | 5/2022 | Kahn | H02J 7/0063 320/135 |
| 2023/0011716 A1* | 1/2023 | Kahn | G01R 31/385 |
| 2023/0025900 A1 | 1/2023 | Kahn et al. | |
| 2023/0253803 A1* | 8/2023 | Kahn | H02J 7/0063 320/126 |
| 2024/0014674 A1 | 1/2024 | Kahn et al. | |
| 2024/0063646 A1 | 2/2024 | Devie et al. | |
| 2024/0088700 A1 | 3/2024 | Kahn et al. | |

* cited by examiner

*Primary Examiner* — Muhammad S Siddiquee
(74) *Attorney, Agent, or Firm* — PdZ Patent Law, PLLC

(57) ABSTRACT

A method for thermal management performed by a controller of an energy storage system, where the energy storage system includes at least a first battery module, a second battery module, a first battery management system (BMS) node, and a second BMS node. The first BMS node is configured to control operation of the first battery module, and the second BMS node is configured to control operation of the second battery module. The method includes (a) determining a first temperature profile difference representing a difference between an actual temperature profile of the first battery module and a desired temperature profile of the first battery module, (b) determining a first operation adjustment representing a desired change in operation of the first battery module for decreasing the first temperature profile difference, and (c) controlling the first BMS node to change operation of the first battery module according to the first operation adjustment.

30 Claims, 29 Drawing Sheets

SYSTEMS AND METHODS FOR THERMAL MANAGEMENT OF AN ENERGY STORAGE SYSTEM

BACKGROUND

A battery module is a device including one or more electrochemical cells that are electrically coupled together. One popular electrochemical cell is the Lithium-ion (Li-ion) electrochemical cell. Examples of Li-ion electrochemical cells include Lithium Cobalt Oxide (LCO) electrochemical cells, Lithium Manganese Oxide (LMO) electrochemical cells, Lithium Nickel Manganese Cobalt Oxide (NMC) electrochemical cells, Lithium Iron Phosphate (LFP) electrochemical cells, Lithium Nickel Cobalt Aluminum Oxide (NCA) electrochemical cells, and Lithium Titanate (LTO) electrochemical cells.

Temperature of battery modules typically must be maintained within a particular temperature range for reliable and safe battery module operation. Accordingly, energy storage systems including battery modules may include provisions for thermal management.

SUMMARY

A method for thermal management performed by a controller of an energy storage system, where (i) the energy storage system includes at least a first battery module, a second battery module, a first battery management system (BMS) node, and a second BMS node, (ii) the first BMS node is configured to control operation of the first battery module, and (iii) the second BMS node is configured to control operation of the second battery module. The method includes (a) determining a first temperature profile difference representing a difference between an actual temperature profile of the first battery module and a desired temperature profile of the first battery module, (b) determining a first operation adjustment representing a desired change in operation of the first battery module for decreasing the first temperature profile difference, and (c) controlling the first BMS node to change operation of the first battery module according to the first operation adjustment.

A method for thermal management performed by a controller of an energy storage system, where (i) the energy storage system includes at least a first battery module, a second battery module, a first battery management system (BMS) node, and a second BMS node, (ii) the first BMS node is configured to control operation of the first battery module, (iii) the second BMS node is configured to control operation of the second battery module, and (iv) the first battery module is thermally coupled with the second battery module. The method includes (a) determining a first temperature profile difference representing a difference between an actual temperature profile of the first battery module and a desired temperature profile of the first battery module, (b) determining an operation adjustment representing a desired change in operation of the second battery module for decreasing the first temperature profile difference, and (c) controlling the second BMS node to change operation of the second battery module according to the operation adjustment.

A method for thermal management performed by a controller of an energy storage system, wherein (i) the energy storage system includes at least a first battery module, a second battery module, a first battery management system (BMS) node, and a second BMS node, (ii) the first BMS node is configured to control operation of the first battery module, (iii) the second BMS node is configured to control operation of the second battery module, and (iv) the first battery module is electrically coupled in parallel with the second battery module. The method includes (a) determining that a temperature of the first battery module is below a threshold value, and (b) in response to determining that the temperature of the first battery module is below the threshold value, controlling at least the first BMS node and the second BMS node to transfer energy between the second battery module and the first battery module to increase temperature of at least the first battery module.

A method for thermal management performed by a controller of an energy storage system, where the energy storage system includes a least a first battery module and a second battery module. The method includes (i) determining that the first battery module is operating in a bypass operating mode, (ii) in response to determining that the first battery module is operating in the bypass operating mode, controlling temperature of an environment of the first battery module at least partially based on a desired temperature profile of the first battery module, and (iii) performing at least one of (a) an in-situ diagnostic test on the first battery module and (b) thermal soaking of the first battery module.

A method for thermal management performed by a controller of an energy storage system, where (i) the energy storage system includes a plurality of battery modules and a respective battery management system (BMS) node for each battery module, and (ii) each BMS node is configured to control operation of its respective battery module. The method includes (a) determining, for each battery module, whether the battery module is operating in a power transfer operating mode or in a bypass operating mode and (b) determining, for each battery module, a respective temperature control method for the battery module at least partially based on whether the battery module is operating in the power transfer operating mode or in the bypass operating mode.

A method for thermal management performed by a controller of an energy storage system, where (i) the energy storage system includes a plurality of battery modules and a respective battery management system (BMS) node for each battery module, and (ii) each BMS node is configured to control operation of its respective battery module. The method includes (a) determining, for each battery module, a respective magnitude of current flowing through the battery module and (b) determining, for each battery module, a respective temperature control method for the battery module at least partially based on the respective magnitude of current flowing through the battery module.

DETAILED DESCRIPTION OF THE EMBODIMENTS

Figure 1:
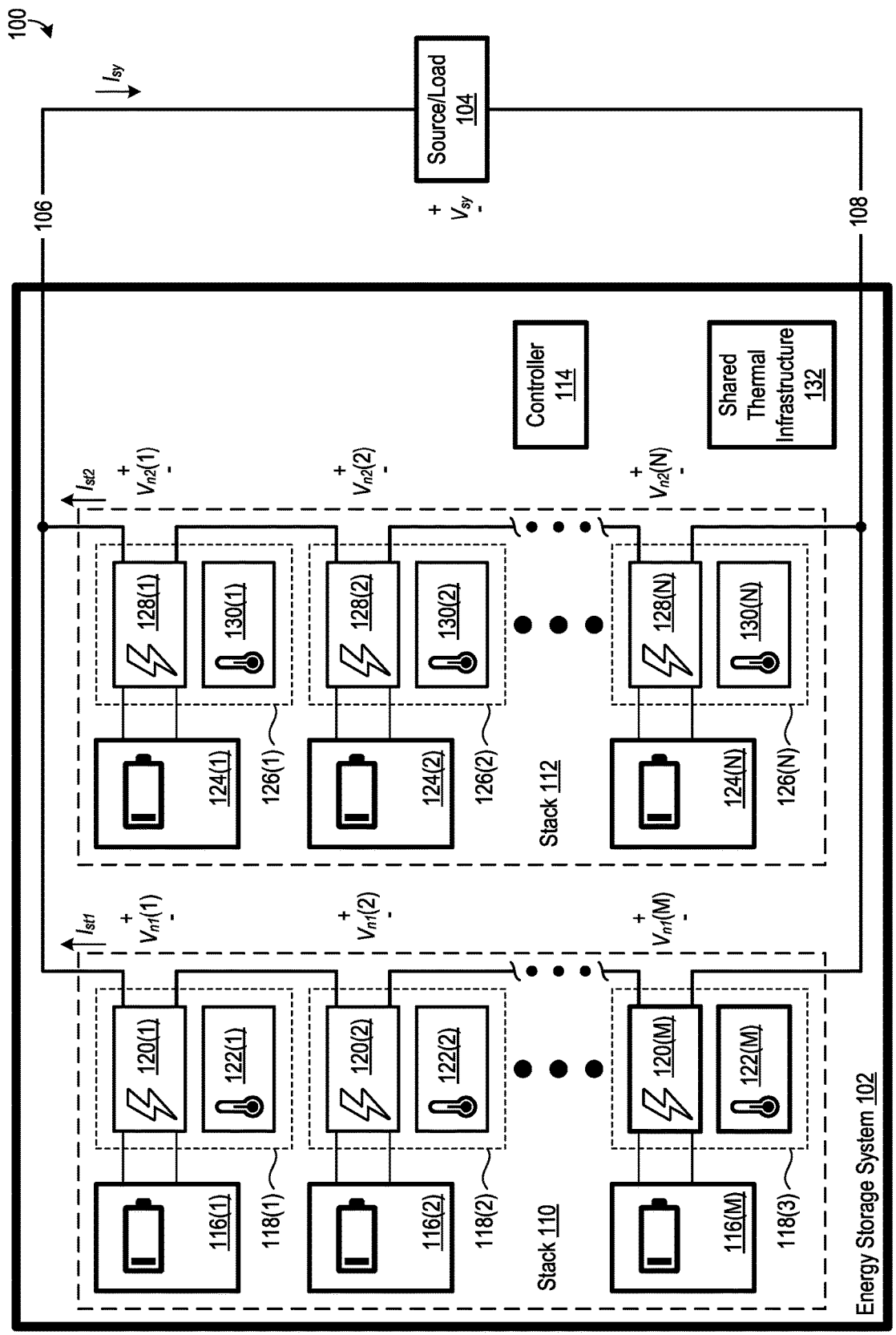
FIG. 1 is a schematic diagram of an electrical environment including an energy storage system including a system for thermal management, according to an embodiment.

Disclosed herein are new systems and methods for thermal management of an energy storage system which significantly advance the state of the art of energy storage system thermal management. Certain embodiments enable individual control of battery module temperatures, or individual control of temperatures of groups of battery modules, in an energy storage system including a plurality of battery modules, thereby enabling higher granularity in battery module temperature control than can be realized using conventional approaches. For example, some embodiments enable battery module temperature balancing using variable rates of cooling (or heating) from one battery module to another. Additionally, particular embodiments enable variable rate of cooling (or heating) of a battery module during a charge or discharge cycle of the battery module based at least in part on an anticipated heat generation rate of the battery module. Furthermore, certain embodiments enable variable rates of cooling (or heating) from one battery module to another for battery module characterization. Particular embodiments enable individual control of each battery module's temperature, for example, by controlling operation of a respective battery management system (BMS) node associated with each battery module. Furthermore, some embodiments enable individual control of a given battery module's temperature by controlling operation of respective BMS nodes of one or more other battery modules that are thermally coupled with the given battery module.

Additionally, some embodiments are configured to individually control temperature of each battery module in a manner which achieves a respective predetermined temperature profile for the battery module, such as a temperature profile that helps maximize battery module lifetime, safety, and/or performance. For example, temperature of a battery module having a high state of health (SOH) may be controlled to achieve a predetermined temperature profile of the battery module that is appropriate for a high SOH, while temperature of a battery module having a low SOH may be controlled to achieve a predetermined temperature profile that is appropriate for a low SOH. Certain embodiments help achieve a desired temperature profile of a battery module, for example, by periodically comparing an actual temperature profile of the battery module to a desired temperature profile of the battery module, determining a difference between the actual temperature profile and the desired temperature profile, and controlling one or more BMS nodes to adjust a temperature control factor profile of the battery module to reduce the difference between the actual temperature profile and the desired temperature profile.

Furthermore, particular embodiments are configured to individually control temperature of one or more battery modules in a manner which achieves respective predetermined diagnostic temperature profiles of the battery modules, such as to enable performance of in-situ diagnostic procedures on the one or more battery modules while other battery modules of the energy storage system operate normally. For example, in some embodiments, temperature of a first battery module may be controlled so that the first battery module operates at a temperature required for leakage current measurement, thereby enabling in-situ measurement of the first battery module's leakage current while temperature of a second battery module that is not undergoing a diagnostic procedure is controlled to achieve a predetermined temperature profile that promotes battery module lifetime, battery module safety, and/or battery module performance. As another example, in particular embodiments, temperature of a first battery module is intentionally varied for diagnostic purposes, such as to measure open circuit voltage as a function of temperature of the battery module, while temperature of a second battery module that is not undergoing a diagnostic procedure is controlled to achieve a predetermined temperature profile that promotes battery module lifetime, battery module safety, and/or battery module performance. Certain embodiments help achieve a diagnostic temperature profile of a battery module, for example, by periodically comparing an actual temperature profile of the battery module to a diagnostic temperature profile of the battery module, determining a difference between the actual temperature profile and the diagnostic temperature profile, and controlling one or more BMS nodes to adjust a temperature control factor profile of the battery module to reduce the difference between the two temperature profiles.

In particular embodiments, a manner in which one or more BMS nodes are controlled to achieve a predetermined temperature profile of the battery module is a function of whether the battery module is operational, e.g., whether the battery module is operating in a power transfer operating mode, a rest operating mode, or in a bypass operating mode. For example, temperature of the battery module may be controlled by varying electrical operation of the battery module when the battery module is operating in a power transfer operating mode, and temperature of the battery module may instead be controlled varying operation of one or more mechanical devices, e.g., fans, pumps, dampers, and/or valves, when the battery module is operating in a rest operating mode or in a bypass operating mode. Additionally, in some embodiments, a manner in which one or more BMS nodes are controlled to achieve a predetermined temperature profile of the battery module is a function of magnitude of current flowing through the battery module. For example, temperature of the battery module may be controlled by varying electrical operation of the battery module when magnitude of current flowing through the battery module is at least a minimum threshold value, and temperature of the battery module may instead be controlled varying operation of one or more mechanical devices, e.g., fans, pumps, dampers, and/or valves, when magnitude of current flowing through the battery module is below the minimum threshold value.

Furthermore, certain embodiments are capable of individually controlling temperature of a battery module even if the battery module is not operating, such as if the battery module is operating in a rest operating mode or in a bypass operating mode. For example, in particular embodiments, temperature of a non-operating battery module is controlled by controlling temperature, flow rate, and/or path of a heat transfer fluid, e.g., air or water, that is thermally coupled with the non-operating battery module. As another example, in some embodiments, temperature of a non-operating battery module is controlled by controlling operation of a nearby operating battery module that is thermally coupled to the non-operating battery module, such by controlling an amount of heat generated by the operating battery module, and/or its respective BMS node, which may be transferred to the non-operating battery module.

Moreover, certain embodiments are configured to maintain a desired battery module temperature range for charging the battery module, such as by transferring electrical energy between two or more battery modules to heat one or more of the battery modules. For example, particular embodiments are configured to warm a cold battery module so that it is within a desired temperature range for charging the battery module by transferring an electric current between the cold battery module and one or more other battery modules, such that flow of the electric current through the cold battery modules generates heat which warms the cold battery module.

FIG. 1 is a schematic diagram of an electrical environment 100 including an energy storage system 102 electrically coupled to a source/load 104 via a first load power bus 106 and a second load power bus 108. Energy storage system 102 includes one embodiment of the new systems for thermal management, as discussed below. Source/load 104 may operate as either an electric power source or an electric load. Source/load 104 provides electric power to energy storage system 102 when source/load 104 operates as an electric power source, and source/load 104 consumes electric power from energy storage system 102 when source/load 104 operates as an electric load. Although source/load 104 is symbolically shown as a single element, source/load 104 could include a plurality of elements, such as a source and a load, a plurality of sources, and/or a plurality of loads. Additionally, source/load 104 may include interface devices, such as DC-to-AC converters, DC-to-DC converters, and/or transformers, configured to electrically couple energy storage system 102 with an energy source and/or an energy sink. In some embodiments, source/load 104 includes one or more of an alternating current (AC) electric power system (e.g., an AC electric power grid), a direct current (DC) electric power system, an electromechanical device, and a photovoltaic device, which are optionally electrically coupled to energy storage system 102 via a DC-to-AC converter of source/load 104, a DC-to-DC converter of source/load 104, and/or a transformer of source/load 104. However, source/load 104 can take other forms without departing from the scope hereof.

Energy storage system 102 includes a first stack 110, a second stack 112, a controller 114, and optional shared thermal infrastructure 132. It is understood, though, that the quantity of stacks included in energy storage system 102 may vary as a design choice. For example, some alternate embodiments of energy storage system 102 include three or more stacks, while other alternate embodiments of energy storage system 102 include only a single stack. First stack 110 includes M battery modules 116 and a respective BMS node 118 for each battery module 116, where M is an integer greater than or equal to one and each BMS node 118 is controlled by controller 114. Accordingly, while FIG. 1 illustrates M being at least three, it is understood that M could alternately be two or one. In this document, specific instances of an item may be referred to by use of a numeral in parentheses (e.g. battery module 116(1)) while numerals without parentheses refer to any such item (e.g. battery modules 116). Each battery module 116 includes one or more electrochemical cells, such as discussed below with respect to FIG. 2. Each battery module 116 optionally includes additional elements, such as one or more devices for measuring battery module temperature, one or more devices for measuring battery module voltage, one or more devices for measuring respective voltage of electrochemical cells or groups of electrochemical cell, one or more devices for measuring battery module current, etc. Each BMS node 118 includes a respective electrical control subsystem 120 and a respective thermal control subsystem 122.

Each electrical control subsystem 120 operates at least partially under the control of controller 114 to control electrical operation of its respective battery module 116. In particular, electrical control subsystem 120(1) controls electrical operation of battery module 116(1) in response to a signal (not shown) from controller 114, electrical control subsystem 120(2) controls electrical operation of battery module 116(2) in response to a signal (not shown) from controller 114, and so on. Battery modules 116 are electrically coupled in series between first load power bus 106 and second load power bus 108 via their respective electrical control subsystems 120. In some alternate embodiments, though, first stack 110 includes two or more strings of battery modules electrically coupled in series between first load power bus 106 and second load power bus 108, where each battery module of the plurality of strings includes a respective BMS node controlled by controller 114. Each electrical control subsystem 120 controls electrical operation of its respective battery module 116, for example, by controlling magnitude of current flowing through the battery module 116 and/or by controlling magnitude of voltage across the battery module. For example, in certain embodiments, each electrical control subsystem 120 includes one or more power converters configured to electrically interface its respective battery module 116 with first load power bus 106 and second load power bus 108, such that (a) magnitude of current flowing through the battery module 116 need not be equal to magnitude of current $I_{st1}$ flowing through first stack 110, and (b) magnitude of voltage across each battery module 116 need not be equal to a respective bus contribution voltage $V_{n1}$ of the battery module 116. In some other embodiments, each electrical control subsystem 120 includes one or more switches configured to selectively electrically couple and decouple its respective battery module 116 from first load power bus 106 and second load power bus 108. Two example embodiments of electrical control subsystems 120 are discussed below with respect to FIGS. 3 and 4.

Each thermal control subsystem 122 operates at least partially under the control of controller 114 to control thermal operation of its respective battery module 116 by controlling temperature of its respective battery module 116. Specifically, thermal control subsystem 122(1) controls thermal operation of battery module 116(1) in response to a signal (not shown) from controller 114, thermal control subsystem 122(2) controls thermal operation of battery module 116(2) in response to a signal (not shown) from controller 114, and so on. In particular embodiments, each thermal control subsystem 122 is configured to control temperature of its respective battery module 116 at least partially independently of temperature of other battery modules 116 in first stack 110, thereby advantageously enabling individual control each battery module 116's temperature profile. In some embodiments, each thermal control subsystem 122 includes one or more fans, one or more pumps, one or more dampers, one or more valves, one or more heat exchangers, and/or one or more heaters, although battery module 116 temperature can be controlled in other manners, as discussed below. Additionally, in certain embodiments, each thermal control subsystem 122 includes one or more elements for determining temperature of its respective battery module 116. For example, particular embodiments of thermal control subsystems 122 include circuitry for determining temperature of its respective battery module 116 based on one or more electrical signals from one or more temperature sensors, e.g., thermistors, of the battery module 116. Several example embodiments of thermal control subsystems 122 are discussed below with respect to FIGS. 5-17.

It should be noted that while electrical control subsystems 120 and thermal control subsystems 122 are depicted as being separate elements, an electrical control subsystem 120 and a thermal control subsystem 122 of a given BMS node 118 could be partially or fully integrated. For example, in certain embodiments, such as discussed below with respect to FIG. 17, controller 114 is configured to control respective thermal operation of each battery module 116 at least partially by controlling efficiency of its respective electrical control subsystem 120, to control amount of heat generated by the electrical control subsystem 120 which may flow to the battery module 116. As another example, in particular embodiments, controller 114 is configured to control respective thermal operation of each battery module 116 at least partially by controlling a waveform of an electric current flowing through the battery module, such as discussed below with respect to FIG. 12. Accordingly, in these embodiments, the thermal control subsystem 122 of a given BMS node 118 is at least partially integrated with the electrical control subsystem 120 of the BMS node 118.

Second stack 112 includes N battery modules 124 and a respective BMS node 126 for each battery module 124, where N is an integer greater than or equal to one and each BMS node 126 is controlled by controller 114. Accordingly, while FIG. 1 illustrates N being at least three, it is understood that N could alternately be two or one. Each battery module 124 includes one or more electrochemical cells, e.g., Li-ion electrochemical cells, that are electrically coupled together, such as discussed below with respect to FIG. 2. Each battery module 124 optionally includes additional elements, such as one or more devices for measuring battery module temperature, one or more devices for measuring battery module voltage, one or more devices for measuring battery module current, etc. Each BMS node 126 includes a respective electrical control subsystem 128 and a respective thermal control subsystem 130.

Each electrical control subsystem 128 operates at least partially under the control of controller 114 to control electrical operation of its respective battery module 124. In particular, electrical control subsystem 128(1) controls electrical operation of battery module 124(1) in response to a signal (not shown) from controller 114, electrical control subsystem 128(2) controls electrical operation of battery module 124(2) in response to a signal (not shown) from controller 114, and so on. Battery modules 124 are electrically coupled in series between first load power bus 106 and second load power bus 108 via their respective electrical control subsystems 128. In some alternate embodiments, though, second stack 112 includes two or more strings of battery modules electrically coupled in series between first load power bus 106 and second load power bus 108, where each battery module of the plurality of strings includes a respective BMS node that is controlled by controller 114. Additionally, certain alternate embodiments, such as discussed below with respect to FIG. 47, further include electrical connections between first stack 110 and second stack 112 to enable transfer of electrical energy between individual battery modules 116 of first stack 110 and individual battery modules 124 of second stack 112. Each electrical control subsystem 128 controls electrical operation of its respective battery module 124, for example, by controlling magnitude of current flowing through the battery module 124 and/or by controlling magnitude of voltage across the battery module 124. In particular embodiments, electrical control subsystems 128 of second stack 112 are configured in a manner similar to that discussed above with respect to electrical control subsystems 120 of first stack 110. For example, each electrical control subsystem 128 may include one or more power converters, or each electrical control subsystem 128 may include one or more switches. Two example embodiments of electrical control subsystems 128 are discussed below with respect to FIGS. 3 and 4.

Each thermal control subsystem 130 operates at least partially under the control of controller 114 to control thermal operation of its respective battery module 124 by controlling temperature of its respective battery module 124. Specifically, thermal control subsystem 130(1) controls thermal operation of battery module 124(1) in response to a signal (not shown) from controller 114, thermal control subsystem 130(2) controls thermal operation of battery module 124(2) in response to a signal (not shown) from controller 114, and so on. In particular embodiments, each thermal control subsystem 130 is configured to control temperature of its respective battery module 124 at least partially independently of temperature of other battery modules 124 in second stack 112, thereby advantageously enabling individual control each battery module 124's temperature. In some embodiments, each thermal control subsystem 130 includes one or more fans, one or more pumps, one or more dampers, one or more valves, one or more heat exchangers, and/or one or more heaters, although battery module 124 temperature can be controlled in other manners, as discussed below. Additionally, in certain embodiments, each thermal control subsystem 130 includes one or more elements for determining temperature of its respective battery module 124. For example, particular embodiments of thermal control subsystems 130 include circuitry for determining temperature of its respective battery module 124 based on one or more electrical signals from one or more temperature sensors, e.g., thermistors, of the battery module 124. Several example embodiments of thermal control subsystems 130 are discussed below with respect to FIGS. 5-17. In a manner analogous to that discussed above with respect to first stack 110, while electrical control subsystems 128 and thermal control subsystems 130 are depicted as being separate elements, an electrical control subsystem 128 and a thermal control subsystem 130 of a given BMS node 126 could be partially or fully integrated.

Respective bus contribution voltages $V_{n1}$ of each battery module 116 of first stack 110 sum to a system voltage $V_{sy}$ between first load power bus 106 and second load power bus

108, and respective bus contribution voltages $V_{n2}$ of each battery module 124 of second stack 112 also sum to system voltage $V_{sy}$. However, in some alternate embodiments of energy storage system 102, one or more stacks further includes stack-level power conversion circuitry (not shown), e.g., a stack-level power converter in each stack, such that a sum of respective bus contribution voltages of a given stack are not necessarily equal to system voltage $V_{sy}$. Magnitude of a system current $I_{sy}$ flowing through source/load 104 is equal to the sum of respective currents flowing through each stack. For example, in the FIG. 1 embodiment including two stacks, $I_{sy}$ is equal to the sum of current Isa flowing through first stack 110 and current $I_{st2}$ flowing through second stack 112. However, as noted above, in some alternate embodiments of energy storage system 102, one or more stacks further include stack-level power conversion circuitry (not shown), e.g., a stack-level power converter in each stack, such that a sum of currents flowing through stacks of energy storage system 102 are not necessarily equal to magnitude of system current $I_{sy}$.

It should be noted that stacks of energy storage system 102 need not have identical configurations. For example, in some embodiments, the quantity of battery modules 116 of first stack 110 differs from the quantity of battery modules 124 of second stack 112. As another example, in particular embodiments, battery modules 116 of first stack 110 include a different type of electrochemical cells than battery modules 124 of second stack 112. As further example, thermal control subsystems 122 of first stack 110 may have different configurations than thermal control subsystems 130 of second stack 112.

Controller 114 is formed, for example, of analog and/or digital electronic circuitry. Certain embodiments of controller 114 are at least partially formed by one or more processors executing instructions, such as in the form of software and/or firmware, stored in one or more memories, to control electrical control subsystems 120 and 128 and thermal control subsystems 122 and 130 of energy storage system 102. While controller 114 is depicted as being included within energy storage system 102, controller 114 could alternately be partially or fully external to energy storage system 102. Additionally, while controller 114 is depicted as being a single element, controller 114 is optionally implemented by a plurality of sub-elements that need not be co-located. For example, in some embodiments, controller 114 is implemented by the combination of (a) a local controller within energy storage system 102 and (b) a remote controller external to energy storage system 102 that is in communication with the local controller. As another example, in particular embodiments, controller 114 is at least partially implemented by a distributed computed system, such as a cloud computing system.

Optional shared thermal infrastructure 132 includes one of more elements that are shared by thermal control subsystems 122 and thermal control subsystems 130. Examples of shared thermal infrastructure 132 include one or more of (a) ductwork or other elements for carrying or containing air, such as to establish one or more cold aisles and hot aisles in energy storage system 102, or to establish one more regions in energy storage system 102 with a conditioned temperature environment, (b) fans for moving air within energy storage system 102, (c) piping, such as for carrying water or another heat transfer liquid within energy storage system 102, (d) pumps for moving water or another heat transfer liquid through energy storage system 102, (e) central cooling equipment, such as a chiller or an air cooling device, (f) central heating equipment, such as an electric heater, and (g) valves, dampers, or the like for controlling flow of one or more heat transfer fluids, such as air or water, within energy storage system 102.

Figure 2:
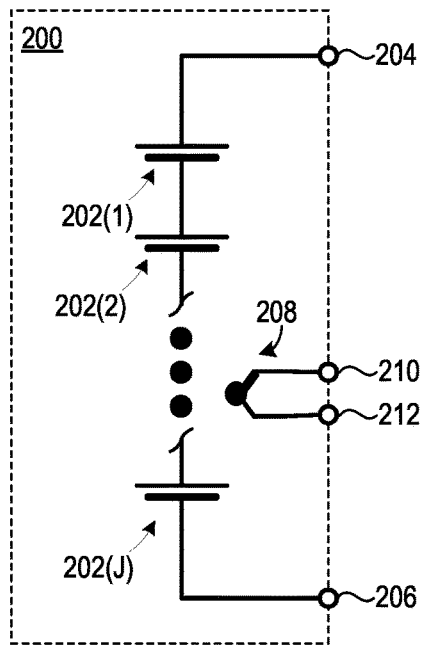
FIG. 2 is a schematic diagram of one embodiment of a battery module of the FIG. 1 energy storage system.

As noted above, each battery module 116 and 124 includes one or more electrochemical cells that are electrically coupled together. For example, FIG. 2 is a schematic diagram of a battery module 200, which is one possible embodiment of a battery module 116 instance or a battery module 124 instance. Battery module 200 includes J electrochemical cells 202, such as Li-ion electrochemical cells, electrically coupled in series between a first terminal 204 and second terminal 206, where J is an integer greater than one. First terminal 204 and second terminal 206 are electrically coupled to a respective electrical control subsystem 120 or 128, such that first terminal 204 and second terminal 206 provide an electrical interface to battery module 200 for its respective electrical control subsystem 120 or 128. However, battery module 200 could be modified to include only a single electrochemical cell 202 electrical coupled between first terminal 204 and second terminal 206. Additionally, battery module 200 could be modified so that electrochemical cells 202 are electrically coupled in parallel, or in a parallel-series combination, between first terminal 204 and second terminal 206. For example, some alternate embodiments include two or more groups of electrochemical cells electrically coupled in series, where each group of electrochemical cells includes two or more electrochemical cells electrically coupled in parallel.

Battery module 200 optionally includes a temperature sensor 208 configured to sense temperature of electrochemical cells 202. Terminals 210 and 212 provide an interface to temperature sensor 208 from outside of battery module 200. In some embodiments, terminals 210 and 212 are directly communicatively coupled to controller 114 to enable controller 114 to determine temperature of battery module 200. In some other embodiments, terminals 210 and 212 are communicatively coupled to optional circuitry (not shown) of a BMS node 118 or 126 configured (a) to determine temperature of electrochemical cells 202 from an electrical signal from temperature sensor 208 and (b) provide the determined temperature to controller 114. While temperature sensor 208 is depicted as being a thermistor, e.g., a negative temperature coefficient (NTC) thermistor or a positive temperature coefficient (PTC) thermistor, temperature sensor 208 could be another type of temperature sensor without departing from the scope hereof. Additionally, battery module 200 could include a plurality of temperature sensors 208, such as to enable determining temperature at two or more locations within battery module 200. Furthermore, some alternate embodiments of battery module 200 include circuitry (not shown) that is capable of supporting both voltage measurements and temperature measurements of battery module 200.

Figure 3:
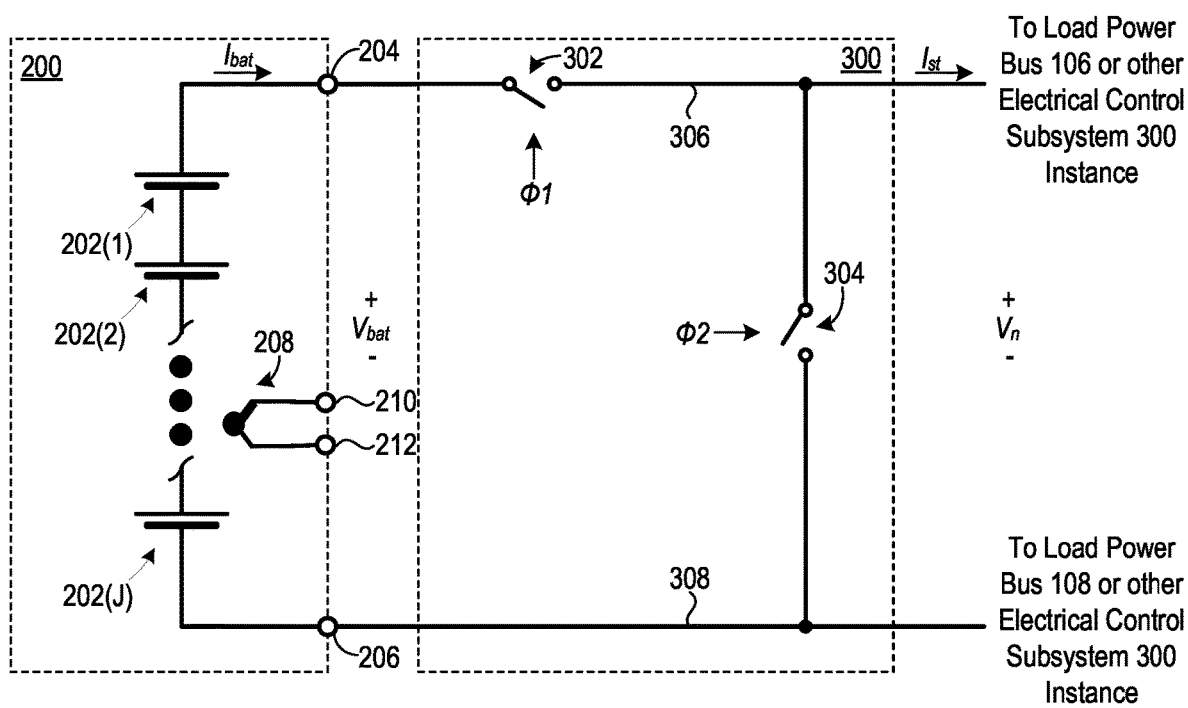
FIG. 3 is a schematic diagram of one embodiment of an electrical control subsystem of the FIG. 1 energy storage system.
Figure 4:
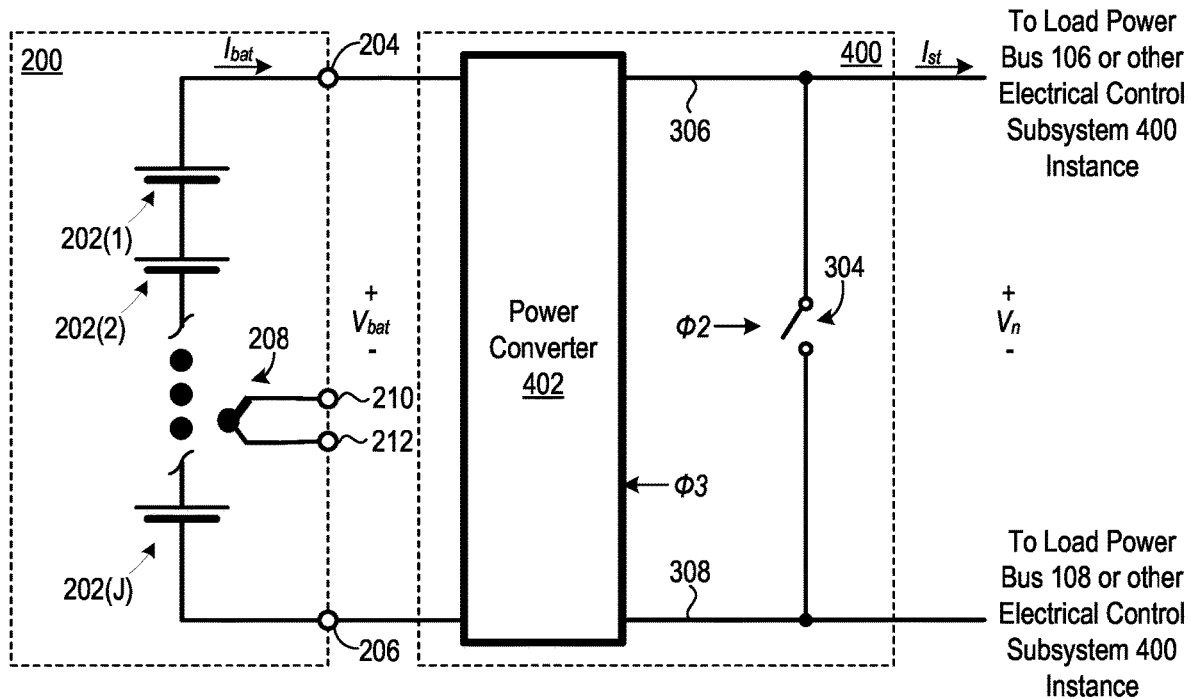
FIG. 4 is a schematic diagram of another embodiment of an electrical control subsystem of the FIG. 1 energy storage system.

FIGS. 3 and 4, discussed below, respectively illustrate two possible embodiments of electrical control subsystems 120 and 128. It is understood, though, that electrical control subsystems 120 and 128 are not limited to embodiments of FIGS. 3 and 4.

FIG. 3 is a schematic diagram of an electrical control subsystem 300, which is one embodiment of an electrical control subsystem 120 or 128 instance that is capable of connecting and disconnecting a respective battery module from first load power bus 106 and second load power bus 108, as well operating its respective battery module in a bypass operating mode. Electrical control subsystem 300 is illustrated as being electrically coupled to an instance of battery module 200 (FIG. 2), although it understood that electrical control subsystem 300 could alternately be used with a different battery module. Electrical control subsystem 300 includes an isolation switching device 302 and a bypass switching device 304. Isolation switching device 302 is electrically coupled between first terminal 204 and a positive electrical node 306, and bypass switching device 304 is electrically coupled between positive electrical node 306 and a negative electrical node 308. Negative electrical node 308 is also electrically coupled to second terminal 206.

In cases where electrical control subsystem 300 is in top BMS node 118(1) or 126(1) of first stack 110 or second stack 112, respectively, positive electrical node 306 is the same electrical node as that of first load power bus 106. In cases where electrical control subsystem 300 is not in top BMS node 118(1) or 126(1), positive electrical node 306 is connected to the negative electrical node 308 of another instance of electrical control subsystem 300, such that a plurality of electrical control subsystems 300 are electrically coupled in series in first stack 110 or in second stack 112. In cases where electrical control subsystem 300 is in bottom BMS node 118(M) or 126(N) of first stack 110 or second stack 112, respectively, negative electrical node 308 is the same electrical node as that of second load power bus 108. In cases where electrical control subsystem 300 is not in bottom BMS node 118(M) or 126(N), negative electrical node 308 is connected to the positive electrical node 306 of another instance of electrical control subsystem 300, such that a plurality of electrical control subsystems 300 are electrically coupled in series in first stack 110 or in second stack 112.

Isolation switching device 302 is controlled by a control signal φ1 generated by controller 114, and bypass switching device 304 is controlled by a control signal φ2 generated by controller 114. In particular embodiments, controller 114 is configured to generate control signals φ1 and φ2 so that a BMS node 118 or 126 including an electrical control subsystem 300 instance may operate in any one of at least the following three operating modes:

(A) Normal operating mode: this operating mode is characterized by controller 114 generating control signals φ1 and φ2 such that isolation switching device 302 is closed and bypass switching device 304 is open. Accordingly, battery module 200 is operating in a power transfer mode, and a stack current $I_{st}$, which is either current $I_{st1}$ or $I_{st2}$ flowing through first stack 110 or second stack 112, respectively, is equal to a current $I_{bat}$ flowing through battery module 200. Additionally, a bus contribution voltage $V_n$, which is either a bus contribution voltage $V_{n1}$ of first stack 110 or a bus contribution voltage $V_{n2}$ of second stack 112, is equal to a voltage $V_{bat}$ across battery module 200 (neglecting parasitic effects).

(B) Bypass operating mode: this operating mode is characterized by controller 114 generating control signals φ1 and φ2 such that isolation switching device 302 is open and bypass switching device 304 is closed, such that battery module 200 is operating in a bypass operating mode and is accordingly non-operational. Accordingly, stack current $I_{st}$ flows through a BMS node 118 or 126 including electrical control subsystem 300 while bypassing battery module 200 such that electric current does not flow through battery module 200. Additionally, bus contribution voltage $V_n$ is zero (neglecting parasitic effects).

(C) Isolation operating mode: this operating mode is characterized by controller 114 generating control signals φ1 and φ2 such that isolation switching device 302 is open and bypass switching device 304 is open, such that battery module 200 is disconnected from other battery modules of its stack and current $I_{st}$ flowing through its stack has a magnitude of zero.

FIG. 4 is a schematic diagram of an electrical control subsystem 400, which is an alternate embodiment of electrical control subsystem 300 (FIG. 3) where isolation switching device 302 is replaced with a power converter 402 electrically coupled between (a) first terminal 204 and second terminal 206 and (b) positive electrical node 306 and negative electrical node 308. Power converter 402 is controlled by one or more control signals φ3 generated by controller 114. Power converter 402 is capable of transforming voltage $V_{bat}$ across battery module 200 to bus contribution voltage $V_n$ (or vice versa), or transforming current $I_{bat}$ flowing through battery module 200 to current $I_{st}$ flowing through a stack, e.g., first stack 110 or second stack 112, including electrical control subsystem 400. In some embodiments, power converter 402 includes a boost converter, a buck converter, a buck-boost converter, a buck and boost converter, another type of switching power converter, or even a linear regulator. Additionally, in certain embodiments, power converter 402 has an isolated topology. Bypass switching device 304 is omitted in certain alternate embodiments of electrical control subsystem 400 where power converter 402 is capable of performing the functions of bypass switching device 304.

A BMS node 118 or 126 including an electrical control subsystem 400 instance is capable of operating in the same operating modes under the control of controller 114 as discussed above with respect to electrical control subsystem 300 of FIG. 3, but with additional flexibility in the normal operating mode. In particular, controller 114 is capable of controlling power converter 402 in a normal operating mode of a BMS node 118 or 126 including an electrical control subsystem 400 instance such that magnitude of voltage $V_{bat}$ across battery module 200 need not be equal to magnitude of bus contribution voltage $V_n$, as well as such that magnitude of current $I_{bat}$ flowing through battery module 200 need not the same as magnitude of current $I_{st}$ flowing through a stack including electrical control subsystem 400.

Referring again to FIG. 1, as discussed above, thermal control subsystems 122 and 130 may include, for example, one or more fans, one or more pumps, one or more dampers, one or more valves, one or more heat exchangers, one or more heaters, etc. Additionally, a thermal control subsystem 122 or 130 of a given BMS node 118 or 126, respectively, may be partially or fully integrated with the respective electrical control subsystem 120 or 128 of the BMS node. Discussed below with respect to FIGS. 5-17 are several example embodiments of thermal control subsystems 122 and 130. While thermal control subsystems of FIGS. 5-17 are discussed in the context of embodying a thermal control subsystem 122 of first stack 110, any of the thermal control subsystems of FIGS. 5-17 could be adapted to embody a thermal control subsystem 130 of second stack 112, such as by replacing battery modules 116 and electrical control subsystems 120 with battery modules 124 and electrical control subsystems 128, respectively. Additionally, it is understood that other embodiments of thermal control subsystems 122 and 130 are possible, as long as each thermal control subsystem 122 and 130 is capable of controlling temperature of its respective battery module 116 or 124 at least partially independently of temperature of other battery modules 116 and 124. Furthermore, features of the thermal control subsystems discussed below may be combined in various manners without departing from the scope hereof.

Figure 5:
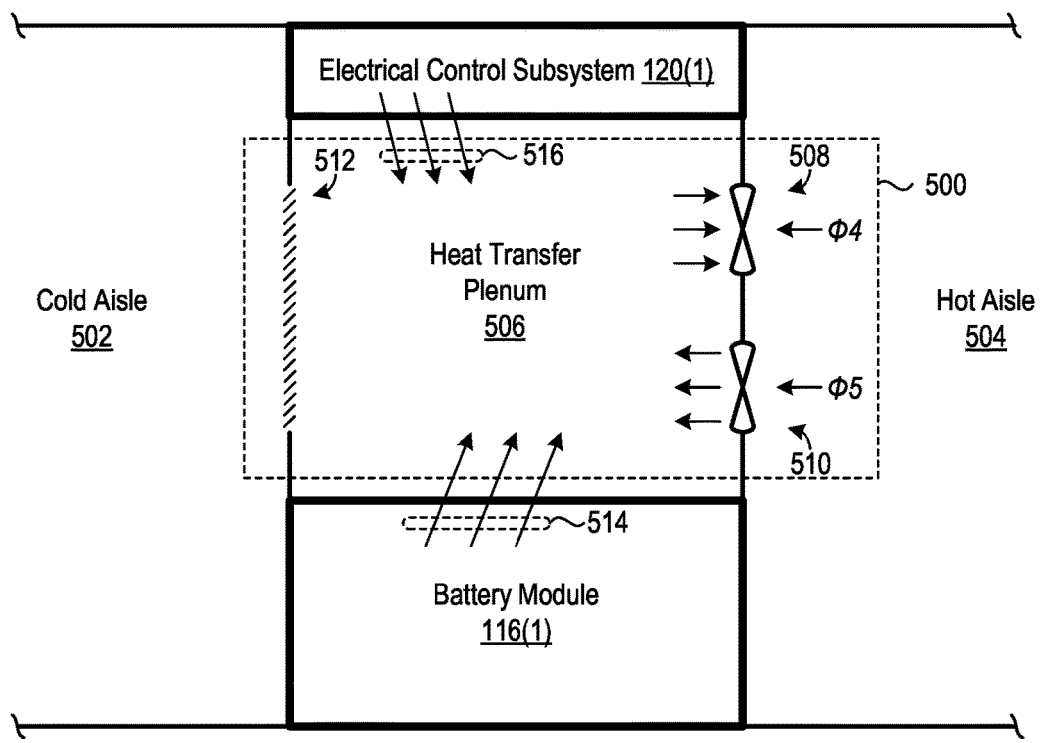
FIG. 5 is a schematic diagram of one embodiment of a thermal control subsystem of the FIG. 1 energy storage system, where the thermal control subsystem is configured to control temperature of a battery module by controlling air temperature and/or air flow rate.

FIG. 5 is a schematic diagram of a thermal control subsystem 500, which is one example embodiment of thermal control subsystem 122(1) in an embodiment of energy storage system 102 where shared thermal infrastructure 132 includes a cold aisle 502 and a hot aisle 504. It is understood that other instances of thermal control subsystem 122, as well as instances of thermal control subsystem 130, could be embodied in a manner similar to that of thermal control subsystem 500. Thermal control subsystem 500 includes a heat transfer plenum 506, a first fan 508, a second fan 510, and an air flow control device 512. Heat transfer plenum 506 borders each of battery module 116(1) and electrical control subsystem 120(1), such that air flowing through heat transfer plenum 506 flows along each of battery module 116(1) and electrical control subsystem 120(1). Shared thermal infrastructure 132 maintains cold aisle 502 at a relatively low temperature, such as using a mechanical refrigeration system, an evaporative cooler, or an economizer connected to an outdoor cold air source, for cooling components of energy storage system 102. Hot aisle 504 receives air that is warmed by heat from components of energy storage system 102, such as by heat from battery modules 116 and heat from electrical control subsystems 120. Accordingly, hot aisle 504 is at a higher temperature than cold aisle 502.

Air flow control device 512 separates heat transfer plenum 506 from cold aisle 502, such as to enable heat transfer plenum 506 to operate at a different temperature and/or at a different static pressure than cold aisle 502. In some embodiments, air flow control device 512 includes a grille or a damper. Each of first fan 508 and second fan 510 separates heat transfer plenum 506 from hot aisle 504. First fan 508 is configured to transfer air from cold aisle 502 to heat transfer plenum 506 via air flow control device 512, as well as to transfer air from heat transfer plenum 506 to hot aisle 504, under the command of a control signal $\phi 4$ generated by controller 114 (FIG. 1). Accordingly, operation of first fan 508 cools air of heat transfer plenum 506. Second fan 510 is configured to transfer air from hot aisle 504 to heat transfer plenum 506, as well as to transfer air from heat transfer plenum to cold aisle 502 via air flow control device 512, under the command of a control signal $\phi 5$ generated by controller 114. Accordingly, operation of second fan 510 heats air of heat transfer plenum 506.

Battery module 116(1) and electrical control subsystem 120(1) are thermally coupled to heat transfer plenum such that (a) heat 514 flows from battery module 116(1) to heat transfer plenum 506, and (b) heat 516 flows from electrical control subsystem 120(1) to heat transfer plenum 506. It is noted that direction of flow of heat 514 and/or heat 516 could be either positive or negative, and thermal control subsystem 500 may therefore either cool or heat each of battery module 116(1) and electrical control subsystem 120(1). Accordingly, controller 114 may control temperature of battery module 116(1) independently of other battery modules 116 in first stack 110 by controlling temperature and/or flow rate of air within heat transfer plenum 506 via controls signals $\phi 4$ and $\phi 5$. For example, controller 114 may cause temperature of battery module 116(1) to decrease by (a) generating control signal $\phi 4$ to increase speed of first fan 508 and/or (b) generating control signal $\phi 5$ to decrease speed of second fan 510. As another example, controller 114 may cause temperature of battery module 116(1) to increase by (a) generating control signal $\phi 4$ to decrease speed of first fan 508 and/or (b) generating control signal $\phi 5$ to increase speed of second fan 510.

Modifications to thermal control subsystem 500 are possible and considered within the scope of this disclosure. For example, in some alternate embodiments, first fan 508 and second fan 510 are replaced with a single fan that is capable of changing direction of rotation under the control of controller 114, such that the single fan is capable of transferring either cold air from cold aisle 502, or hot air form hot aisle 504, into heat transfer plenum 506 according to direction of fan rotation. As another example, in particular alternate embodiments, air flow control device 512 is replaced with one or more fans in addition to, or in place of, first fan 508 and second fan 510.

Figure 6:
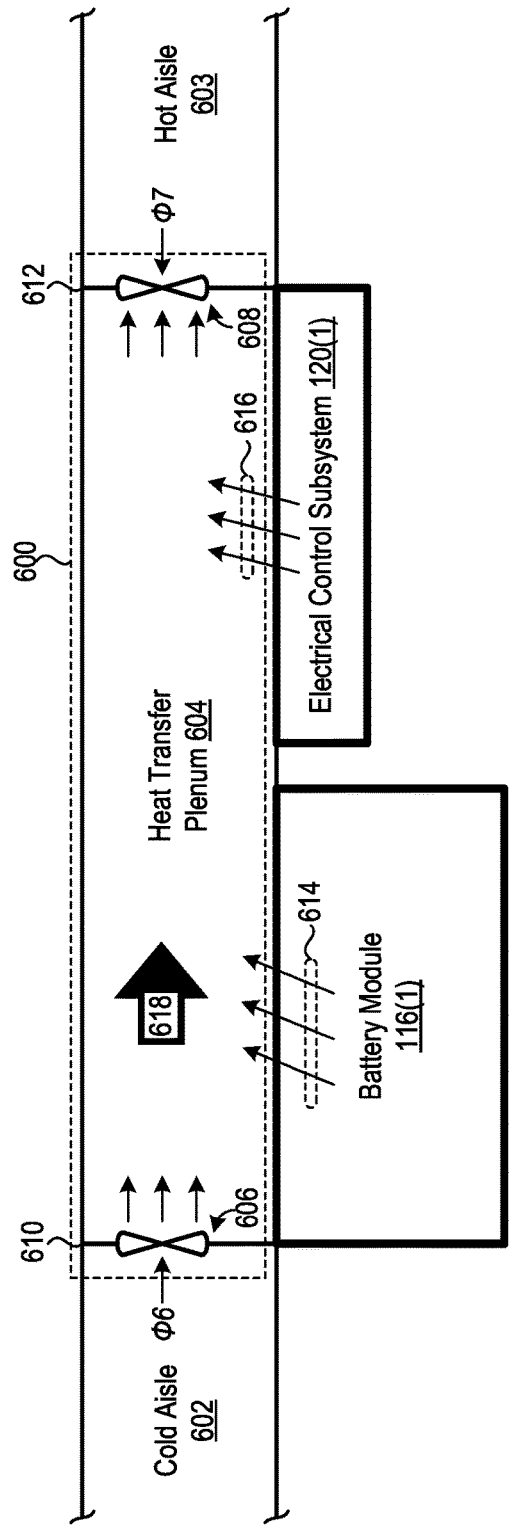
FIG. 6 is a schematic diagram of one embodiment of a thermal control subsystem of the FIG. 1 energy storage system, where the thermal control subsystem is configured to control temperature of a battery module by controlling an air flow path and/or an air flow rate.

Air flows in parallel by battery module 116(1) and electrical control subsystem 120(1) in thermal control subsystem 500. Thermal control subsystems 122 and 130 of energy storage system 102 could instead be configured so that air flows in series from a battery module to an electrical control subsystem (or vice versa). For example, FIG. 6 is a schematic diagram of a thermal control subsystem 600, which is one example embodiment of a thermal control subsystem 122(1) configured such that air flows in series from battery module 116(1) to electrical control subsystem 120(1), or vice versa, depending operating state of thermal control subsystem 600. It is understood that other instances of thermal control subsystem 122, as well as instances of thermal control subsystem 130, could be embodied in a manner similar to that of thermal control subsystem 600. Thermal control subsystem 600 is configured to be used in embodiments of energy storage system 102 where shared thermal infrastructure 132 includes a cold aisle 602 and a hot aisle 603 analogous to cold aisle 502 and hot aisle 504, respectively, of FIG. 5.

Thermal control subsystem 600 includes a heat transfer plenum 604, a first fan 606, and a second fan 608 disposed in series between cold aisle 602 and hot aisle 603. First fan 606 controls flow of air between cold aisle 602 and a first end 610 of heat transfer plenum 604 under the control of a control signal $\phi 6$ generated by controller 114. Second fan 608 controls flow of air between hot aisle 603 and a second end 612 of heat transfer plenum 604 under the control of a control signal $\phi 7$ generated by controller 114. Accordingly, first fan 606 and second fan 608 are in series with battery module 116(1) and electrical control subsystem 120(1). Each of first fan 606 and second fan 608 can rotate in either a clockwise direction or a counter clockwise direction under the control of control signals $\phi 6$ and $\phi 7$, respectively. Each of battery module 116(1) and electrical control subsystem 120(1) are thermally coupled with heat transfer plenum 604, as illustrated by heat 614 and heat 616 flowing from battery module 116 and electrical control subsystem 120, respectively, to heat transfer plenum 604. It is noted that direction of heat 614 and heat 616 could be negative as well as positive. Air flows in series in heat transfer plenum 604 from battery module 116(1) to electrical control subsystem 120(1), or vice versa, depending on the path of airflow as controlled by controller 114 via control signals $\phi 6$ and $\phi 7$.

Figure 7:
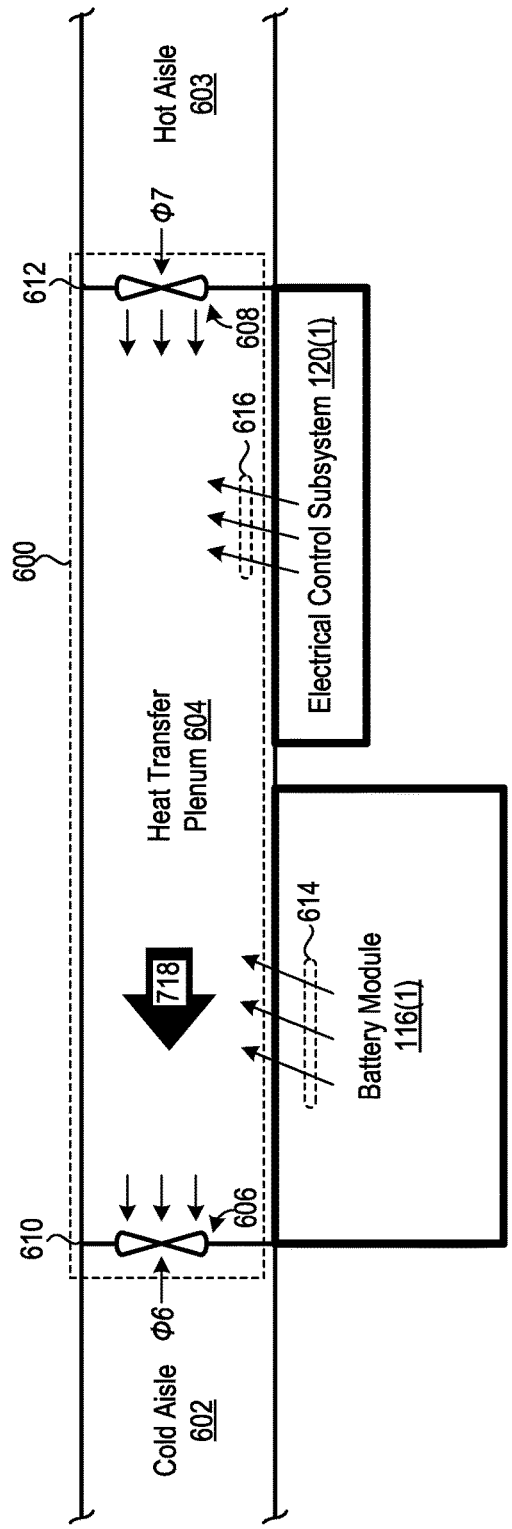
FIG. 7 is a schematic diagram of the FIG. 6 thermal control subsystem illustrating a different air flow path than that illustrated in FIG. 6.

For example, FIG. 6 illustrates an example of controller 114 (a) controlling first fan 606 such that first fan 606 transfers air from cold aisle 602 to heat transfer plenum 604 at first end 610 and (b) controlling second fan 608 such that it transfers air from heat transfer plenum 604 to hot aisle 603 at second end 612. Therefore, air enters heat transfer plenum 604 at first end 610, exchanges heat with battery module 116(1), exchanges heat with electrical control subsystem 120(1), and exits heat transfer plenum 604 at second end 612, such that air flows from left to right in heat transfer plenum 604, as indicated by an arrow 618. FIG. 7, on the other hand, illustrates an example of controller 114 (a) controlling second fan 608 such that it transfers air into from hot aisle 603 to heat transfer plenum 604 at second end 612 and (b) controlling first fan 606 such that it transfers air from heat transfer plenum 604 to cold aisle 602 at first end 610. Therefore, air enters heat transfer plenum at second end 612, exchanges heat with electrical control subsystem 120(1), exchanges heat with battery module 116(1), and exits heat transfer plenum 604 at first end 610, such that air flows from right to left in heat transfer plenum, as indicated by an arrow 718.

Accordingly, thermal control subsystem 600 can control temperature of battery module 116(1) under the control of controller 114 independently of temperature of other battery modules 116 in first stack 110 by controlling path and/or flow rate of air in heat transfer plenum 604 via control of first fan 606 and second fan 608. For example, controller 114 may decrease temperature of battery module 116(1) by controlling first fan 606 and/or second fan 608 to increase flow rate of air through heat transfer plenum 604 from cold aisle 602 to hot aisle 603. Alternately or additionally, if air is currently flowing from right to left in heat transfer plenum 604, controller 114 may control first fan 606 and second fan 608 to change direction of air flow to left to right, so that heat transfer plenum 604 receives air from cold aisle 602 instead of air from hot aisle 603. On the other hand, controller 114 may increase temperature of battery module 116 by controlling first fan 606 and/or second fan 608 to decrease flow rate of air through heat transfer plenum 604 from cold aisle 602 to hot aisle 603. Alternately or additionally, if air is currently flowing from left to right in heat transfer plenum 604, controller 114 may control first fan 606 and second fan 608 to change direction of air flow to right to left, so that temperature plenum 604 receives air from hot aisle 603 instead of air from cold aisle 602.

Modifications to thermal control subsystem 600 are possible. For example, first fan 606 and/or second fan 608 could be replaced with, or supplemented with, one or more dampers configured to control path of air flow and/or volume of air flow under the control of controller 114.

Figure 8:
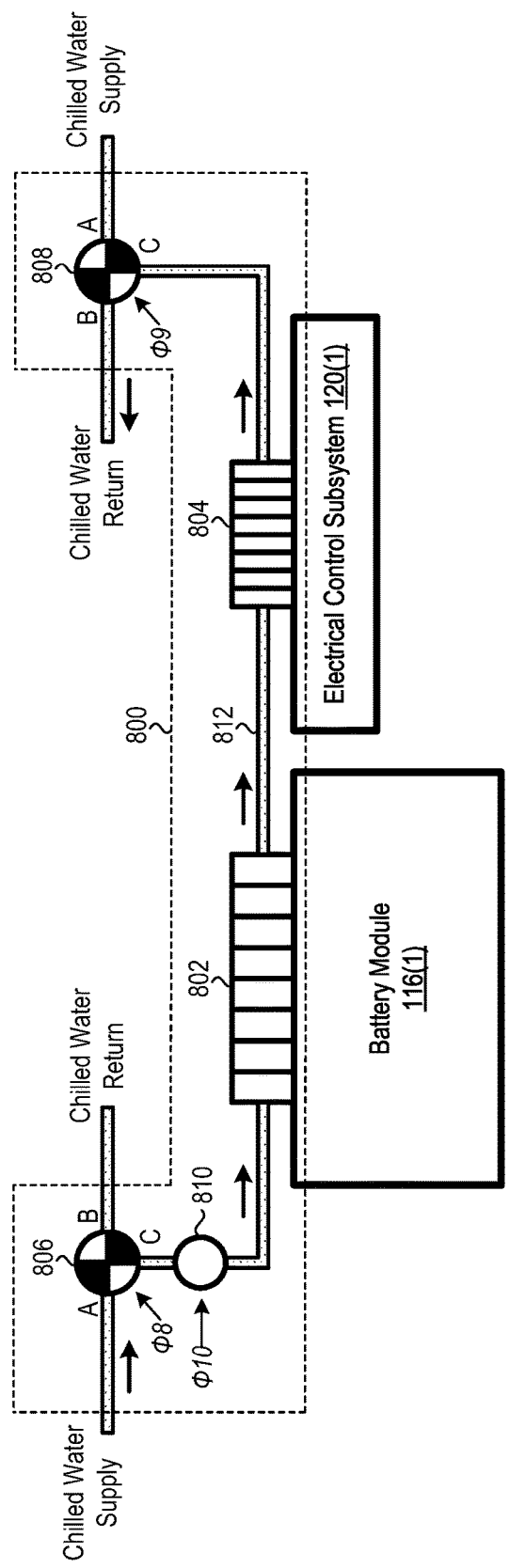
FIG. 8 is a schematic diagram of one embodiment of a thermal control subsystem of the FIG. 1 energy storage system, where the thermal control subsystem is configured to control temperature of a battery module by controlling a chilled water flow path and/or a chilled water flow rate.

Thermal control subsystems 500 and 600 use air as a heat transfer fluid for controlling battery module temperature. However, either thermal control subsystem could be modified to use a different heat transfer fluid, such as a different gaseous heat transfer fluid (e.g., a refrigerant in vapor state) or a liquid heat transfer fluid (e.g., water, a mixture of water and one or more substances, a refrigerant in liquid state, etc.). For example, FIG. 8 is a schematic diagram of a thermal control subsystem 800, which is one example embodiment of thermal control subsystem 122(1) configured such that chilled water flows in series from battery module 116(1) to electrical control subsystem 120(1), or vice versa, depending on the operating mode of thermal control subsystem 800. It is understood that other instances of thermal control subsystem 122, as well as instances of thermal control subsystem 130, could be embodied in a manner similar to that of thermal control subsystem 800. Thermal control subsystem 800 is configured to be used in embodiments of energy storage system 102 where shared thermal infrastructure 132 includes a chilled water source and associated supply and return piping. Thermal control subsystem 800 includes a first heat exchanger 802, a second heat exchanger 804, a first valve 806, a second valve 808, a pump 810, and piping 812.

Each of first valve 806 and second valve 808 includes a respective port A, a respective port B, and a respective port C. First valve 806 and second valve 808 may independently operate in either an A-C position or a B-C position in response to control signals ϕ8 and ϕ9 generated by controller 114, respectively. The A-C position is characterized by (1) port A being connected to port C and (2) port B being isolated from each of port A and port C. The B-C position is characterized by (1) port B being connected to port C and (2) port A being isolated from each of port B and port C. Pump 810 is variable speed and variable direction pump that is controlled by a control signal ϕ10 generated by controller 114. Port A of each of first valve 806 and second valve 808 is connected to a chilled water supply of shared thermal infrastructure 132, and port B of each of first valve 806 and second valve 808 is connected to a chilled water return of shared thermal infrastructure 132. Piping 812 connects pump 810, first heat exchanger 802, and second heat exchanger 804 in series between port C of first valve 806 and port C of second valve 808. First heat exchanger 802 is configured to transfer heat from battery module 116(1) to chilled water flowing through first heat exchanger 802 via piping 812. Similarly, second heat exchanger 804 is configured to transfer heat from electrical control subsystem 120(1) to chilled water flowing through second heat exchanger 804 via piping 812.

Figure 9:
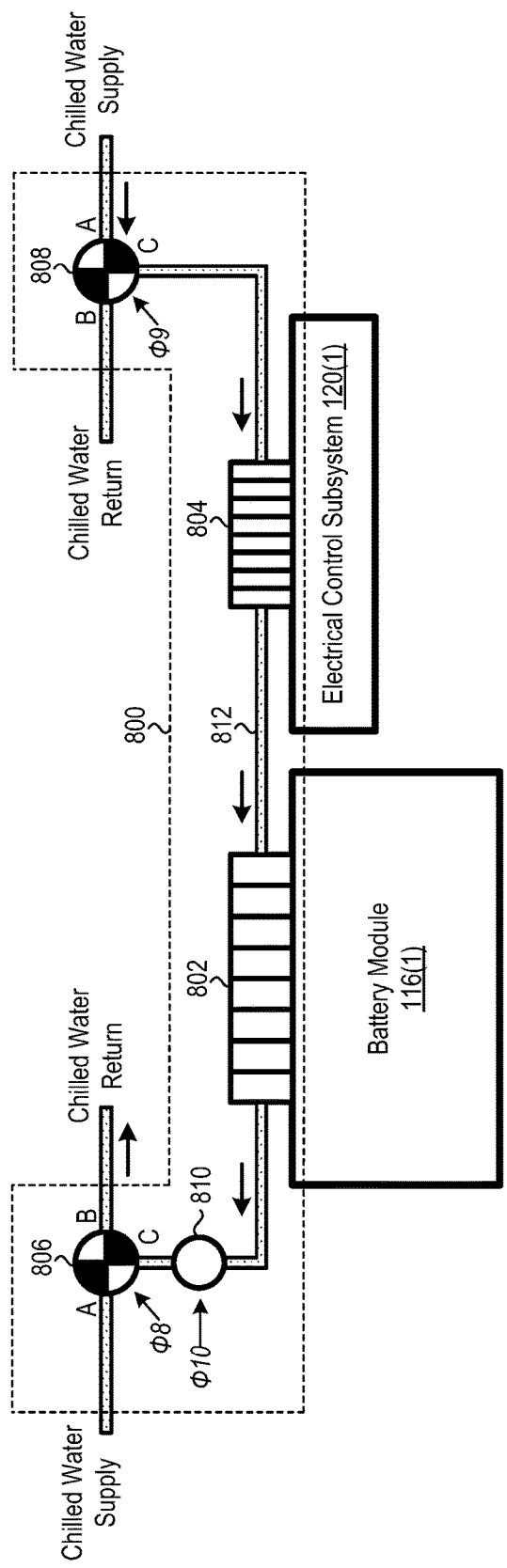
FIG. 9 is a schematic diagram of the FIG. 8 thermal control subsystem illustrating a different chilled water flow path than that illustrated in FIG. 8.

Controller 114 is configured to control path of chilled water through thermal control subsystem 800 by controlling each of first valve 806, second valve 808, and pump 810. For example, FIG. 8 illustrates operation of thermal control subsystem 800 where first valve 806 is in position A-C, second valve 808 is in position B-C, and pump 810 is operating to pump chilled water towards first heat exchanger 802. Accordingly, chilled water flows from left to right in the FIG. 8 illustration, such that chilled water flows from the chilled water supply through first valve 806, pump 810, first heat exchanger 802, second heat exchanger 804, and second valve 808 to the chilled water return, as shown by arrows along piping in FIG. 8. Thus, chilled water exchanges heat with battery module 116(1) before exchanging heat with electrical control subsystem 120(1). FIG. 9, in contrast, illustrates operation of thermal control subsystem 800 where first valve 806 is in position B-C, second valve 808 is in position A-C, and pump 810 is operating to pump chilled water away from first heat exchanger 802. Accordingly, chilled water flows from right to left in the FIG. 9 illustration, such that chilled water flows from the chilled water supply through second valve 808, second heat exchanger 804, first heat exchanger 802, pump 810, and first valve 806 to the chilled water return, as shown by arrows along piping in FIG. 9. Thus, chilled water exchanges heat with electrical control subsystem 120(1) before exchanging heat with battery module 116(1). Additionally, controller 114 is configured to control speed of pump 810 to control flow rate of chilled water through thermal control subsystem 800.

Accordingly, thermal control subsystem 800 may control temperature of battery module 116(1) under the control of controller 114 independently of temperature of other battery modules 116 in first stack 110 by changing flow rate of chilled water flowing through first heat exchanger 802 and/or by the changing the path of chilled water flowing to first heat exchanger 802. For example, controller 114 may decrease temperature of battery module 116(1) by increasing speed of pump 810, and controller may increase temperature of battery module 116(1) by decreasing speed of pump 810. As another example, controller 114 may decrease temperature of battery module 116(1) by controlling first valve 806, second valve 808, and pump 810 to change flow of chilled water through thermal control subsystem 800 from right to left to left to right, so that chilled water is no longer preheated by electrical control subsystem 120(1) before reaching first heat exchanger 802, thereby reducing temperature of chilled water flowing through first heat exchanger 802. Conversely, controller 114 may increase temperature of battery module 116(1) by controlling first valve 806, second valve 808, and pump 810 to change flow of chilled water through thermal control subsystem 800 from left to right to right to left, so that chilled water is preheated by electrical control subsystem 120(1) before reaching first heat exchanger 802, thereby increasing temperature of chilled water flowing through first heat exchanger 802.

Figure 10:
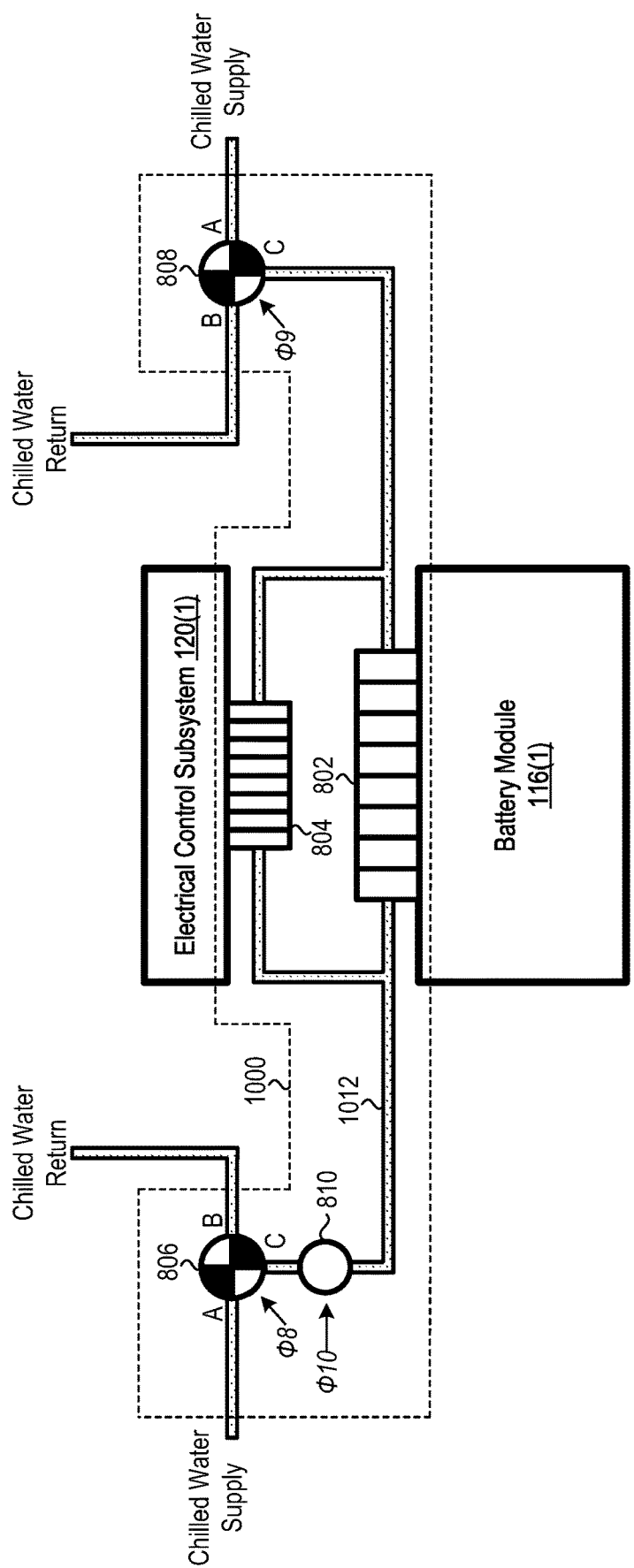
FIG. 10 is a schematic diagram of an alternate embodiment of the FIG. 8 thermal control subsystem where chilled water flows through two heat exchangers in parallel, instead of in series.

Modifications to thermal control subsystem 800 are possible. For example, pump 810 could be omitted in embodiments where it is not necessary to control flow rate of chilled water through thermal control subsystem 800. As another example, first valve 806, second valve 808, and pump 810 could be replaced with a plurality of pumps and associated check valves configured to control both path and flow rate of chilled water through thermal control subsystem 800 under the control of controller 114. Additionally, thermal control subsystem 800 could be modified to work with a liquid heat transfer fluid other than water. Furthermore, thermal control subsystem 800 could be modified so that chilled water flows through first heat exchanger 802 and second heat exchange 804 in parallel, instead of in series. For example, FIG. 10 is a schematic diagram of a thermal control subsystem 1000, which is an alternate embodiment of thermal control subsystem 800 where piping 812 is replaced with piping 1012 such first heat exchanger 802 and second heat exchanger 804 are connected in parallel, instead of in series. Thermal control subsystem 1000 operates in the same manner as thermal control subsystem 800 except that chilled water flowing through second heat exchanger 804 cannot be preheated by heat from battery module 116, and chilled water flowing through first heat exchanger 802 cannot be preheated by heat from electrical control subsystem 120(1).

Figure 11:
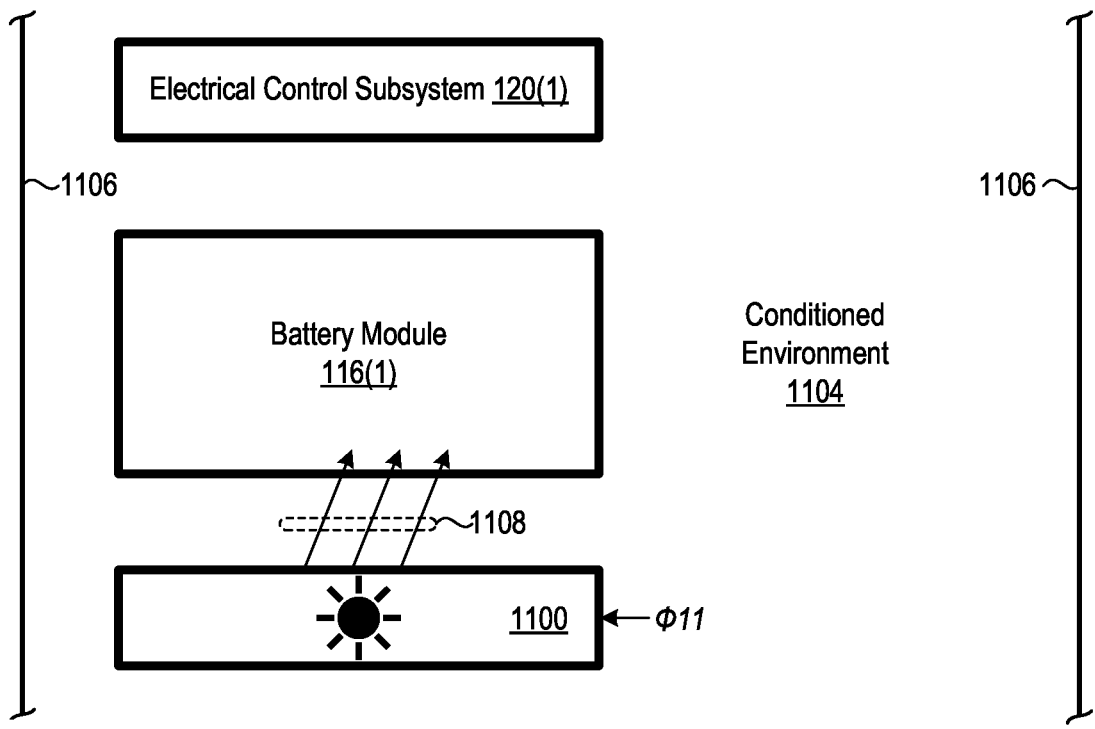
FIG. 11 is a schematic diagram of one embodiment of a thermal control subsystem of the FIG. 1 energy storage system, where the thermal control subsystem is configured to control temperature of a battery module by individually heating the battery module.

FIG. 11 is a schematic diagram of a thermal control subsystem 1100, which is one example embodiment of thermal control subsystem 122(1) configured to individually control temperature of battery module 116(1) by heating battery module 116(1). It is understood that other instances of thermal control subsystem 122, as well as instances of thermal control subsystem 130, could be embodied in a manner similar to that of thermal control subsystem 1100. Thermal control subsystem 1100 is configured to be used in embodiments of energy storage system 102 where shared thermal infrastructure 132 includes a conditioned environment 1104 at least partially bounded by partitions or plenum walls 1106. Shared thermal infrastructure 132 is configured to maintain temperature of conditioned environment 1104 at a temperature that is sufficient for cooling battery modules 116 and electrical control subsystems 120 of first stack 110. Accordingly, battery module 116(1) is cooled by virtue of being located in conditioned environment 1104. However, shared thermal infrastructure 132 is not capable of individually controlling temperature of battery module 116(1) in this embodiment.

Thermal control subsystem 1100, though, is configured to individually control temperature of battery module 116(1) by heating battery module 116(1) under the control of controller 114. Specifically, thermal control subsystem 1100 is configured as a heating device configured to variably generate heat 1108 in response to a control signal ϕ11 generated by controller 114. Thermal control subsystem 1100 includes, for example, an ohmic heater, an infrared heat source, a hot water coil, a steam coil, or a heat pump condenser coil. Thermal control subsystem 1100 is thermally coupled to battery module 116(1) such that heat 1108 generated by thermal control subsystem 1100 heats battery module 116(1). Accordingly, thermal control subsystem 1100 can control temperature of battery module 116(1) under the control of controller 114 independently of temperature of other battery modules 116 of first stack 110 by varying amount of heat 1108 generated by thermal control subsystem 1100. For example, controller 114 can decrease the temperature of battery module 116(1) by controlling thermal control subsystem 1100 to reduce the amount of generated heat 1108, and controller 114 can increase the temperature of battery module 116(1) by controlling thermal control subsystem 1100 to increase the amount of generated heat 1008. In some alternate embodiments, thermal control subsystem 1100 is at least partially integrated with electrical control subsystem 120(1). For example, in particular alternate embodiments, thermal control subsystem 1100 is implemented by an ohmic heating device on a printed circuit board (PCB) of electrical control subsystem 120(1).

Figure 12:
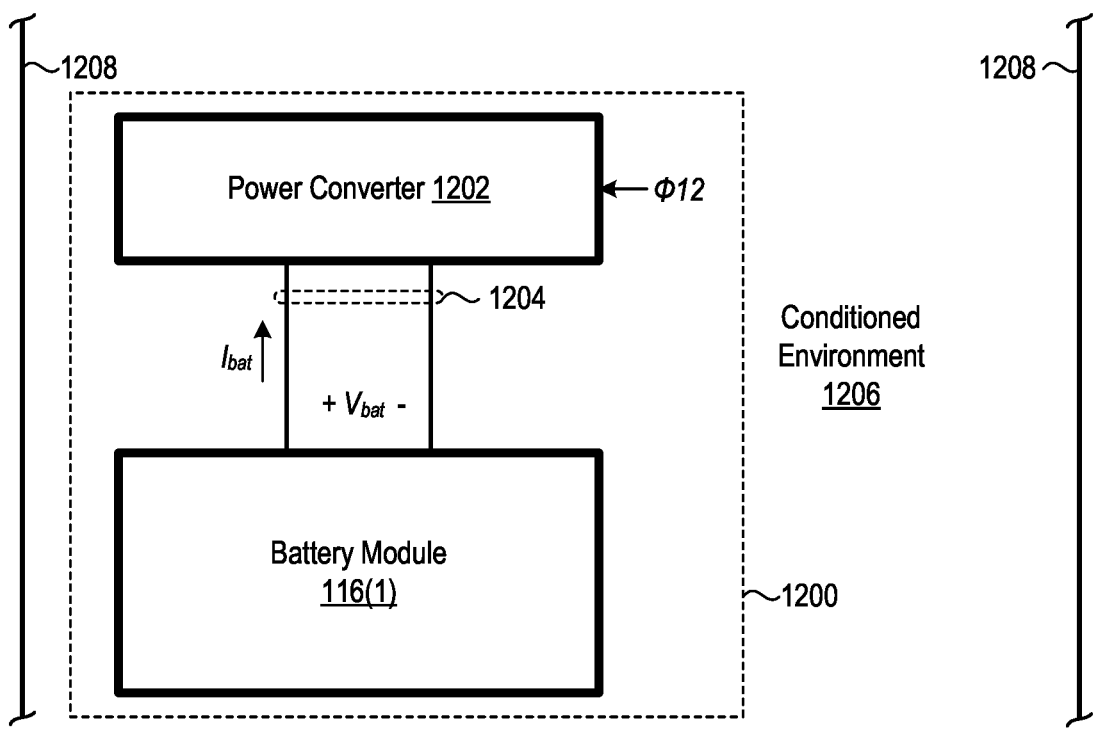
FIG. 12 is a schematic diagram of one embodiment of a battery management system (BMS) node of the FIG. 1 energy storage system where the BMS node includes a power converter implementing functions of both an electrical control subsystem and a thermal control subsystem.

FIG. 12 is a schematic diagram of a BMS node 1200, which is one example embodiment of BMS node 118(1) where electrical control subsystem 120(1) and thermal control subsystem 122(1) are integrated into a common element. It is understood that other instances of BMS node 118 of first stack 110, as well as instances of BMS node 126 of second stack 112, could be embodied in a manner similar to that of BMS node 1200. BMS node 1200 includes battery module 116(1), a power converter 1202, and electrical conductors 1204 electrically coupling power converter 1202 to battery module 116(1). Power converter 1202 is, for example, an embodiment of power converter 402 of FIG. 4. As discussed below, power converter 1202 implements functions of each of electrical control subsystem 120(1) and thermal control subsystem 122(1). BMS node 1200 is configured to be used in embodiments of energy storage system 102 where shared thermal infrastructure 132 includes a conditioned environment 1206 at least partially bounded by partitions or plenum walls 1208. Shared thermal infrastructure 132 is configured to maintain temperature of conditioned environment 1206 at a temperature that is sufficient for cooling battery modules and electrical control subsystems of first stack 110. Accordingly, battery module 116(1) is cooled by virtue of being located in conditioned environment 1206. However, shared thermal infrastructure 132 is not capable of individually controlling temperature of battery module 116(1) in this embodiment.

Power converter 1202 is configured to control electrical operation of battery module 116(1) in response to one or more control signals ϕ12 generated by controller 114, such as by controlling magnitude of battery module voltage $V_{bat}$ or by controlling magnitude of battery module current $I_{bat}$. Additionally, power converter 1202 is configured to affect temperature of battery module 116(1) in response to one or more control signals ϕ12 generated controller 114 independently of temperature of other battery modules 116 of first stack 110 by controlling a waveform of current $I_{bat}$ to control self-heating of electrochemical cells, e.g., electrochemical cells 202 of FIG. 2, of battery module 116(1). In particular, each electrochemical cell of battery module 116(1) has a parasitic resistance, and power dissipation associated with the resistance is proportional to a square of magnitude of current flowing through the resistance. As such, self-heating of battery module 116(1) increases with increasing peak magnitude of current $I_{bat}$. Accordingly, some embodiments of power converter 1202 are configured to control temperature of battery module 116 by controlling a peak magnitude of current $I_{bat}$ while keeping an average value of current $I_{bat}$ constant.

Figure 13:
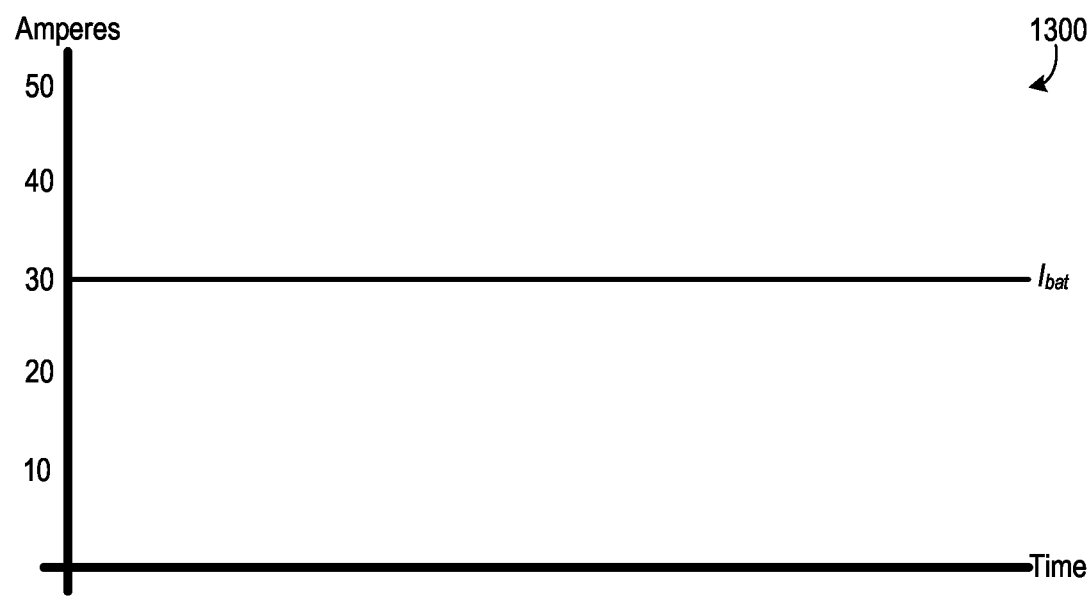
FIG. 13 is a graph of magnitude of battery current versus time illustrating one example of operation of the FIG. 12 power converter.

For example, FIG. 13 is a graph 1300 of magnitude of current $I_{bat}$ versus time illustrating one example of operation of power converter 1202. In this example, power converter 1202 controls magnitude of current $I_{bat}$ such that magnitude of current $I_{bat}$ is constant at 30 amperes. As such, magnitude of power dissipation ($P_r$) in battery module 116(1) from self-heating due to parasitic resistance of battery module 116(1) is given by EQN. 1 below, where $R_{bat}$ is parasitic resistance of battery module 116(1).

$$P_r = (30)^2 \cdot R_{bat} = 900 \cdot R_{bat} \tag{EQN. 1}$$

Figure 14:
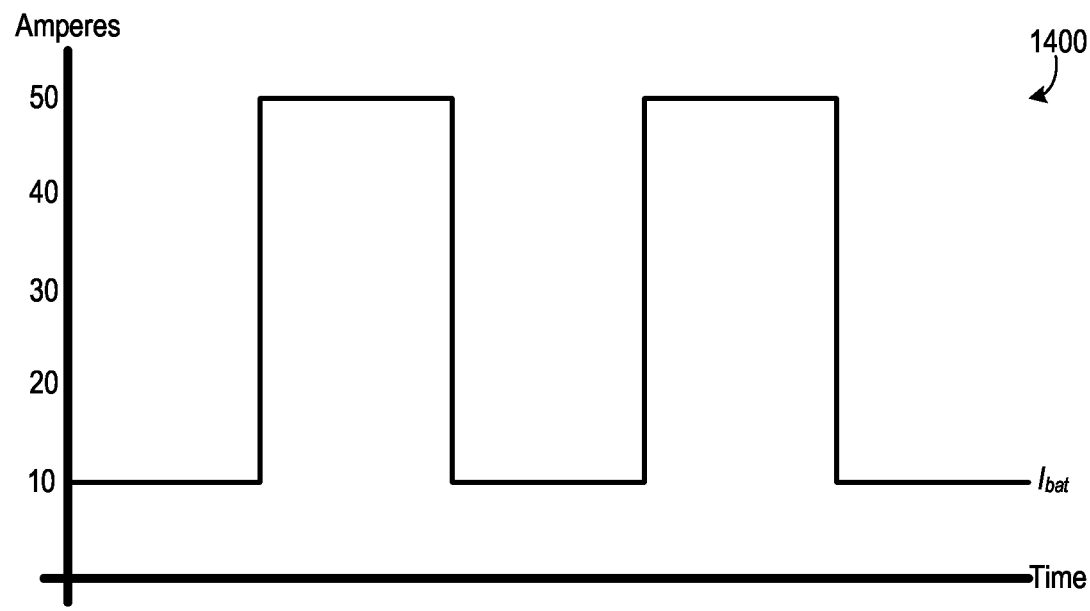
FIG. 14 is a graph of magnitude of battery current versus time illustrating another example of operation of the FIG. 12 power converter.

FIG. 14 is a graph 1400 of magnitude of current $I_{bat}$ versus time illustrating another example of operation of power converter 1202. In this example, power converter 1202 controls magnitude of current $I_{bat}$ such that magnitude of current $I_{bat}$ repeatedly transitions between a magnitude of 50 amperes and 10 amperes with a duty cycle of fifty percent. Average value of current $I_{bat}$ is still 30 amperes, but magnitude of $P_r$ in battery module 116(1) from self-heating when subjected to current waveform of FIG. 14 is given by EQN. 2 below. As evident when comparing EQNS. 1 and 2, the large peak value of the FIG. 14 waveform significantly increases power dissipation in battery module 116(1) relative to the FIG. 13 waveform even though average current value is the same for both waveforms. Accordingly, controller 114 can increase the temperature of battery module 116(1) by controlling power converter 1202 to increase a peak magnitude of current $I_{bat}$ without changing average magnitude of current $I_{bat}$, and controller 114 can decrease the temperature of battery module 116(1) by controlling power converter 1202 to decrease a peak magnitude of current $I_{bat}$ without changing average magnitude of current $I_{bat}$.

$$P_2 = \frac{(50)^2 \cdot R_{bat} + (10)^2 \cdot R_{bat}}{2} = 1,300 \cdot R_{bat} \tag{EQN. 2}$$

Figure 15:
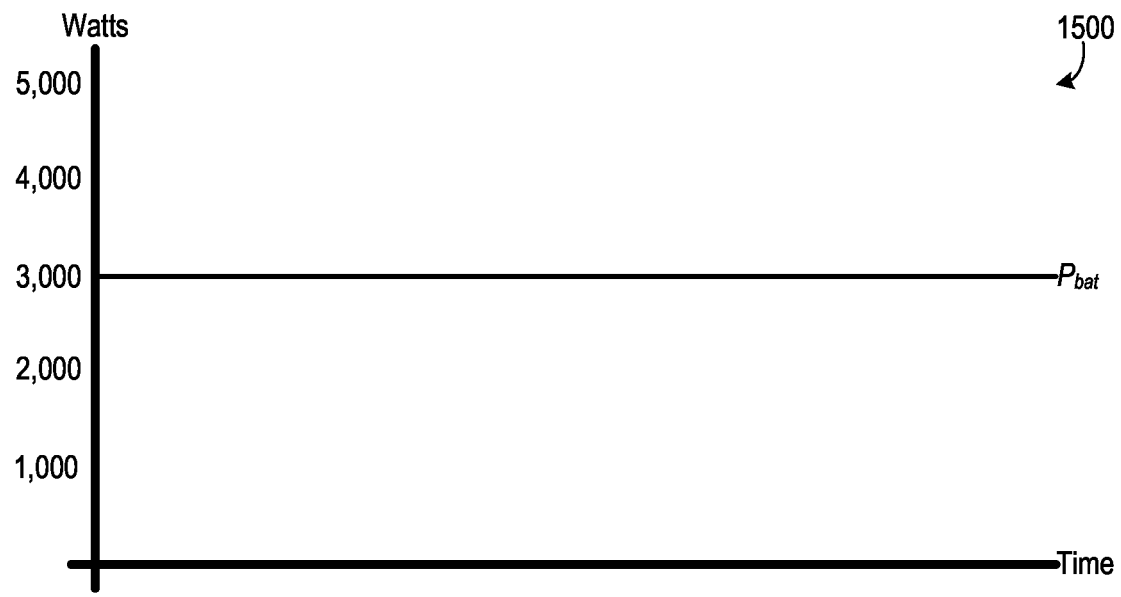
FIG. 15 is a graph of power versus time illustrating one example of a battery module's power contribution when current flowing through the battery module corresponds to that illustrated in FIG. 13.
Figure 16:
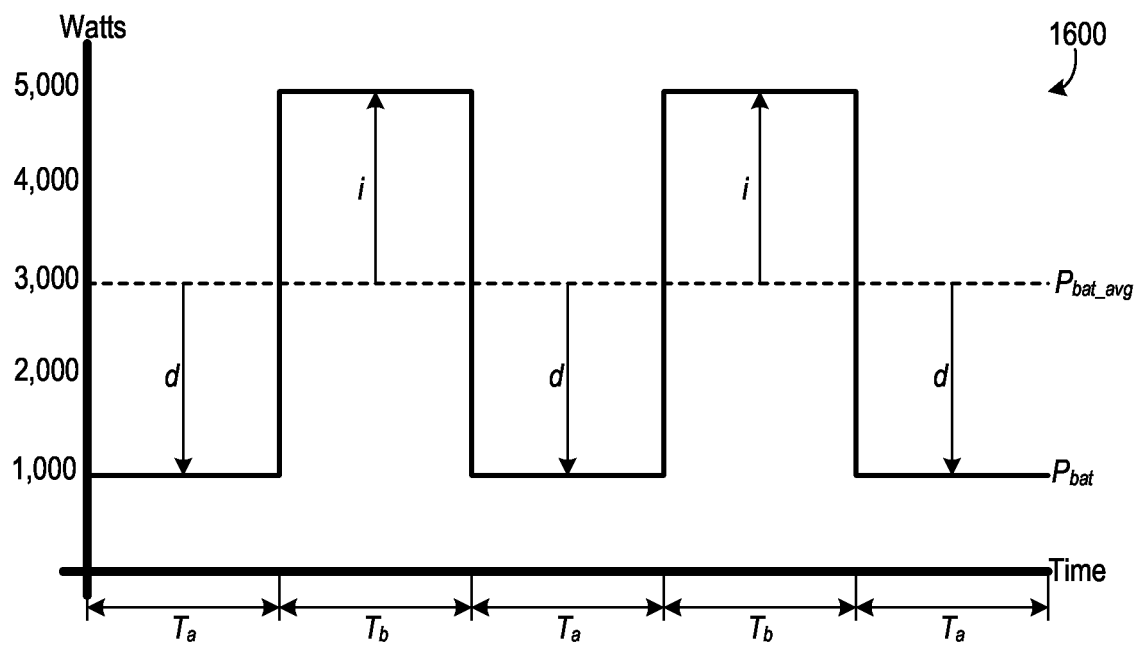
FIG. 16 is a graph of power versus time illustrating one example of a battery module's power contribution when current flowing through the battery module corresponds to that illustrated in FIG. 14.

While the changing current $I_{bat}$ from the constant value of 30 amperes of FIG. 13 to the waveform of FIG. 14 does not change average power delivered by battery module 116(1) to source/load 104, such change affects instantaneous power delivered by battery module 116(1) to source/load 104. For example, FIG. 15 is a graph 1500 of power versus time illustrating power ($P_{bat}$) delivered by battery module 116(1) to source/load 104 when (a) voltage $V_{bat}$ across battery module 116(1) is equal to 100 volts and (b) current $I_{bat}$ flowing through battery module 116(1) is as illustrated in FIG. 13. Under these conditions, battery module 116(1) delivers a constant power of 3,000 watts to source/load 104, as shown in FIG. 15. FIG. 16 is a graph 1600 of power versus time illustrating $P_{bat}$ when (a) voltage $V_{bat}$ across battery module 116(1) is equal to 100 volts and (b) current $I_{bat}$ flowing through battery module 116(1) is as illustrated in FIG. 14. Graph 1600 also includes a curve representing average power $P_{bat\_avg}$ delivered by battery module 116(1) to source/load 104 under the conditions of FIG. 16. While average power is equal to 3,000 watts under the FIG. 16 conditions, instantaneous power repeatedly transitions between 1,000 watts and 5,000 watts, as shown in FIG. 16. Such instantaneous change in power delivered by battery module 116(1) to source/load 104 may be problematic in some applications.

Accordingly, particular embodiments of controller 114 are configured to compensate for change in instantaneous operating power of a given battery module 116 or 124 due to changing the battery module's electrical operating point for temperature control purposes by changing instantaneous operating power of one or more other battery modules 116 or 124, such that total instantaneous power delivered or received by energy storage system 102 does not change. For example, consider again the FIG. 16 example. Some embodiments of controller 114 are configured to increase collective power contribution of one or more other battery modules 116 and/or 124 by 2,000 watts relative to their steady state values during time periods $T_a$, to compensate for the 2,000 watt decrease (d) in power delivered by battery module 116(1) during time periods $T_a$. Additionally, some embodiments of controller 114 are configured to decrease collective power contribution of one or more other battery modules 116 and/or 124 by 2,000 watts relative to their steady state values during time periods $T_b$, to compensate for the 2,000 watt increase (i) in power delivered by battery module 116(1) during time periods $T_b$.

Figure 17:
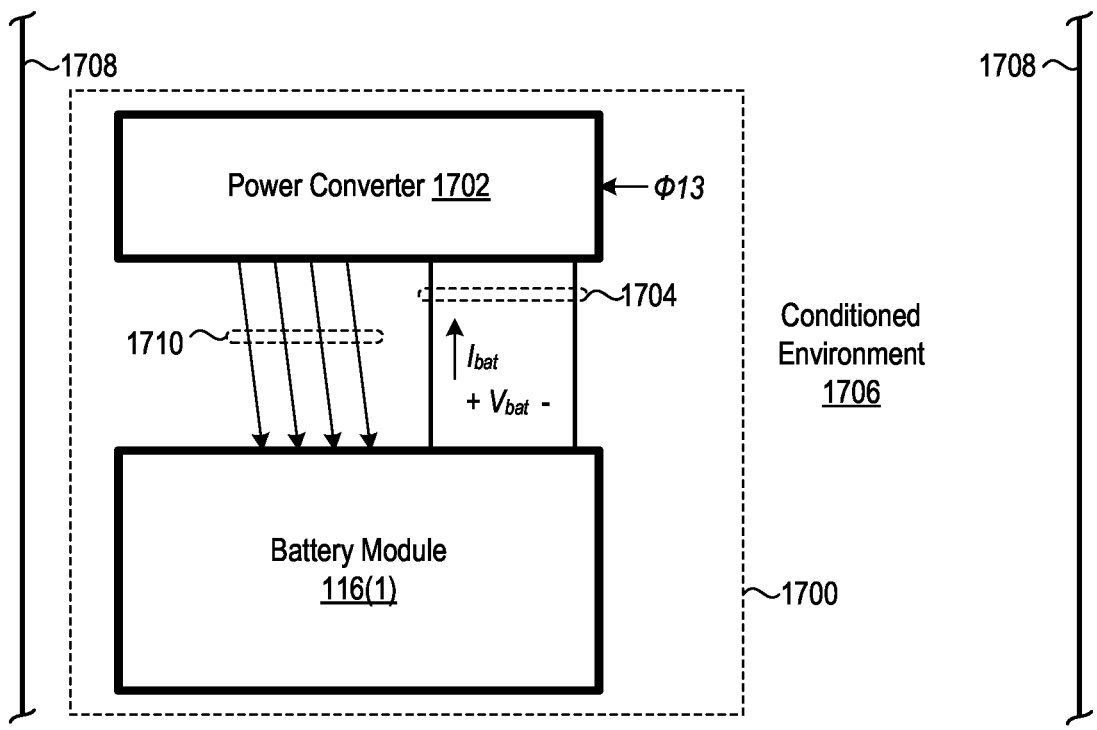
FIG. 17 is a schematic diagram of another embodiment of a BMS node of the FIG. 1 energy storage system where the BMS node includes a power converter implementing functions of both an electrical control subsystem and a thermal control subsystem.

FIG. 17 is a schematic diagram of a BMS node 1700, which is another example embodiment of BMS node 118(1) where electrical control subsystem 120(1) and thermal control subsystem 122(1) are integrated into a common element. It is understood that other instances of BMS nodes 118 of first stack 110, as well as instances of BMS nodes 126 of second stack 112, could be embodied in a manner similar to that of BMS node 1700. BMS node 1700 includes battery module 116(1), a power converter 1702, and electrical conductors 1704 electrically coupling power converter 1702 to battery module 116(1). Power converter 1702 is, for example, another embodiment of power converter 402 of FIG. 4. As discussed below, power converter 1702 implements functions of each of electrical control subsystem 120(1) and thermal control subsystem 122(1). BMS node 1700 is configured to be used in embodiments of energy storage system 102 where shared thermal infrastructure 132 includes a conditioned environment 1706 at least partially bounded by partitions or plenum walls 1708. Shared thermal infrastructure 132 is configured to maintain temperature of conditioned environment 1706 at a temperature that is sufficient for cooling battery modules and electrical control subsystems of first stack 110. Accordingly, battery module 116(1) is cooled by virtue of being located in conditioned environment 1706. However, shared thermal infrastructure 132 is not capable of individually controlling temperature of battery module 116(1) in this embodiment.

Power converter 1702 is configured to control electrical operation of battery module 116(1) in response to one or more control signals φ13 generated by controller 114, such as by controlling magnitude of battery module voltage $V_{bat}$ or by controlling magnitude of battery module current $I_{bat}$. Additionally, controller 114 is configured to control temperature of battery module 116(1) independently of temperature of other battery modules 116 in first stack 110 by controlling efficiency of power converter 1702 via one or more control signals φ13. In particular, power converter 1702 is thermally coupled to battery module 116(1), and changing efficiency of power converter 1702 changes an amount of heat 1710 generated by power converter 1702 that flows to battery module 116(1). For example, controller 114 may decrease temperature of battery module 116(1) by controlling power converter 1702 via one or more control signals φ13 to increase power converter 1702's efficiency, thereby reducing amount of heat 1710 generated by power converter 1702. As another example, controller 114 may increase temperature of battery module 116(1) by controlling power converter 1702 via one or more control signals ϕ13 to decrease power converter 1702's efficiency, thereby increasing amount of heat 1710 generated by power converter 1702.

In certain embodiments, power converter 1702 is a multiphase switching power converter, and controller 114 changes efficiency of power converter 1702 by changing a quantity of phases of the multi-phase switching power converter that are active. For example, controller 114 may increase efficiency of the multi-phase switching power converter by increasing a quantity of active phases and thereby decreasing conduction losses in the multi-phase switching power converter, and controller 114 may decrease efficiency of the multi-phase switching power converter by decreasing a quantity of active phases and thereby increasing conduction losses in the multi-phase switching power converter. Additionally, certain embodiments of power converter 1702 includes one or more field effect transistors acting as switching devices, and controller 114 changes efficiency of power converter 1702 by changing strength of gate drive of the field effect transistors. For example, controller 114 may increase efficiency of power converter 1702 by increasing strength of gate drive and thereby decreasing switching losses of power converter 1702, and controller 114 may decrease efficiency of power converter 1702 by decreasing strength of gate drive and thereby increasing switching losses of power converter 1702.

Figure 18:
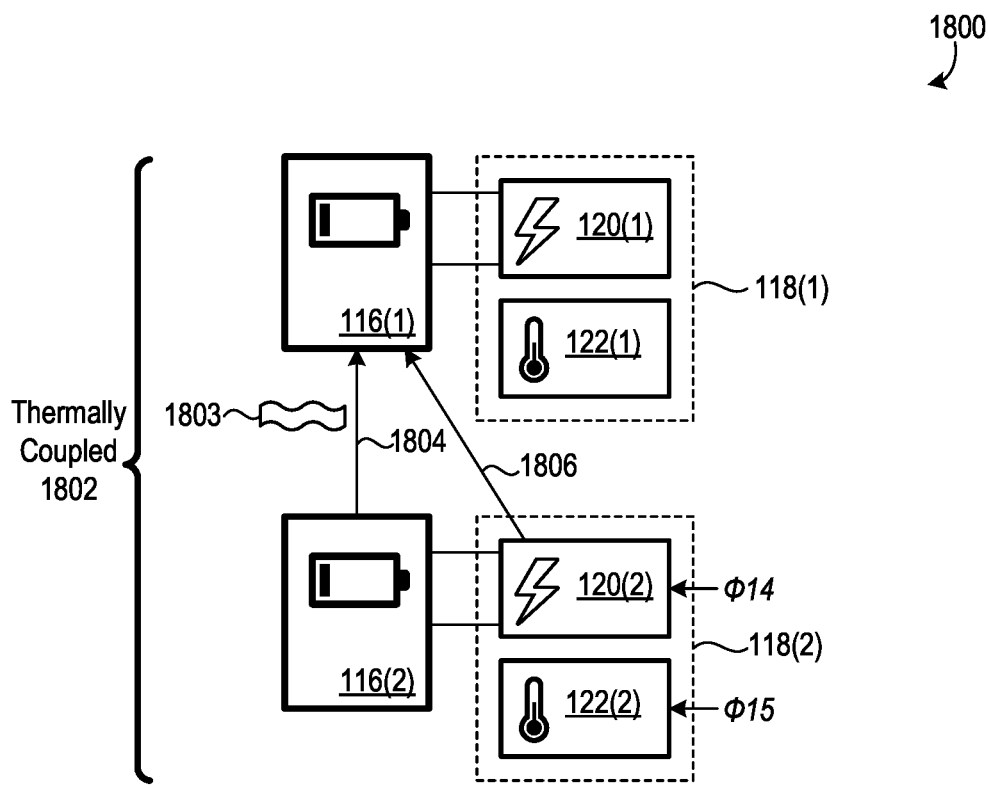
FIG. 18 is a schematic diagram of an embodiment of a portion of a stack of the FIG. 1 energy storage system where two battery modules are thermally coupled with each other.

Referring again to FIG. 1, certain embodiments of controller 114 are configured to control temperature of a given battery module 116 or 124 at least partially by varying operation of one or more neighboring battery modules 116 or 124 that are thermally coupled to the given battery module, such as in situations where the given battery module is bypassed. For example, FIG. 18 is schematic diagram of a portion 1800 of first stack 110 in an embodiment of first stack 110 where first battery module 116(1) is thermally coupled 1802 with second battery module 116(2), such as by one or more of thermal radiation, thermal convection, and thermal conduction. Additionally, in some embodiments, first battery module 116(1) and second battery module 116(2) are thermally coupled at least partially by transfer of heat via a heat transfer fluid 1803 (e.g., air or water) flowing between first battery module 116(1) and second battery module 116(2).

In this embodiment, controller 114 is configured to control temperature of battery module 116(1) at least partially by controlling BMS node 118(2) of battery module 116(2). For example, controller 114 may control electrical control subsystem 120(2) via a control signal ϕ14 generated by controller 114 to vary an amount of heat 1804 generated by battery module 116(2) that flows to battery module 116(1), thereby controlling temperature of battery module 116(1) via operation of neighboring battery module 116(2). For instance, controller 114 may control electrical control subsystem 120(2) to increase a peak magnitude of current flowing through battery module 116(2), such as in a manner similar to that discussed above with respect to FIG. 12 and battery module 116(1), to increase heat 1804 generated by battery module 116(2) which flows to battery module 116(1), thereby increasing temperature of battery module 116(1). As another example, controller 114 may control electrical control subsystem 120(2) to decrease a peak magnitude of current flowing through battery module 116(2) to decrease heat 1804 generated by battery module 116(2) which flows to battery module 116(1), thereby decreasing temperature of battery module 116(1).

Additionally, in some embodiments, electrical control subsystem 120(2) is thermally coupled to battery module 116(1), and controller 114 is configured to control temperature of battery module 116(1) at least partially by changing efficiency of electrical control subsystem 120(2) via control signal ϕ14, thereby controlling an amount of heat 1806 generated by electrical control subsystem 120(2) that flows to battery module 116(1). For example, controller 114 may control thermal control subsystem 120(2) to decrease an efficiency of a power converter included therein, such as in a manner similar to that discussed above with respect to FIG. 17, to increase heat 1806 generated by electrical control subsystem 120(2) which flows to battery module 116(1), thereby increasing temperature of battery module 116(1). Furthermore, in some embodiments, controller 114 is configured to control operation of thermal control subsystem 122(2) via a control signal ϕ15 generated by controller 114, thereby changing temperature of battery module 116(2) and affecting flow of heat 1804 from battery module 116(2) to battery module 116(1). For example, in some embodiments, controller 114 is configured to control thermal control subsystem 122(2) to change a path, temperature, and/or flow rate of heat transfer fluid that is thermally coupled to battery module 116(2), such as in a manner analogous to discussed above with respect to one or more of FIGS. 5-10, thereby directly changing temperature of battery module 116(2) and indirectly changing temperature of battery module 116(1).

Referring again to FIG. 1, in particular embodiments of energy storage system 102, controller 114 is configured to control operation of BMS nodes 118 and 126 to implement one or more thermal management strategies in energy storage system 102. Accordingly, controller 114 and BMS nodes 118 and 126 collectively implement an embodiment of the new systems for thermal management of an energy storage system disclosed herein. Such thermal management strategies may be applied, for example, on an individual battery module 116 or 124 basis, such that different respective thermal management strategies may be applied to two or more battery modules 116 or 124. For example, a first thermal management strategy may be applied to battery module 116(1) of first stack 110, and a second thermal management strategy that is different from the first thermal management strategy may be applied to battery module 116(2) of first stack 110.

Additionally, respective thermal management strategies may be applied to groups of battery modules 116 or 124. For example, a first thermal management strategy may be applied to all battery modules 116 of first stack 110, and a second thermal management strategy that is different from the first thermal management strategy may be applied to all battery modules 124 of second stack 112. As another example, a first thermal management strategy may be applied to a first subset of battery modules 116 of first stack 110, and a second thermal management strategy that is different from the first thermal management strategy may be applied to a second subset of battery modules 116 of first stack 110. Furthermore, a common thermal management strategy may be applied to all battery modules 116 and 124 of energy storage system 102.

Examples of thermal management strategies include, but are not limited to, maintaining a temperature profile of one or more battery modules, maintaining a diagnostic temperature profiles of one or more battery modules, and warming one or more battery modules in preparation for charging the battery modules. Discussed below are several examples of thermal management strategies that may be applied to battery modules 116 and 124 in energy storage system 102. It is understood, though, that energy storage system 102 is not limited to implementing the example thermal management strategies discussed below. Furthermore, it should be noted that multiple thermal management strategies may be executed simultaneously in particular embodiments of energy storage system 102. For example, multiple thermal management strategies may be simultaneously applied to a single battery module 116 or 124 in some embodiments of energy storage system 102. As another example, different thermal management strategies may be simultaneously applied to two different respective battery modules 116 of first stack 110, or to two different respective battery modules 124 of second stack 112, in certain embodiments of energy storage system 102.

Maintaining Desired Battery Module Temperature Profiles

Particular embodiments of controller 114 are configured to control BMS nodes 118 and 126 to maintain desired temperature profiles of battery modules 116 and 124, such as by controlling temperature of the battery modules using one or more of the approaches discussed above with respect to FIGS. 5-18. In this document, a "temperature profile" of a battery module represents temperature of the battery module over a specified duration of time. Particular embodiments of controller 114 are configured to determine a respective actual temperature profile of each battery module 116 and 124 by recording a plurality of temperature measurements of each battery module, such as temperature measurements obtained using temperature sensors analogous to temperature sensor 208 of FIG. 2, over a specified duration of time. In some embodiments, controller 114 is configured to control BMS nodes 118 and 126 such that a different respective temperature profile may be simultaneously maintained for each battery module 116 and 124, such as to help optimize operation of each battery module 116 and 124 according to its unique condition, operating environment, and/or operating state. For example, controller 114 may be configured to control BMS node 118(1) to maintain a first desired temperature profile of battery module 116(1) while simultaneously controlling BMS node 118(2) to maintain a second desired temperature profile for battery module 116(2), where the second desired temperature profile is different from the first desired temperature profile. It is understood, though, that a common desired temperature profile could be maintained for two or more battery modules 116 and/or 124, such as to maintain an uniform temperature across two or more battery modules 116 and/or 124. A desired temperature profile may be either static or dynamic. Discussed below are several examples of desired temperature profiles of battery modules 116 and 124 that may be maintained by controller 114 controlling BMS nodes 118 and/or 126 appropriately. It is understood, though, that controller 114 and BMS nodes 118 and 126 are not limited to maintaining the example desired temperature profiles discussed below. To the contrary, controller 114 and BMS nodes 118 and 126 could potentially be configured to maintain essentially any desired temperature profile, albeit subject to constraints imposed by capabilities of thermal control subsystems 122 and 130.

(A) State of charge (SOC) desired temperature profile: a desired temperature profile of a battery module 116 or 124 may be a function of SOC of the battery module, or stated differently, the desired temperature profile of the battery module may change as SOC of the battery module changes.

(B) State of degradation (SOD) desired temperature profile: a desired temperature profile of a battery module 116 or 124 may be a function of SOD of the battery module, or stated differently, the desired temperature profile of the battery module may change as SOD of the battery module changes.

(C) State of health (SOH) desired temperature profile: a desired temperature profile of a battery module 116 or 124 may be a function of SOH of the battery module, or stated differently, the desired temperature profile of the battery module may change as SOH of the battery module changes.

(D) State of safety (SOS) desired temperature profile: a desired temperature profile of a battery module 116 or 124 may be a function of SOS of the battery module, or stated differently, the desired temperature profile of the battery module may change as SOS of the battery module changes.

(E) Charging desired temperature profile: a desired temperature profile of a battery module 116 or 124 may represent a desired temperature range of a battery module 116 or 124 while charging the battery module, such as to ensure that the battery module is sufficiently warm before beginning charging.

(F) Soaking desired temperature profile: a desired temperature profile of a battery module 116 or 124 may be a soaking temperature profile representing a desired temperature range of a battery module 116 or 124 to be maintained for a specified time duration, such as for a specified time duration in preparation for performing a diagnostic test on the battery module, to achieve a desired electrochemical response of the battery module, etc. For example, a soaking temperature profile may specify maintaining a battery module 116 or 124 at a particular temperature while the battery module is at rest, i.e., while the battery module is not operating, to at least partially reverse degradation of the battery module, such as by at least partially reversing dendrite formation.

(G) Diagnostic temperature profile: a desired temperature profile of a battery module 116 or 124 may be a diagnostic temperature profile representing a desired temperature range of the battery module while performing a diagnostic test on the battery module.

(H) Compensation temperature profile: a desired temperature profile of a battery module 116 or 124 may be a compensation temperature profile to compensate for intrinsic difference in temperature among battery modules 116 or 124. For example, assume that battery module 116(1) is prone to operate at a higher temperature than an average temperature of battery modules 116 in first stack 110 due to battery module 116(1) being located at the top of first stack 110. A compensation temperature profile may be applied to battery module 116(1) to compensate for battery module 116(1) being intrinsically warmer than other battery modules 116 of first stack 110, to prevent battery module 116(1) from operating at an undesirably high temperature.

Additionally, a desired temperature profile may be a function of a plurality of parameters, such as two or more of SOC, SOD, SOH, and SOS of a battery module 116 or 124. For example, a desired temperature profile may be a function of both SOC and SOS of a battery module 116 or 124.

In some embodiments, controller 114 is configured to determine from time to time, e.g., periodically, whether an actual temperature profile of a battery module 116 or 124 differs from a desired temperature profile of the battery module by at least a predetermined threshold amount, and if so, control one or more BMS nodes 118 and/or 126 in a manner which reduces the difference between the actual temperature profile and the desired temperature profile of the battery module, optionally independently of a temperature profile of one or more other battery modules 116 and 124 of energy storage system 102.

Figure 19:
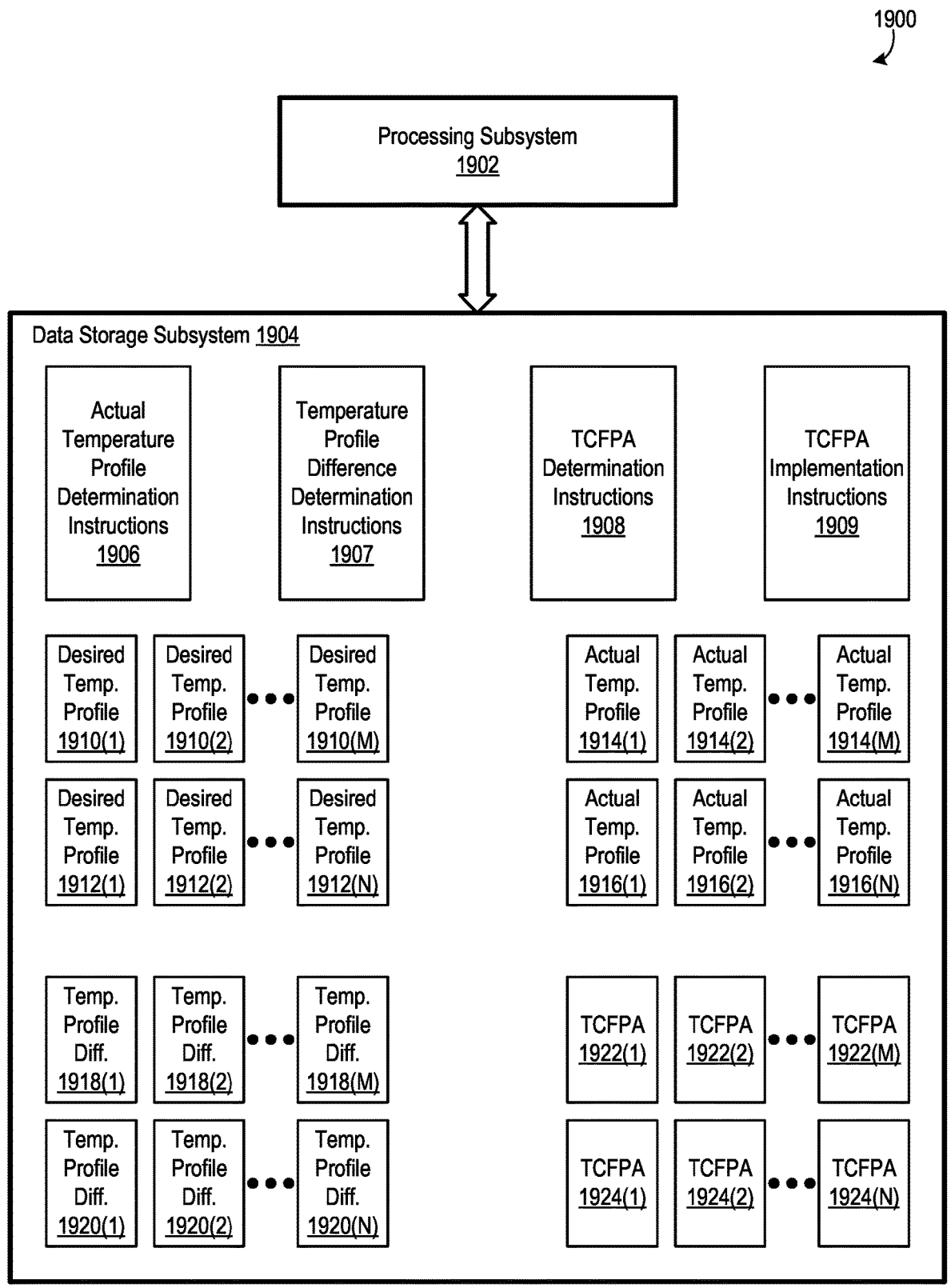
FIG. 19 is a block diagram of one embodiment of a controller of the FIG. 1 energy storage system that is configured to control BMS nodes to maintain respective desired temperature profiles of battery modules of the FIG. 1 energy storage system.

For example, FIG. 19 is a block diagram of a controller 1900, which is one embodiment of controller 114 configured to control BMS nodes 118 and 126 to maintain respective desired temperature profiles of battery modules 116 and 124. Controller 1900 includes a processing subsystem 1902 and a data storage subsystem 1904, where processing subsystem 1902 is communicatively coupled to data storage subsystem 1904. While processing subsystem 1902 and data storage subsystem 1904 are each depicted as being a single element, either of processing subsystem 1902 or data storage subsystem 1904 could include a plurality of elements that need not be co-located. For example, elements of controller 1900 could be implemented by a distributed computing system, such as a cloud computing system. Additionally, while processing subsystem 1902 and data storage subsystem 1904 are depicted as being separate elements, they could alternately be partially or fully integrated.

Figure 20:
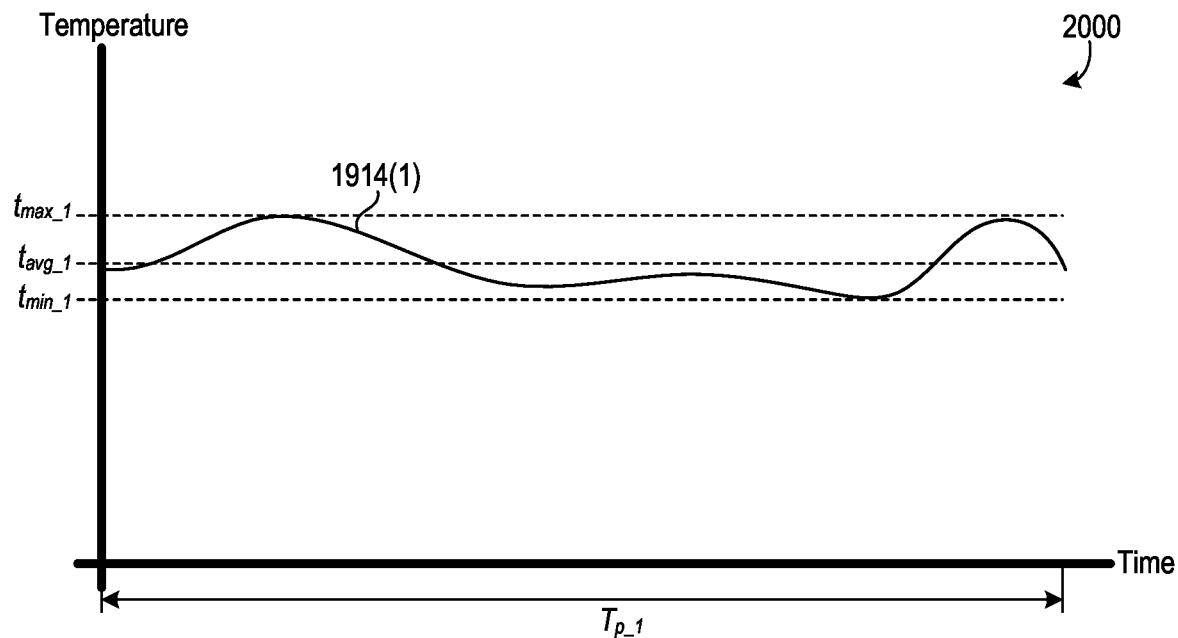
FIG. 20 is a graph of temperature versus time illustrating one example of an actual temperature profile of a battery module.

Data storage subsystem 1904 stores, for example, actual temperature profile determination instructions 1906, temperature profile difference determination instructions 1907, temperature control factor profile adjustment (TCFPA) determination instructions 1908, TCFPA implementation instructions 1909, a desired temperature profile 1910 for each battery module 116, a desired temperature profile 1912 for each battery module 124, an actual temperature profile 1914 for each battery module 116, an actual temperature profile 1916 for each battery module 124, a temperature profile difference 1918 for each battery module 116, a temperature profile difference 1920 for each battery module 124, an TCFPA 1922 for each battery module 116, and an TCFPA 1924 for each battery module 124. Processing subsystem 1902 is configured to execute actual temperature profile determination instructions 1906 to determine a respective actual temperature profile 1914 for each battery module 116 and a respective actual temperature profile 1916 for each battery module 124, such as from temperature measurement data obtained from each battery module 116 and 124 over a specified time duration. For example, processing subsystem 1902 may determine actual temperature profiles 1914 and 1916 by polling BMS nodes 118 and 126 to obtain temperature data, such as from a respective temperature sensor of each battery module 116 or 124. As another example, processing subsystem 1902 may determine actual temperature profiles 1914 and 1916 by recording battery module 116 and 124 temperature data pushed to controller 114 over a specified time duration. FIG. 20 is a graph 2000 of temperature versus time illustrating one example of actual temperature profile 1914(1) of battery module 116(1). In the FIG. 20 example, actual temperature profile 1914(1) spans a specified time duration $T_{p\_I}$ and temperature of battery module 116(1) ranges from a minimum value $t_{min\_I}$ to a maximum value $t_{max\_I}$, with an average value of $t_{avg\_I}$, during time duration $T_{p\_I}$.

Returning to FIG. 19, processing subsystem 1902 is additionally configured to execute temperature profile difference determination instructions 1907 to determine a respective temperature profile difference 1918 for each battery module 116 and a respective temperature profile difference 1920 for each battery module 124. Each temperature profile difference 1918 and 1920 represents a difference between an actual temperature profile 1914 or 1916 of a respective battery module 116 or 124 and the desired temperature profile 1910 or 1912 of the respective battery module 116 or 124. In particular, each temperature profile difference 1918 represents a difference between an actual temperature profile 1914 and a desired temperature profile 1910 of a respective battery module 116, and each temperature profile difference 1920 represents a difference between an actual temperature profile 1916 and a desired temperature profile 1912 of a respective battery module 124. Each temperature profile difference 1918 and 1920 could be either a single value, e.g., a difference between an average value of an actual temperature profile and an average value of a desired temperature profile, or a plurality of values, e.g., a difference between an actual temperature profile and a desired temperature profile at two or more times over a specified time duration of the temperature profile.

Figure 21:
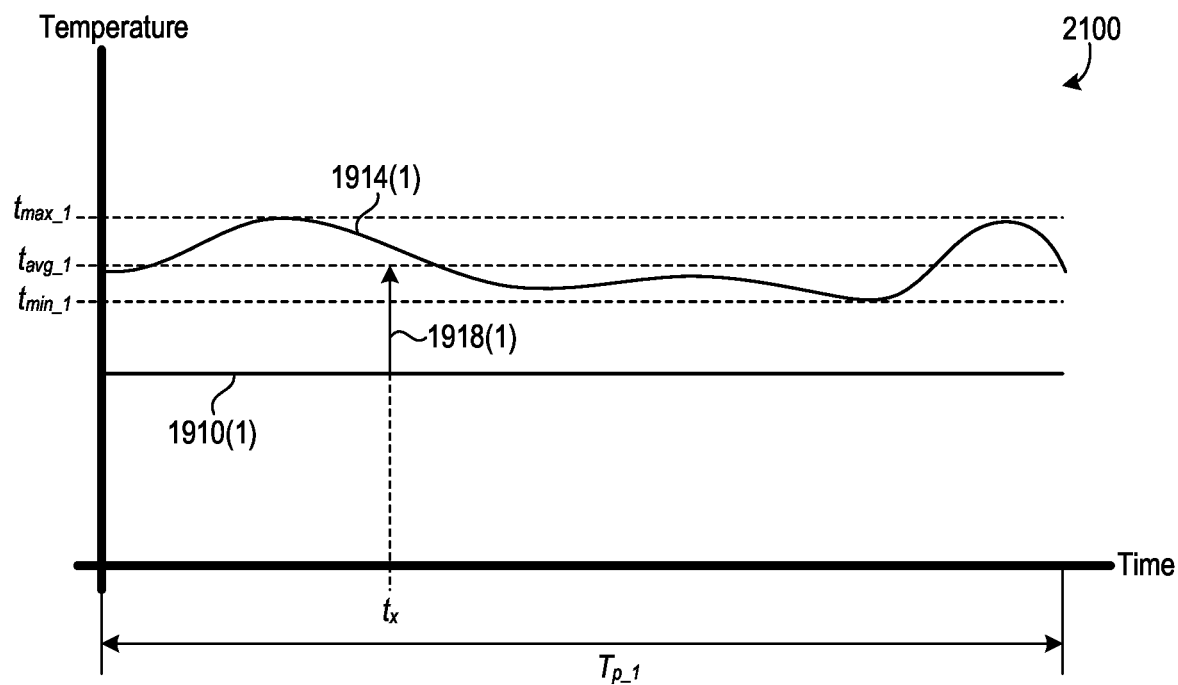
FIG. 21 is a graph of temperature versus time illustrating one example of a temperature profile difference of a battery module.

FIG. 21 is a graph 2100 of temperature versus time illustrating one example of temperature profile difference 1918(1) of battery module 116(1). Graph 2100 illustrates an example actual temperature profile 1914(1) (same example as that of FIG. 20) and an example desired temperature profile 1910(1). An arrow in FIG. 21 illustrates temperature profile difference 1918(1), which is the difference between actual temperature profile 1914(1) and desired temperature profile 1910(1) of battery module 116(1) in the FIG. 21 example at a given time $t_x$. In this example, actual temperature profile 1914(1) is significantly higher than desired temperature profile 1910(1), such that battery module 116(1) is operating at a significantly higher temperature than desired. Temperature profile difference 1918(1) is a single value in the FIG. 21 example, i.e., temperature profile difference 1918(1) is a difference between average value $t_{avg\_I}$ of actual temperature profile 1914(1) and desired temperature profile 1910(1), but temperature profile difference 1918(1) could alternately include a plurality of values, e.g., a difference between actual temperature profile 1914(1) and desired temperature profile 1910(1) at a plurality of times during specified time duration $T_{p\_I}$.

Referring again to FIG. 19, processing subsystem 1902 is additionally configured to execute TCFPA determination instructions 1908 to determine a respective TCFPA 1922 for each battery module 116 and a respective TCFPA 1924 for each battery module 124. In this document, a temperature control factor (Q) of a battery module represents a desired setpoint for heating or cooling of the battery module, such as to achieve a desired actual temperature profile. Magnitude of a temperature control factor represents the magnitude of desired setpoint for heating or cooling of the battery module, i.e., the greater the magnitude of a temperature control factor, the greater the heating or cooling of a battery module. A temperature control factor may be positive, negative, or zero. A positive temperature control factor corresponds to active heating of a battery module. A negative temperature control factor corresponds to active cooling of a battery module. A temperature control factor of zero corresponds to no active heating or cooling of a battery module.

Each TCFPA 1922 is an operating adjustment for a respective battery module 116 representing an adjustment to the battery module's temperature control factor profile, for reducing a difference between the battery module's actual temperature profile and the battery module's desired temperature profile. Additionally, each TCFPA 1924 is an operating adjustment for a respective battery module 124 representing an adjustment to the battery module's temperature control factor profile, for reducing a difference between the battery module's actual temperature profile and the battery module's desired temperature profile. As such, each TCFPA 1922 and 1924 can be considered to represent a desired change in thermal operation of its respective battery module 116 or 124 for causing the battery module to operate closer to its respective desired temperature profile 1910 and 1912 than the battery module is currently operating at. In some embodiments, processing subsystem 1902 determines each TCFPA 1922 and 1924, for example, by (a) accessing an empirically determined lookup table relating temperature profile difference values to TCFPA values, (b) calculating the TCFPA using a thermal model of a battery module 116 or 124, (c) using a closed loop control system configured to minimize temperature profile differences, and/or (d) using artificial intelligence (AI) or a similar technique.

Processing subsystem 1902 is additionally configured to execute TCFPA implementation instructions 1909 to implement each TCFPA 1922 and 1924 by controlling one or more BMS nodes 118 and 126, such as by using one or more of the techniques discussed above with respect to FIGS. 5-18. For example, assume that TCFPA 1922(1) represents that battery module 116(1)'s temperature control factor profile is to be adjusted to increase temperature of battery module 116(1) so that it operates closer to its desired temperature profile 1910(1). Processing subsystem 1902 may accordingly execute TCFPA implementation instructions 1909 to control BMS node 118(1) to increase temperature of battery module 116(1), such as by using one or more of the techniques discussed above with respect to FIGS. 5-17. As another example, assume that TCFPA 1924(2) represents that battery module 124(2)'s temperature control factor profile is to be adjusted to decrease temperature of battery module 124(2) so that it operates closer to its desired temperature profile 1912(2). Processing subsystem 1902 may accordingly execute TCFPA implementation instructions 1909 to control BMS node 126(2) to decrease temperature of battery module 124(2), such as by using one or more of the techniques discussed above with respect to FIGS. 5-17. As a further example, assume again that TCFPA 1922(1) represents that battery module 116(1)'s temperature control factor profile is to be adjusted to increase temperature of battery module 116(1) so that it operates closer to its desired temperature profile 1910(1). Processing subsystem 1902 may accordingly execute TCFPA implementation instructions 1909 to control one or more BMS nodes associated with neighboring battery modules 116 that are thermally coupled to battery module 116(1) to increase temperature of battery module 116(1), such as by using one or more of the techniques discussed above with respect to FIG. 18.

Figure 22:
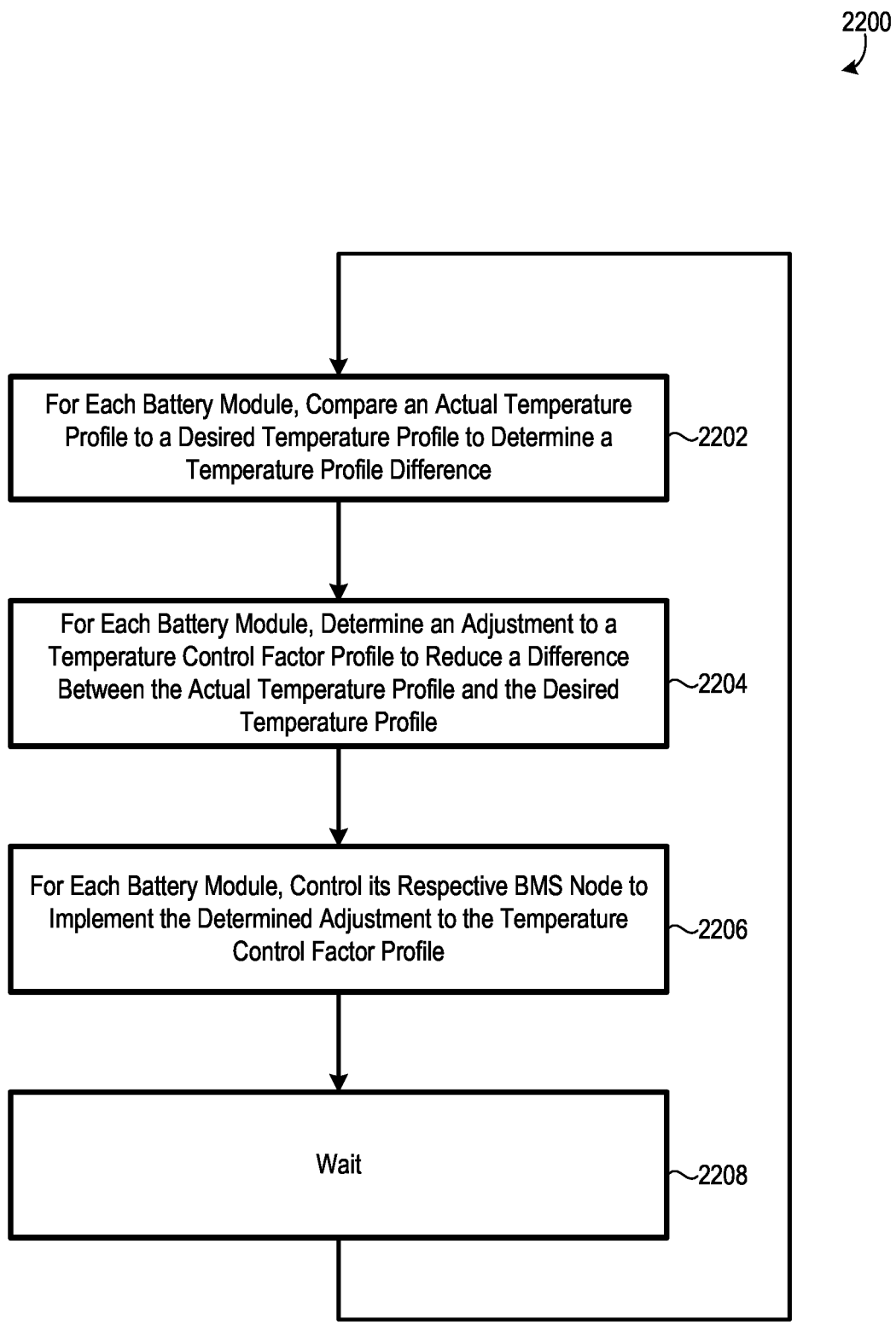
FIG. 22 illustrates a flow chart of a method for thermal management of an energy storage system performed by a controller of the energy storage system, according to an embodiment.
Figure 23:
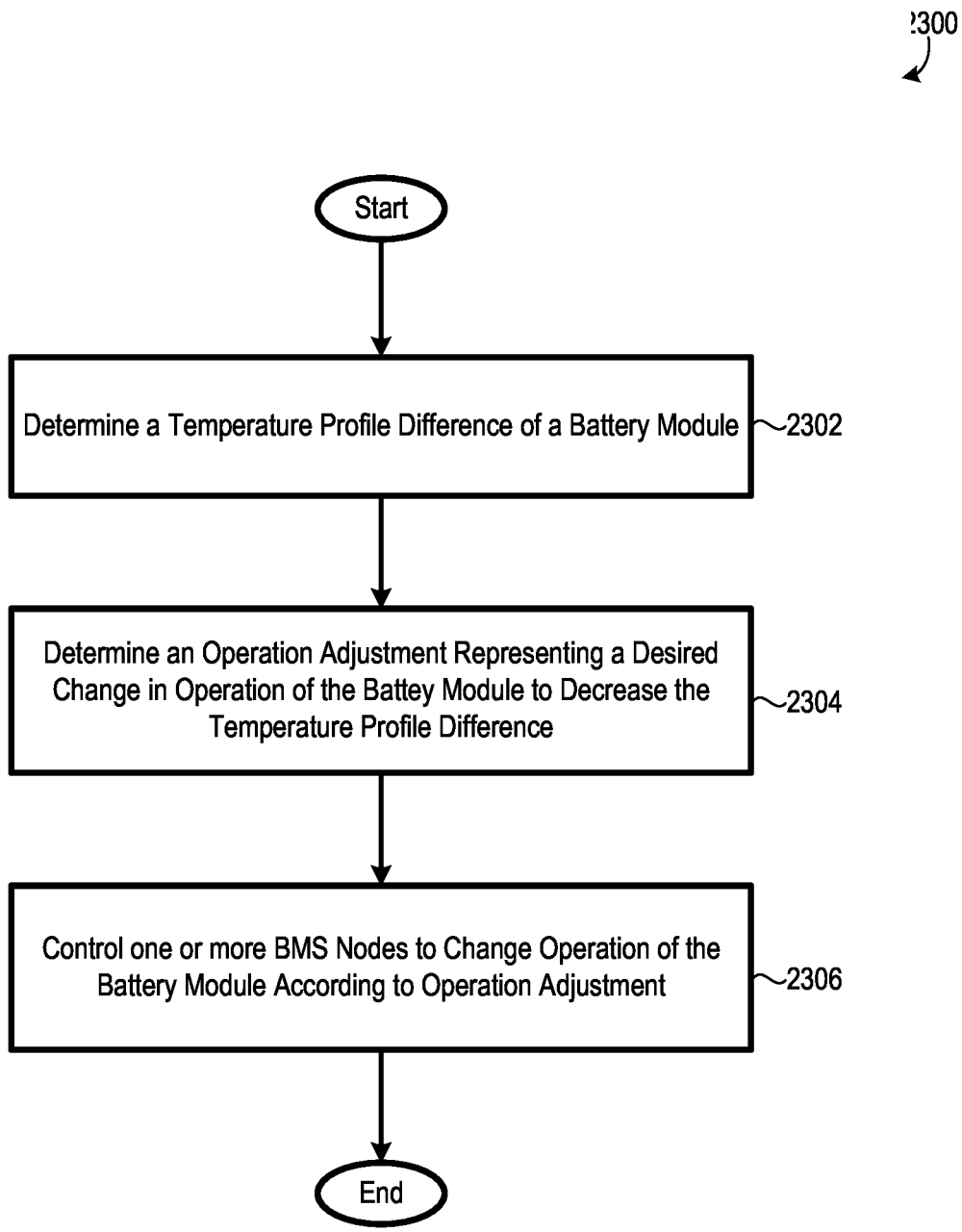
FIG. 23 illustrates a flow chart of another method for thermal management of an energy storage system performed by a controller of the energy storage system, according to an embodiment.

Discussed below with respect to FIGS. 22 and 23 are two examples of how certain embodiments of energy storage system 102 may operate to maintain a desired temperature profile of one or more battery modules 116 or 124. It is understood, though, that energy storage system 102 may operate in other manners to maintain a desired temperature profile of battery modules 116 and 124 without departing from the scope hereof.

FIG. 22 is a flow chart of a method 2200 for thermal management performed by a controller of an energy storage system, which is one example of how a controller of energy storage system 102 may operate to maintain desired temperature profiles of battery modules 116 and 124. In a block 2202 of method 2200, the controller compares, for each battery module, an actual temperature profile of the battery module to a desired temperature profile of the battery module to obtain a temperature profile difference of the battery module. In one example of block 2202, controller 1900 (FIG. 19) compares, for each battery module 116 and 124, an actual temperature profile 1914 or 1916 of the battery module to a desired temperature profile 1910 or 1912 of the battery module to determine a temperature profile difference 1918 or 1920 of the battery module, such as by processing subsystem 1902 executing temperature profile difference determination instructions 1907.

Method 2200 proceeds from block 2202 to a block 2204 where the controller determines, for each battery module, an adjustment to a temperature control factor profile of the battery module to reduce a difference between the actual temperature profile of the battery module and the desired temperature profile of the battery module. In one example of block 2204, processing subsystem 1902 executes TCFPA determination instructions 1908 to determine an adjustment to the temperature control factor profile, i.e., a TCFPA 1922 or a TCFPA 1924, for each battery module 116 or 124.

Method 2200 proceeds from block 2204 to a block 2206 where the controller controls, for each battery module, a respective BMS node of the battery module to implement the respective adjustment to the temperature control factor profile of the battery module determined in block 2204. In some alternate embodiments of block 2206, though, the controller may implement the respective adjustment to the temperature control factor profile for one or more battery modules by controlling respective BMS nodes associated with one or more neighboring battery modules, such as in a manner similar to that discussed above with respect to FIG. 18. In one example of block 2206, controller 1900 controls, for each battery module 116 or 124, a respective BMS node 118 or 126 of the battery module to implement the adjustment to the temperature control factor profile of the battery module determined in block 2204, such as using one or more of the techniques discussed above with respect to FIGS. 5-17. Method 2200 proceeds from block 2206 to a block 2208 where method 2200 waits a predetermined amount of time before returning to block 2202. Accordingly, method 2200 executes periodically with a period determined by waiting time of block 2208. In one example of block 2208, controller 1900 waits a predetermined amount of time before returning to block 2202 to determine an updated temperature profile difference for each battery module 116 and 124.

FIG. 23 is a flow chart of a method 2300 for thermal management performed by a controller of an energy storage system, which is another example of how a controller of energy storage system 102 may operate to maintain desired temperature profiles of battery modules 116 and 124. In a block 2302 of method 2300, the controller determines a temperature profile difference representing a difference between an actual temperature profile of a battery module and a desired temperature profile of the battery module. In one example of block 2302, processing subsystem 1902 executes temperature profile difference determination instructions 1907 to determine a temperature profile difference 1918(1) representing a difference between actual temperature profile 1914(1) of battery module 116(1) and desired temperature profile 1910(1) of battery module 116(1). In another example of block 2302, processing subsystem 1902 executes temperature profile difference determination instructions 1907 to determine a temperature profile difference 1920(1) representing a difference between actual temperature profile 1916(1) of battery module 124(1) and desired temperature profile 1912(1) of battery module 124(1).

Method 2300 proceeds from block 2302 to a block 2304 where the controller determines an operation adjustment representing a desired change in operation of the battery module for decreasing the temperature profile difference of the battery module. In one example of block 2304, processing subsystem 1902 executes TCFPA determination instructions 1908 to determine TCFPA 1922(1) of battery module 116(1), and in another embodiment of block 2304, processing subsystem 1902 executes TCFPA determination instructions 1908 to determine TCFPA 1924(1) of battery module 124(1), such as using one or more the techniques discussed above with respect to FIG. 19.

Method 2300 proceeds from block 2304 a block 2306 where the controller controls one or more BMS nodes to change operation of the battery module according to the operation adjustment determined in block 2304. In one example of block 2306, processing subsystem 1902 executes TCFPA implementation instructions 1909 to control BMS node 118(1) to change operation of battery module 116(1) according to TCFPA 1922(1), such as using one or more of the techniques discussed above with respect to FIGS. 5-17. In another example of method 2300, processing subsystem 1902 executes TCFPA implementation instructions 1909 to control BMS node 126(1) to change operation of battery module 124(1) according to TCFPA 1924(1), such as using one or more of the techniques discussed above with respect to FIGS. 5-17. In an additional example of block 2306, processing subsystem 1902 executes TCFPA implementation instructions 1909 to control one or more respective BMS nodes 118 associated with battery modules 116 that are thermally coupled to battery module 116(1), such as using one or more of the techniques discussed above with respect to FIG. 18, to change operation of battery module 116(1) according to TCFPA 1922(1).

A respective instance of method 2300 may be executed for each of a plurality of battery modules 116 and/or 124, either simultaneously or at different respective times, to maintain respective desired temperature profiles of the plurality of battery modules. Additionally, method 2300 may be executed from time to time, e.g., periodically, with respect to one or more battery modules 116 and/or 124 to help ensure that the battery modules maintain their respective desired temperature profiles over time.

Determine Desired Temperature Profiles to Promote Battery Module Lifetime and Safety Referring again to FIG. 1, particular embodiments of controller 114 are configured to determine desired temperature profiles of battery modules 116 and 124 to promote long lifetime and/or safe operation of the battery modules. For example, controller 114 may determine desired temperature profiles of battery modules 116 and 124 to maintain balanced temperatures among battery modules 116 and 124, or controller 114 may determine desired temperature profiles of battery modules 116 and 124 to intentionally cause two or more of the battery modules to operate at different respective temperatures, such as by setting desired operating temperature profiles of battery modules 116 and 124 according to respective degradation vectors of the battery modules, respective state of health vectors of the battery modules, respective state of safety vectors of the battery modules, etc. For instance, controller 114 could be configured to modify a desired temperature profile of a given battery module 116 or 124 in a manner which reduces operating temperature of the battery module in response to a signal indicating that magnitude of leakage current of the battery module has crossed a threshold value. As another example, controller 114 could be configured to cause a given battery module 116 or 124 to operate in a bypass operating mode, as well as to determine a desired temperature profile of the battery module to heat the battery module to achieve dendrite healing, where dendrite healing is process where the battery module is heated to induce back-diffusion of Lithium dendrites. As a further example, controller 114 could be configured to determine a desired temperature profile of a given battery module 116 or 124 to cause its constituent electrochemical cells to expand or contract, such as to control mechanical stability.

In some embodiments, controller 114 determines respective desired temperature profiles of battery modules 116 and 124 such that the desired temperature profiles are independent of respective battery module SOC. In other embodiments, controller 114 determines respective desired temperature profiles of battery modules 116 and 124 such that they are a function of respective battery module SOC. For example, in some embodiments, controller 114 determines respective desired temperature profiles of battery modules 116 and 124 such that average temperature of a given battery module varies according to state of charge of the battery module, such as to help minimize SOD of the battery module and/or help maximize SOS of the battery module. For instance, controller 114 could be configured to determine a desired temperature profile of a battery module 116 or 124 to cause the battery to operate at higher temperature in response to a signal indicating that SOC of the battery module exceeds a threshold value, such as 70 percent SOC, to reduce likelihood of plating. As another example, controller 114 could be configured to determine a desired temperature profile of a battery module 116 or 124 to increase or decrease temperature of the battery module in response to a signal indicating that SOC of the battery module is within a predetermined range or one or more key SOC regions, to help minimize capacity fade of the battery module.

Figure 24:
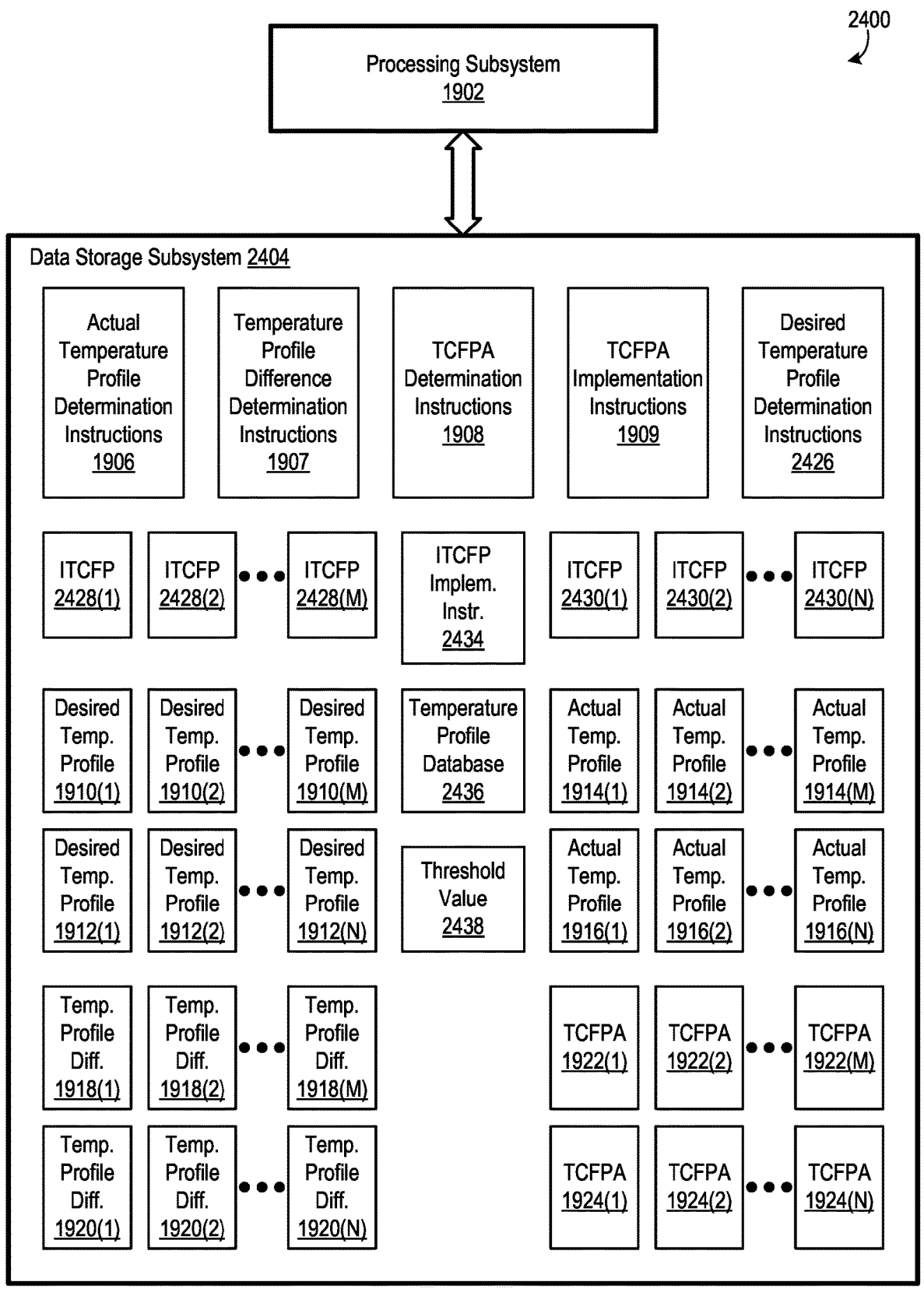
FIG. 24 is a block diagram of an alternate embodiment of the FIG. 19 controller that is further configured to determine desired temperature profiles of battery modules to promote long lifetime and/or safe operation of the battery modules.

FIG. 24 is a block diagram of a controller 2400, which is an alternate embodiment of controller 1900 (FIG. 19) that is further configured to determine desired temperature profiles 1910 and 1912 of battery modules 116 and 124 to promote long lifetime and/or safe operation of the battery modules. Controller 2400 differs from controller 1900 in that data storage subsystem 1904 is replaced with a data storage subsystem 2404, and data storage subsystem 2404 further includes desired temperature profile determination instructions 2426, an initial temperature control factor profile (ITCFP) 2428 for each battery module 116, an ITCFP 2430 for each battery module 124, ITCFP implementation instructions 2434, an optional temperature profile database 2436, and an optional threshold value 2438, along with the elements of data storage subsystem 1904 of FIG. 19. Processing subsystem 1902 is configured to execute desired temperature profile determination instructions 2426 to determine a desired temperature profile 1910 for each battery module 116 to promote longevity and/or safe operation of the battery module, as well as to determine a desired temperature profile 1912 for each battery module 124 to promote longevity and/or safe operation of the battery module. For example, in some embodiments, processing subsystem 1902 determines each desired temperature profile 1910 and 1912 of its respective battery module according to condition of the battery module, e.g., according to SOD, SOS, and/or SOH of the battery module, and/or according to operating state of the battery module, e.g., according to SOC, operating current, and/or operating voltage of the battery module. Processing subsystem 1902 is optionally configured to access temperature profile database 2436 to obtain temperature profile data to facilitate determining desired temperature profiles 1910 and 1912. Database 2436 includes, for example, a lookup table relating desired temperature profiles to battery module condition and/or battery module operating state. In some alternate embodiments, temperature profile database 2436 is partially or fully external to controller 2400.

Processing subsystem 1902 is further configured to execute desired temperature profile determination instructions 2426 to determine a respective ITCFP 2428 for each battery module 116, as well as to determine a respective ITCFP 2430 for each battery module 124. Each ITCFP 2428 is an initial temperature control factor profile for its respective battery module 116 that is estimated to achieve the respective desired temperature profile 1910 of the battery module. Similarly, each ITCFP 2430 is an initial temperature control factor profile for its respective battery module 124 that is estimated to achieve the respective desired temperature profile 1912 of the battery module. Processing subsystem 1902 is additionally configured to execute ITCFP implementation instructions 2434 to implement each ITCFP 2428 and 2430 by controlling one or more BMS nodes 118 and 126. For example, assume that ITCFP 2428(1) indicates that battery module 116(1)'s temperature needs to increase for the battery module to operate at its desired temperature profile 1910(1). Processing subsystem 1902 may accordingly execute ITCFP implementation instructions 2434 to control BMS node 118(1) to increase temperature of battery module 116(1), such as by using one or more of the techniques discussed above with respect to FIGS. 5-17. As another example, assume that ITCFP 2430(1) indicates that battery module 124(1)'s temperature needs to decrease temperature to operate at its desired temperature profile 1912(1). Processing subsystem 1902 may accordingly execute ITCFP implementation instructions 2434 to control BMS node 126(1) to decrease temperature of battery module 124(1), such as by using one or more of the techniques discussed above with respect to FIGS. 5-17.

Processing subsystem 1902 is additionally configured to operate as discussed above with respect to FIG. 19, such as to determine temperature profile differences 1918 and 1920, determine TCFPAs 1922 and 1924, etc. However, in some embodiments, controller 2400 is configured to condition determining a TCFPA 1922 or 1924 for a given battery module 116 or 124 on a respective temperature profile difference 1918 or 1920 exceeding threshold value 2438, such as discussed below with respect to FIGS. 25A and 25B.

Figure 25A:
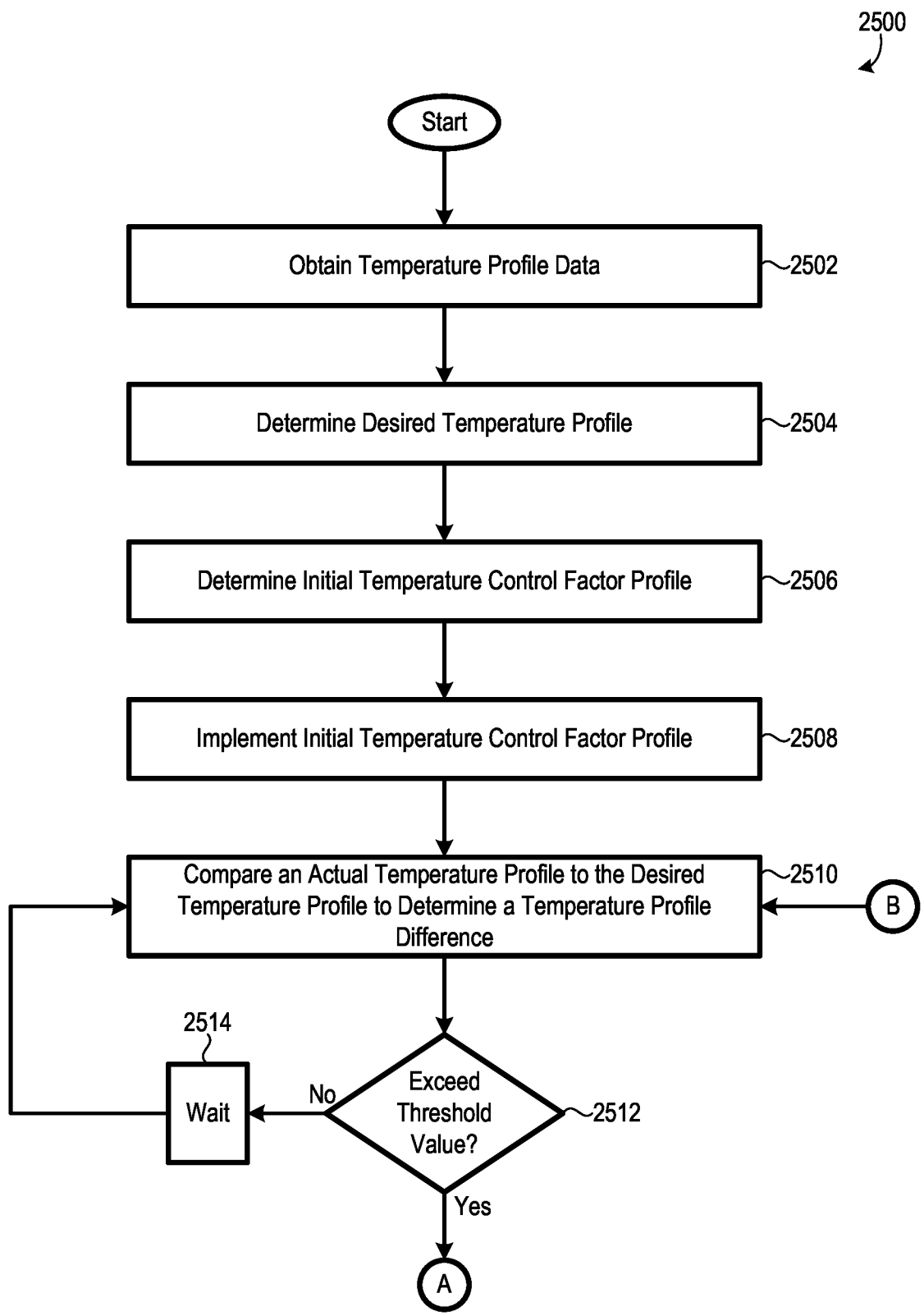
FIGS. 25A and 25B collectively illustrate a flow chart of an additional method for thermal management of an energy storage system performed by a controller of the energy storage system, according to an embodiment.
Figure 25B:
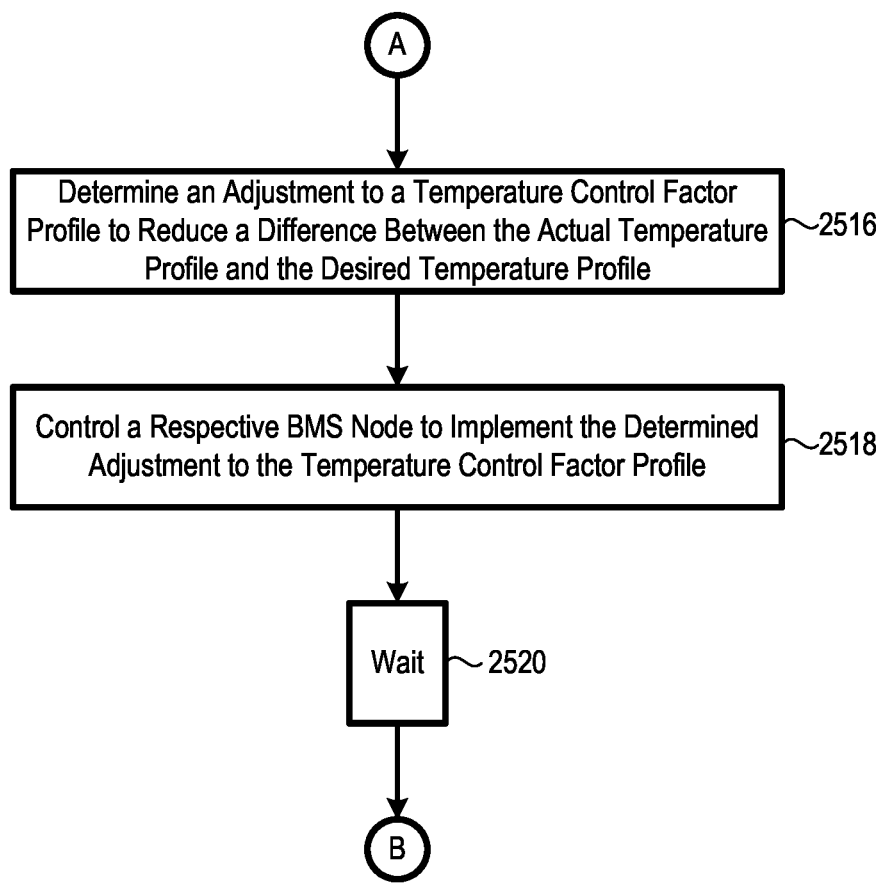

FIGS. 25A and 25B collectively illustrate a flow chart of a method 2500 for thermal management performed by a controller of an energy storage system. Method 2500 is one example of how a controller of energy storage system 102 may determine a desired temperature profile 1910 or 1912 of a battery module 116 or 124 to promote long lifetime and/or safe operation of the battery module, as well as to maintain the desired operating temperatures of the battery module. In a block 2502 of method 2500, the controller obtains temperature profile data to facilitate determining the desired temperature profile of the battery module In one example of block 2502, processing subsystem 1902 obtains temperature profile data from temperature profile database 2436 (FIG. 24), where the temperature profile data includes, for example, data associating a desired temperature profile with a condition and/or an operating state of a battery module 116 or 124. Method proceed from block 2502 to a block 2504 where the controller determines a desired temperature profile of the battery module to promote longevity and/or safe operation of the battery module. In one example of block 2504, processing subsystem 1902 executes temperature profile determination instructions 2426 to determine a desired temperature profile 1910 or 1912 for the battery module 116 or 124, at least partially based on the temperature profile data obtained in block 2502, condition of the battery module, and/or operating state of the battery module.

Method 2500 proceeds from block 2504 to a block 2506 where the controller determines an initial temperature control factor profile that is estimated to achieve the desired temperature profile of the battery module determined in block 2504, such as using one or more of a thermal model of the battery module, a lookup table relating temperature control factor profiles to desired to temperature profiles, a closed loop control system, and/or AI or a similar technique. In one example of block 2506, processing subsystem 1902 executes desired temperature profile determination instructions 2426 to determine an ITCFP 2428 or 2430 of the battery module 116 or 124. Method 2500 proceeds from block 2506 to a block 2508 where the controller controls one or more BMS nodes 118 and/or 126 to implement the initial temperature control factor profile determined in block 2506. In one example of block 2508, processing subsystem 1902 executes ITCFP implementation instructions 2434 to control a BMS node 118 or 126 to implement an ITCFP 2428 or 2430.

Method 2500 proceeds from block 2508 to a block 2510 where the controller compares an actual temperature profile of the battery module to the desired temperature profile of the battery module determined in block 2504, to obtain a temperature profile difference of the battery module. In one example of block 2510, processing subsystem 1902 executes temperature profile difference determination instructions 1907 to compare an actual temperature profile 1914 or 1916 of the battery module to a desired temperature profile 1910 or 1912 of the battery module to determine a temperature profile difference 1918 or 1920 of the battery module.

Method 2500 proceeds from block 2510 to a decision block 2512 where the controller determines if the temperature profile difference exceeds a threshold value, where the threshold value represents, for example, a minimum temperature profile difference for triggering change in battery module operation. In one example of decision block 2512, controller 2400 determines if temperature profile difference 1918 or 1920 determined in block 2510 exceeds threshold value 2438. If the result of decision block 2512 is no, method 2500 proceeds to a block 2514 where it waits a predetermined amount of time before returning to block 2510. On the other hand, if the result of decision block 2512 is yes, method 2500 proceeds to a block 2516 where the controller determines an adjustment to a temperature control factor profile of the battery module to reduce a difference between the actual temperature profile of the battery module and the desired temperature profile of the battery module. In one example of block 2516, processing subsystem 1902 executes TFCPA determination instructions 1908 to determine an adjustment to the temperature control factor profile, i.e., an TFCPA 1922 or a TCFPA 1924, for the battery module 116 or 124.

Method 2500 proceeds from block 2516 to a block 2518 where the controller controls a respective BMS node of the battery module to implement the adjustment to the temperature control factor profile of the battery module determined in block 2516. In some alternate embodiments of block 2518, though, the controller may implement the adjustment to the temperature control factor profile by controlling respective BMS nodes associated with one or more neighboring battery modules, such as in a manner similar to that discussed above with respect to FIG. 18. In one example of block 2518, processing subsystem 1902 executes TCFP implementation instructions 1909 to control a respective BMS node 118 or 126 of the battery module to implement the adjustment to the temperature control factor profile of the battery module determined in block 2516, such using one or more of the techniques discussed above with respect to FIGS. 5-17. Method 2500 proceeds from block 2518 to a block 2520 where method 2500 waits a predetermined amount of time before returning to block 2510.

By way of example and not limitation, discussed below with respect to FIGS. 26-41 are additional examples of how controller 114 could determine and maintain desired temperature profiles of battery modules 116 and 124 to promote long lifetime and/or safe operation of the battery modules. FIGS. 26-41 are discussed with respect to three battery modules, i.e., battery modules 116(1), 116(2), and 124(1). It is understood, though, that the principles of FIGS. 26-41 could be applied to additional and/or alternative battery modules 116 and/or 124 of energy storage system 102.

Figure 26:
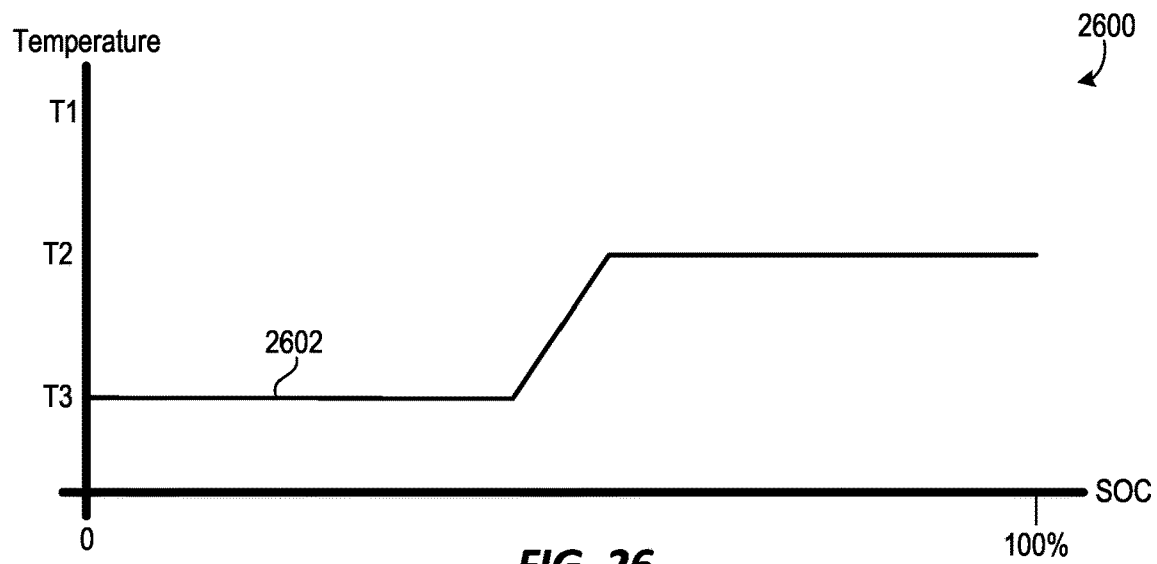
FIG. 26 is a graph of temperature versus state of charge illustrating an example desired temperature profile of a first battery module.
Figure 27:
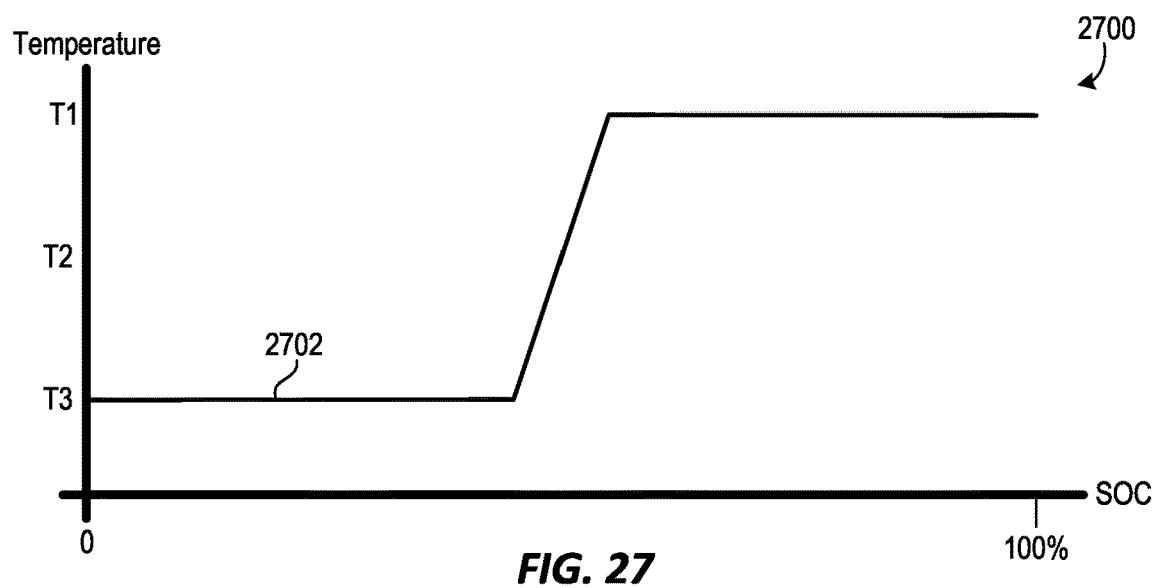
FIG. 27 is a graph of temperature versus state of charge illustrating an example desired temperature profile of the first battery module of FIG. 26 after an additional control iteration.

FIGS. 26-29 illustrate example desired temperature profiles of battery modules 116(1), 116(2), and 124(2) as determined by controller 114 at least partially based on SOD of the battery modules. In particular, FIG. 26 is a graph of 2600 of temperature versus SOC illustrating an example desired temperature profile 2602 of battery module 116(1) assuming that the battery module is highly degraded, and FIG. 27 is a graph 2700 of temperature versus SOC illustrating an example desired temperature profile 2702 of battery module 116(1) after an additional control iteration relative to the example of FIG. 26. As evident from FIGS. 26 and 27, desired temperature profiles 2602 and 2702 vary with SOC of battery module 116(1), and temperature at high SOC increases with the additional control iteration. Specifically, desired temperature of battery module 116(1) is relatively low (T3) at low SOC, and desired temperature of battery module 116(1) is relatively high (T2) or (T1) at high SOC. Desired temperature of battery module 116(1) transitions between T3 and T2 or T1 at approximately 50 percent SOC. Desired temperature profiles 2602 and 2702 are each a respective example of desired temperature profile 1910(1) of FIG. 24 in cases where battery module 116(1) is highly degraded.

Figure 28:
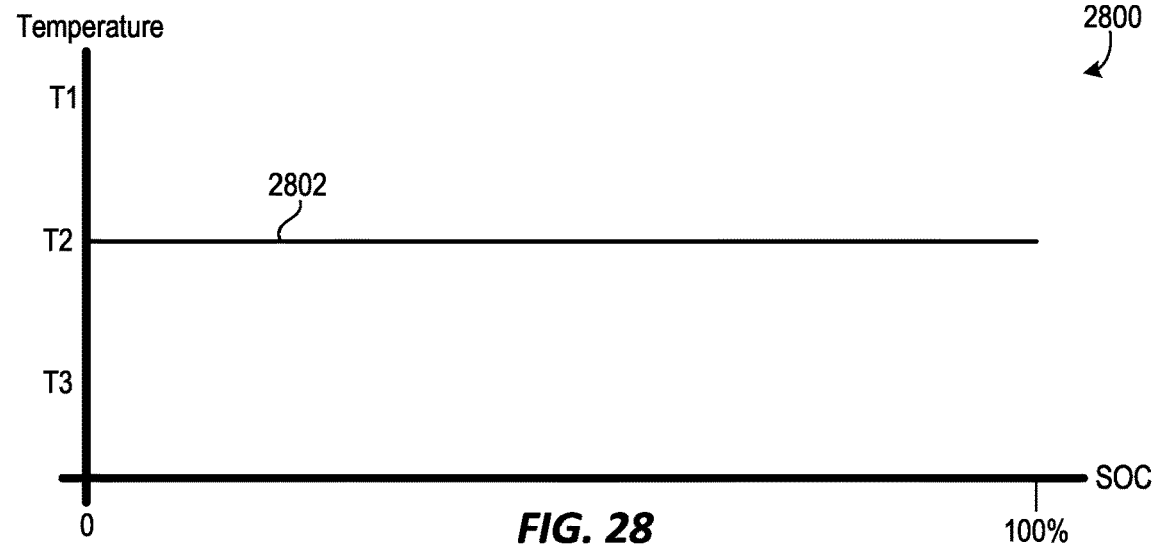
FIG. 28 is a graph of temperature versus state of charge illustrating an example desired temperature profile of a second battery module.

FIG. 28 is a graph of 2800 of temperature versus SOC illustrating an example desired temperature profile 2802 of battery module 116(2) assuming that the battery module is lightly degraded. As evident from FIG. 28, desired temperature profile 2802 remains constant as SOC varies, and the desired temperature of battery module 116(2) is moderate (T2) under desired temperature profile 2802. Desired temperature profile 2802 is one example of desired temperature profile 1910(2) of FIG. 24 in cases where battery module 116(2) is lightly degraded.

Figure 29:
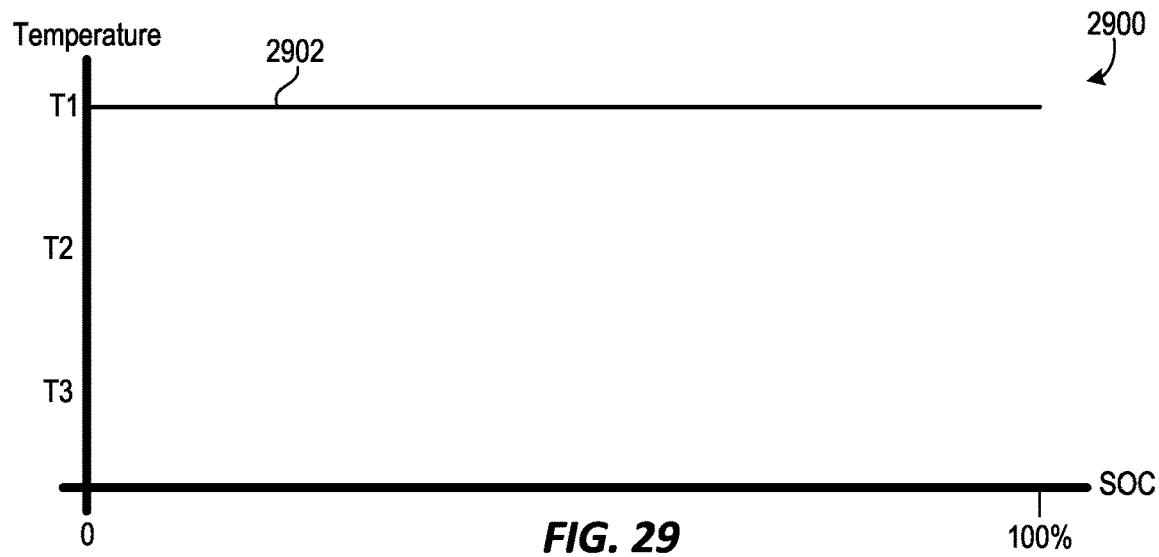
FIG. 29 is a graph of temperature versus state of charge illustrating an example desired temperature profile of a third battery module.

FIG. 29 is a graph 2900 of temperature versus SOC illustrating an example desired temperature profile 2902 of battery module 124(1) assuming that the battery module is moderately degraded. As evident from FIG. 29, desired temperature profile 2902 remains constant as SOC varies, and the desired temperature of battery module 124(1) is relatively high (T1) under desired temperature profile 2902. Desired temperature profile 2902 is one example of desired temperature profile 1912(1) of FIG. 24 in cases where battery module 124(1) is moderately degraded.

FIGS. 30-33 illustrate example initial temperature control factor profiles for implementing the desired temperature profiles of FIGS. 26-29, respectively. In FIGS. 30-33, as well as in subsequent figures including temperature control factors, actual values of temperature control factor Q in one figure do not necessarily translate to actual values of Q in a different figure.

Figure 30:
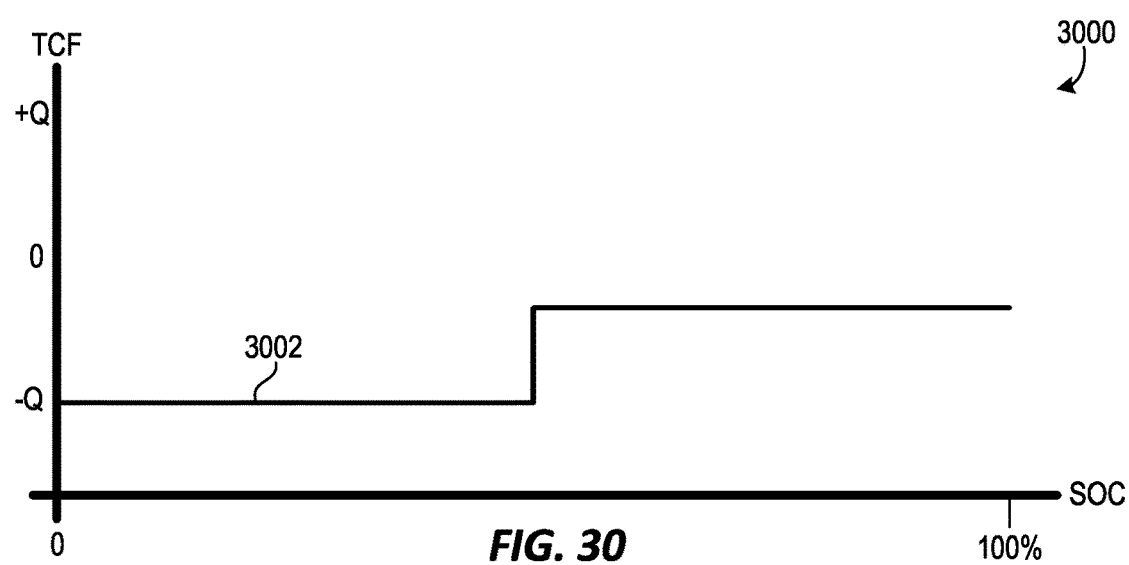
FIG. 30 is a graph of temperature control factor versus state of charge illustrating an example initial temperature control factor profile of a first battery module.
Figure 31:
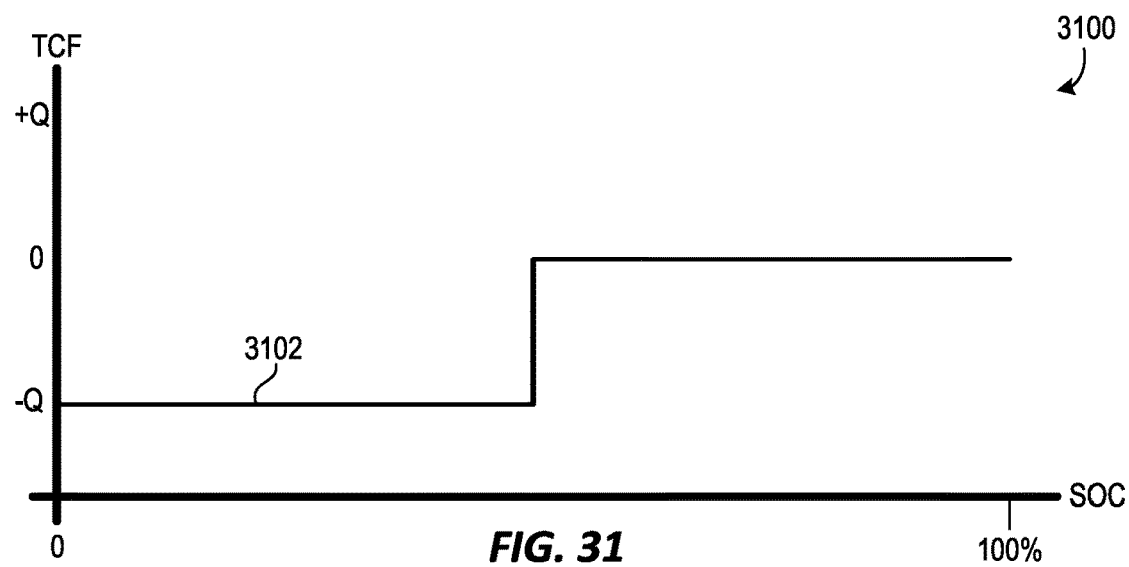
FIG. 31 is a graph of temperature control factor versus state of charge illustrating an example initial temperature control factor profile of the first battery module of FIG. 30 after an additional control iteration.
Figure 32:
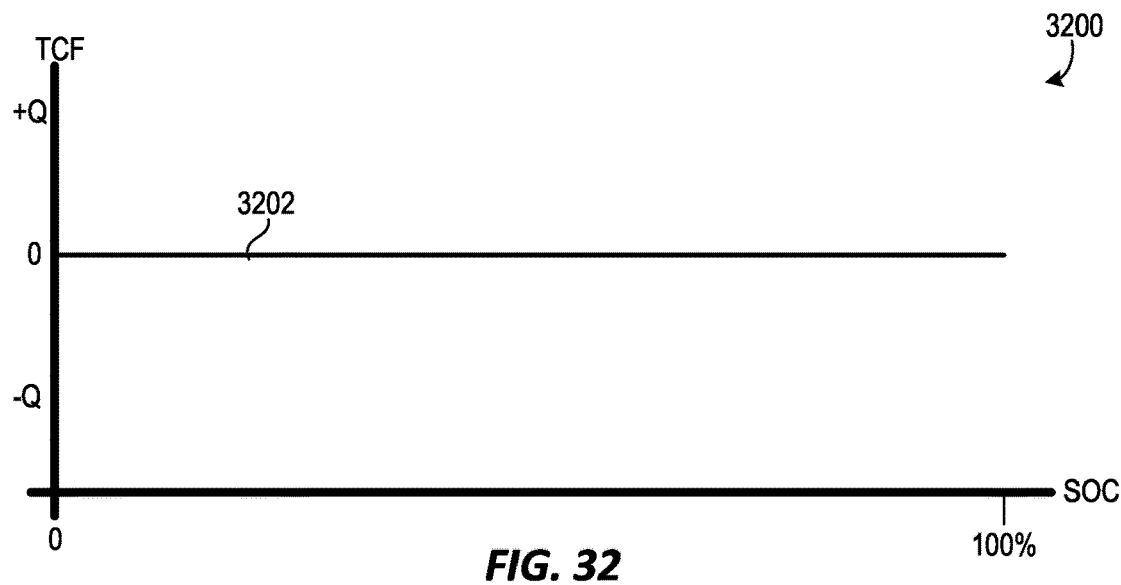
FIG. 32 is a graph of temperature control factor versus state of charge illustrating an example initial temperature control factor profile of a second battery module.
Figure 33:
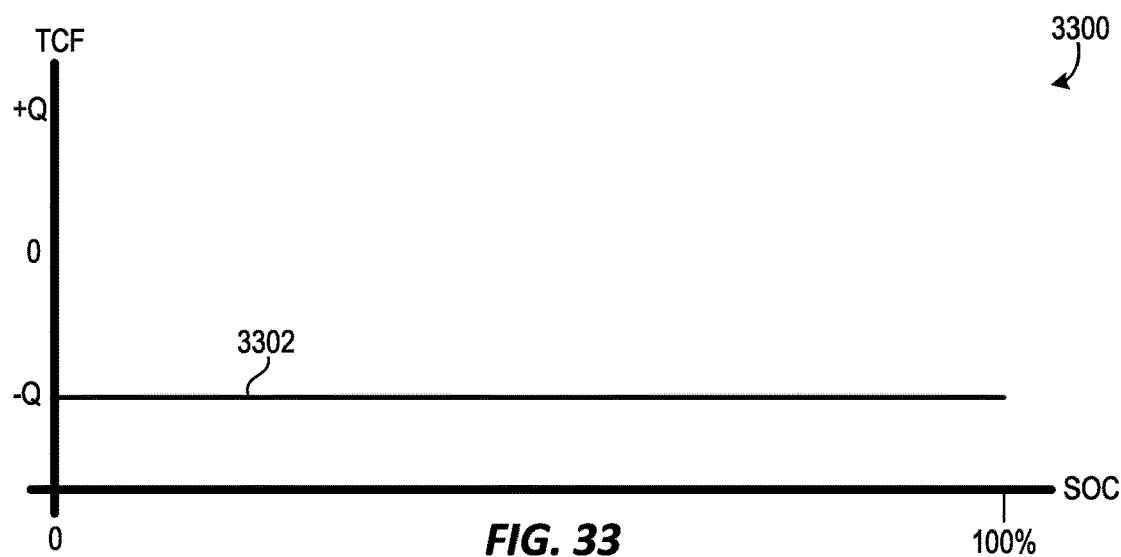
FIG. 33 is a graph of temperature control factor versus state of charge illustrating an example initial temperature control factor profile of a third battery module.

FIG. 30 is a graph 3000 of temperature control factor versus SOC illustrating an example initial temperature control factor profile 3002 of battery module 116(1) that is determined by controller 114 for implementing desired temperature profile 2602 of FIG. 26, and FIG. 31 is a graph 3100 of temperature control factor versus SOC illustrating an example initial temperature control factor profile 3102 of battery module 116(1) that is determined by controller 114 for implementing desired temperature profile 2702 of FIG. 27. Accordingly, each of initial temperature control factor profile 3002 and initial temperature control factor profile 3102 is an example of ITCFP 2428(1) of FIG. 24. FIG. 32 is a graph 3200 of temperature control factor versus SOC illustrating an example initial temperature control factor profile 3202 of battery module 116(2) that is determined by controller 114 for implementing desired temperature profile 2802 of FIG. 28. Accordingly, initial temperature control factor profile 3202 is one example of ITCFP 2428(2) of FIG. 24. FIG. 33, in turn, is a graph 3300 of temperature control factor versus SOC illustrating an example initial temperature control factor profile 3302 of battery module 124(1) that is determined by controller 114 for implementing desired temperature profile 2902 of FIG. 29. Accordingly, initial temperature control factor profile 3302 is one example of ITCFP 2430(1) of FIG. 24. The temperature control factor is negative in FIG. 33 to prevent the temperature of battery module 124(1) from exceeding the desired temperature profile of FIG. 29.

Figure 34:
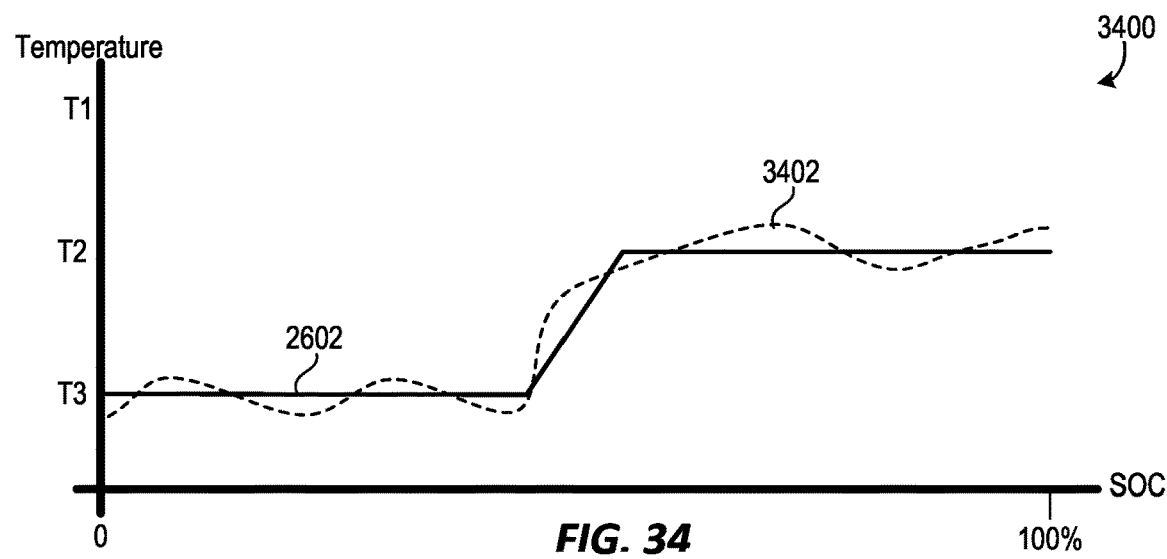
FIG. 34 is a graph of temperature versus state of charge comparing an example desired temperature profile to an example actual temperature profile of a first battery module.
Figure 35:
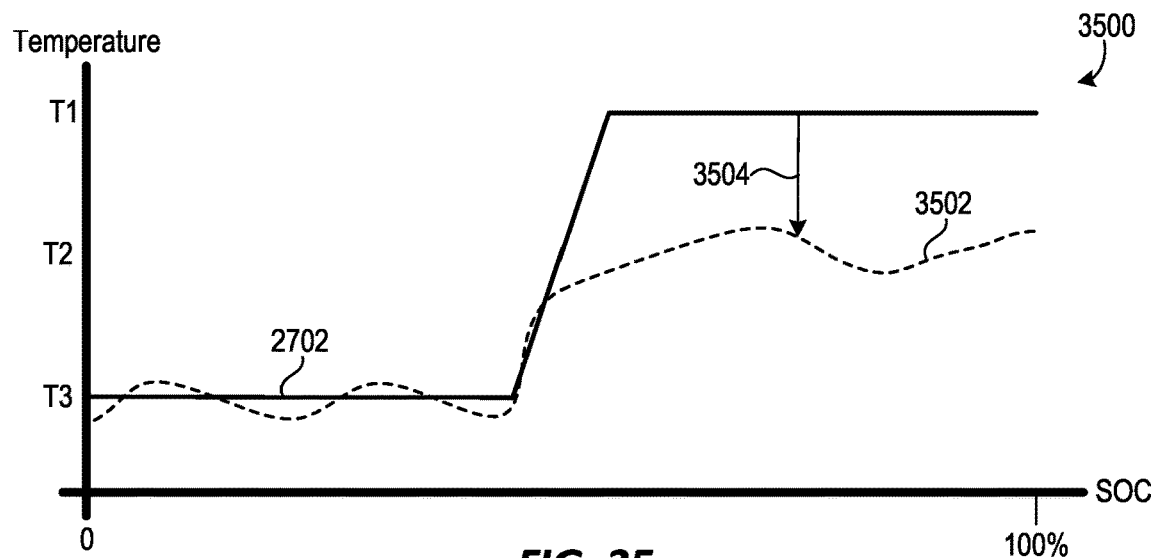
FIG. 35 is a graph of temperature versus state of charge comparing an example desired temperature profile to an example actual temperature profile of the first battery module of FIG. 34 after an additional control iteration.

FIGS. 34-37 collectively illustrate a comparison of the example desired temperature profiles of FIGS. 26-29 to example actual temperature profiles. Specifically, FIG. 34 is a graph 3400 of temperature versus SOC illustrating example desired temperature profile 2602 of battery module 116(1) overlayed with an example actual temperature profile 3402 of battery module 116(1). As evident from FIG. 34, actual temperature profile 3402 is close to desired temperature profile 2602, and therefore, no change in operating state of battery module 116(1) is needed. FIG. 35, on the other hand, is a graph 3500 of temperature versus SOC illustrating example desired temperature profile 2702 of battery module 116(1) overlayed with an example actual temperature profile 3502 of battery module 116(1). As evident from FIG. 35, actual temperature profile 3502 is significantly lower than desired temperature profile 2702 at high SOC. A difference between desired temperature profile 2702 and actual temperature profile 3502 is illustrated by an arrow 3504, which is an example of temperature profile difference 1918(1). An adjustment to the temperature control factor of battery module 116(1) for reducing the difference between desired temperature profile 2702 and actual temperature profile 3502 should be a function of SOC of battery module 116(1) due to the difference being a significant function of SOC of the battery module.

Figure 36:
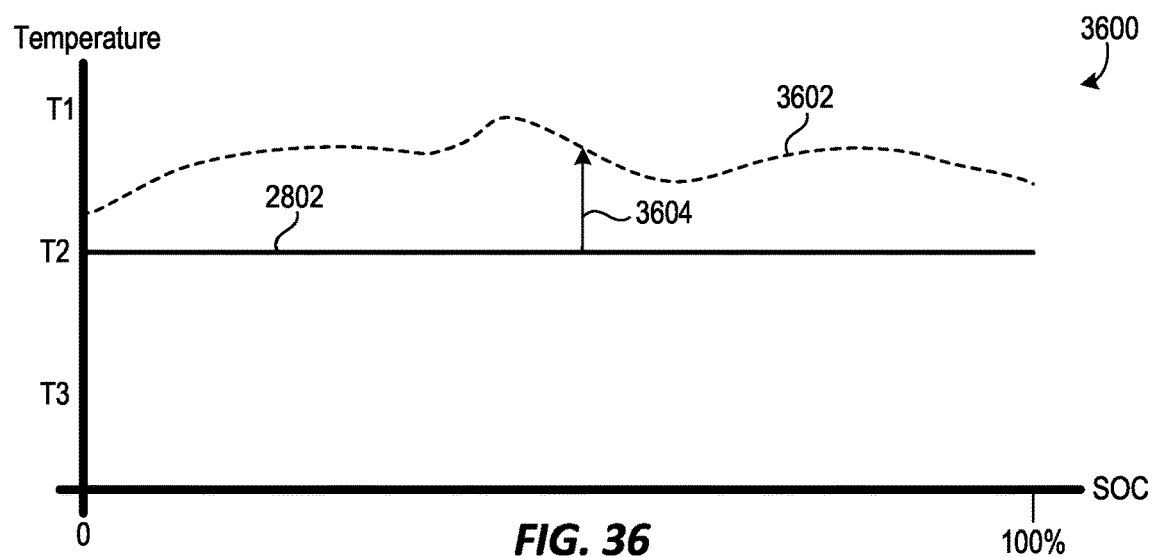
FIG. 36 is a graph of temperature versus state of charge comparing an example desired temperature profile to an example actual temperature profile of a second battery module.

FIG. 36 is a graph 3600 of temperature versus SOC illustrating example desired temperature profile 2802 of battery module 116(2) overlayed with an example actual temperature profile 3602 of battery module 116(2). As evident from FIG. 36, actual temperature profile 3602 is significantly higher than desired temperature profile 2802. A difference between desired temperature profile 2802 and actual temperature profile 3602 is illustrated by an arrow 3604, which is an example of temperature profile difference 1918(2). While the difference between desired temperature profile 2802 and actual temperature profile 3602 varies somewhat with SOC of battery module 116(2), such variation may be sufficiently small such that an adjustment to the temperature control factor of battery module 116(2) for reducing the difference need not be a function of SOC of the battery module.

Figure 37:
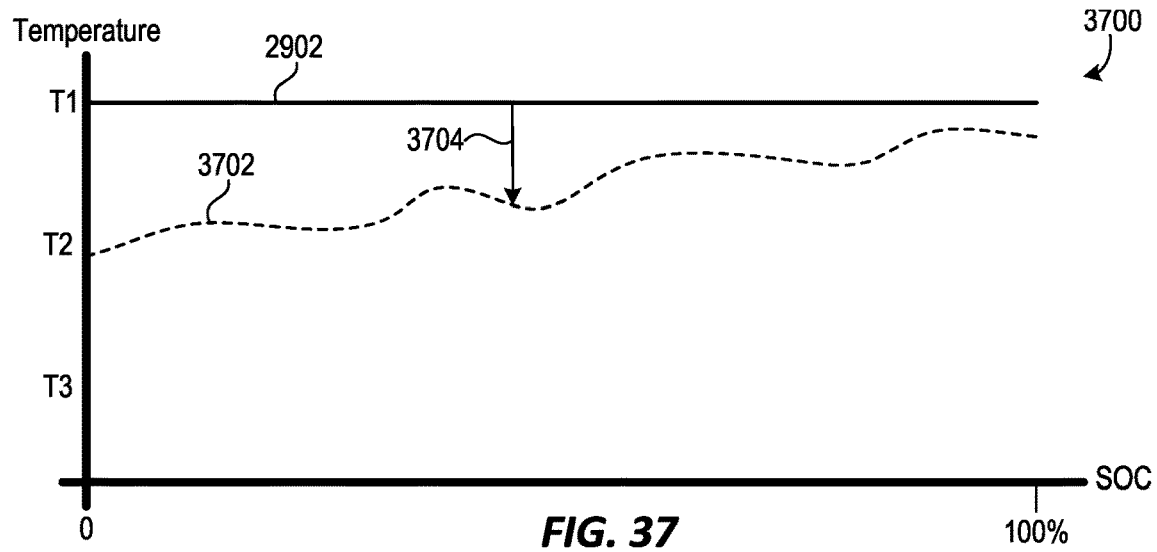
FIG. 37 is a graph of temperature versus state of charge comparing an example desired temperature profile to an example actual temperature profile of a third battery module.

FIG. 37 is a graph 3700 of temperature versus SOC illustrating example desired temperature profile 2902 of battery module 124(1) overlayed with an example actual temperature profile 3702 of battery module 124(1). As evident from FIG. 37, actual temperature profile 3702 is significantly lower than desired temperature profile 2902, although such difference significantly decreases with increasing SOC. A difference between desired temperature profile 2902 and actual temperature profile 3702 is illustrated by an arrow 3704, which is an example of temperature profile difference 1920(1). An adjustment to the temperature control factor of battery module 124(1) for reducing the difference between desired temperature profile 2902 and actual temperature profile 3702 should be a function of SOC of battery module 124(1) due to the difference being a significant function of SOC of the battery module.

Figure 38:
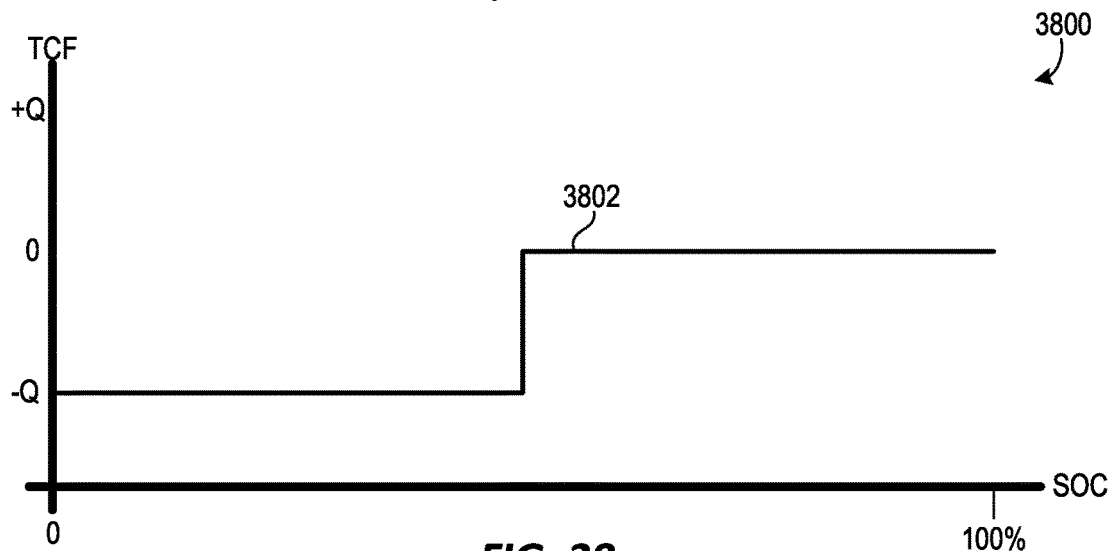
FIG. 38 is a graph of temperature control factor versus state of charge illustrating an adjusted temperature control factor profile of a first battery module.

FIGS. 38-41 collectively illustrate examples of adjusted temperature control factor profiles for reducing the differences between desired temperature profiles and actual temperature profiles illustrated in FIGS. 34-37. FIG. 38 is a graph 3800 of temperature control factor versus state of charge of battery module 116(1) illustrating an adjusted temperature control factor profile 3802. As discussed above with respect to FIG. 34, actual temperature profile 3402 is close to desired temperature profile 2602, and therefore no change in temperature control factor profile of battery module 116(1) is needed. Consequently, adjusted temperature control factor profile 3802 is the same as initial temperature control factor profile 3002 (FIG. 30).

Figure 39:
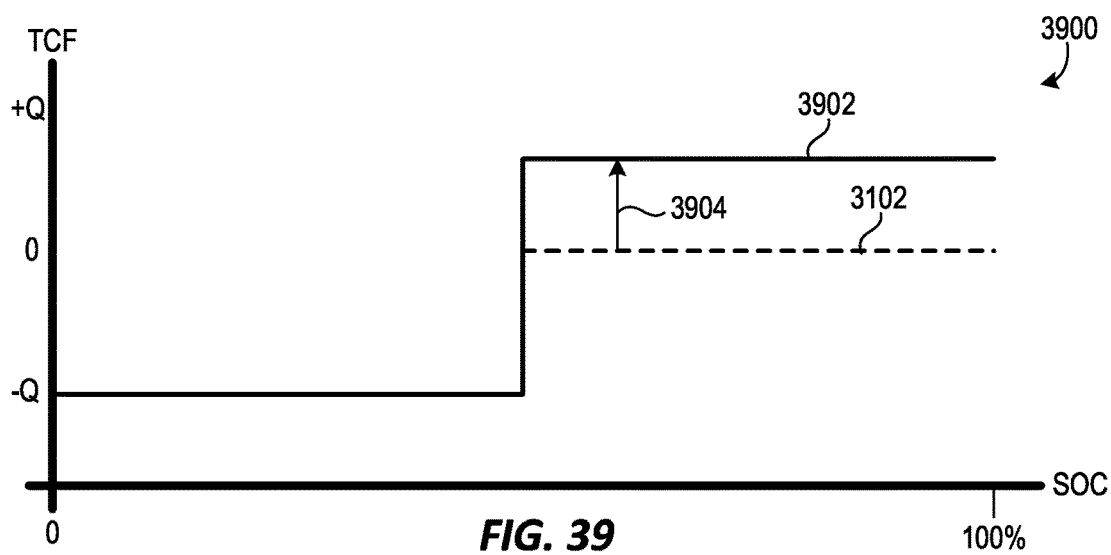
FIG. 39 is a graph of temperature control factor versus state of charge illustrating an adjusted temperature control factor profile of the first battery module of FIG. 38 after an additional control iteration.

FIG. 39 is a graph 3900 of temperature control factor versus state of charge of battery module 116(1) illustrating an adjusted temperature control factor profile 3902 after a control iteration relative to the example of FIG. 38. As discussed above with respect to FIG. 35, actual temperature profile 3502 is significantly lower than desired temperature profile 2702 at high SOC. Consequently, adjusted temperature control factor profile 3902 is higher than initial temperature control factor profile 3102 (FIG. 31). An adjustment to initial temperature control factor profile 3102 to obtain adjusted temperature control profile 3902 is depicted by an arrow 3904, where arrow 3904 represents one example of TCFPA 1922(1).

Figure 40:
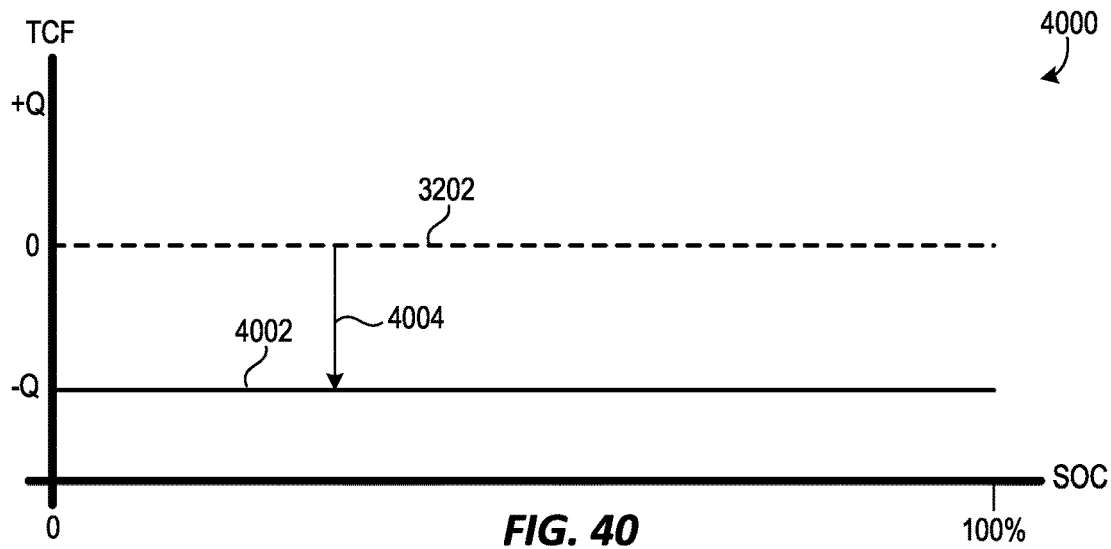
FIG. 40 is a graph of temperature control factor versus state of charge illustrating an adjusted temperature control factor profile of a second battery module.

FIG. 40 is a graph 4000 of temperature control factor versus state of charge of battery module 116(2) illustrating an adjusted temperature control factor profile 4002 for reducing the difference between desired temperature profile 2802 and actual temperature profile 3602 as illustrated in FIG. 36. Adjusted temperature control factor profile 4002 is negative relative to initial temperature control factor profile 3202 to increase cooling of battery module 116(2) and thereby reduce the difference between desired temperature profile 2802 and actual temperature profile 3602. An adjustment to initial temperature control factor profile 3202 to obtain adjusted temperature control factor profile 4002 is depicted by an arrow 4004, where arrow 4004 represents one example of TCFPA 1922(2).

Figure 41:
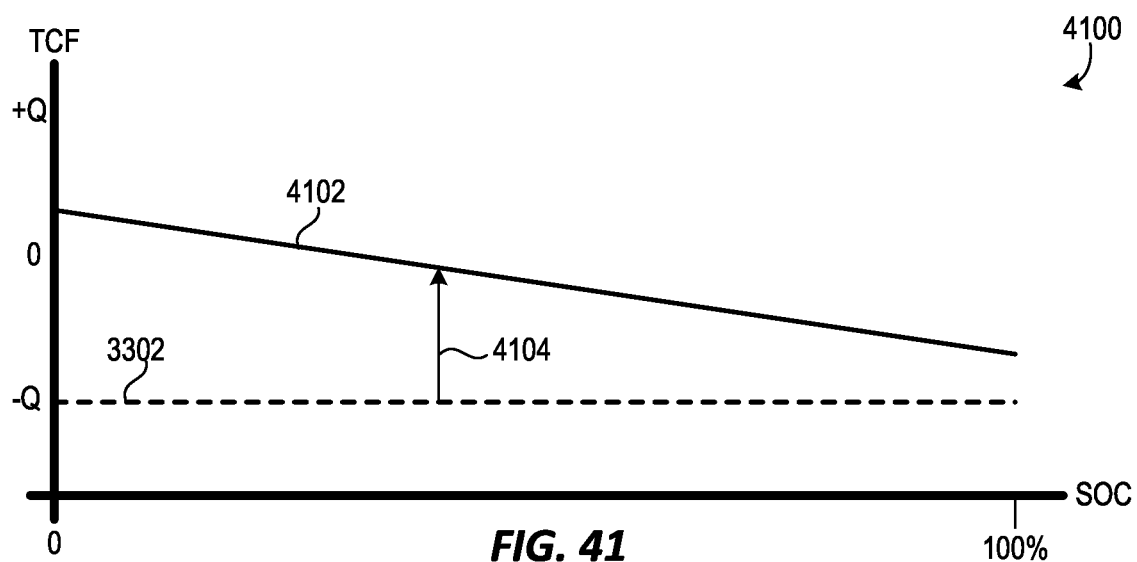
FIG. 41 is a graph of temperature control factor versus state of charge illustrating an adjusted temperature control factor profile of a third battery module.

FIG. 41 is a graph 4100 of temperature control factor versus state of charge of battery module 124(1) illustrating an adjusted temperature control factor profile 4102 for reducing the difference between desired temperature profile 2902 and actual temperature profile 3702 as illustrated in FIG. 37. An adjustment to initial temperature control factor profile 3302 to obtain adjusted temperature control factor profile 4102 is depicted by an arrow 4104, where arrow 4104 represents one example of TCFPA 1924(1). It should be noted that the difference between adjusted temperature control factor profile 4102 and initial temperature control factor profile 3302 is a function of SOC of battery module 124(1) and decreases with increasing SOC.

Diagnostic Temperature Profiles

Referring again to FIG. 1, particular embodiments of controller 114 are configured to control one or more BMS nodes 118 and/or 126 to individually control temperature of one or more battery modules 116 and/or 124 in a manner which achieves respective diagnostic temperature profiles of the battery modules, such as to enable performance of in-situ diagnostic procedures on the one or more battery modules while other battery modules of energy storage system 102 operate normally. For example, certain embodiments of controller 114 are configured to control a BMS node 118 or 126 according to a diagnostic temperature profile of a battery module 116 or 124 to maintain the battery module at a constant temperature, such as 20 degrees Celsius, 30 degrees Celsius, 40 degrees Celsius, etc., while an in-situ diagnostic test is performed on the battery module. Examples of such diagnostic tests include, but are not limited to, measurement of battery module leakage current, measurement of battery module equivalent series resistance (ESR), determination of battery module capacity, measurement of battery module open circuit voltage (OCV), and battery module differential capacity (dQ/dV) analysis. As another example, particular embodiments of controller 114 are configured to control a BMS node 118 or 126 according to a diagnostic temperature profile of a battery module 116 or 124 to change a temperature of the battery module for the purpose of performing an in-situ diagnostic test on the battery module, such as to determine open circuit voltage of the battery module as a function of temperature of the battery module. Such ability of particular embodiments of controller 114 to control BMS nodes 118 and/or 126 to apply diagnostic temperature profiles to one or more battery modules 116 and/or 124 advantageously promotes quality of field-gathered data, promotes large size of a collectable data pool, and/or enables in-situ diagnostics of battery modules that would not otherwise be possible.

Figure 42:
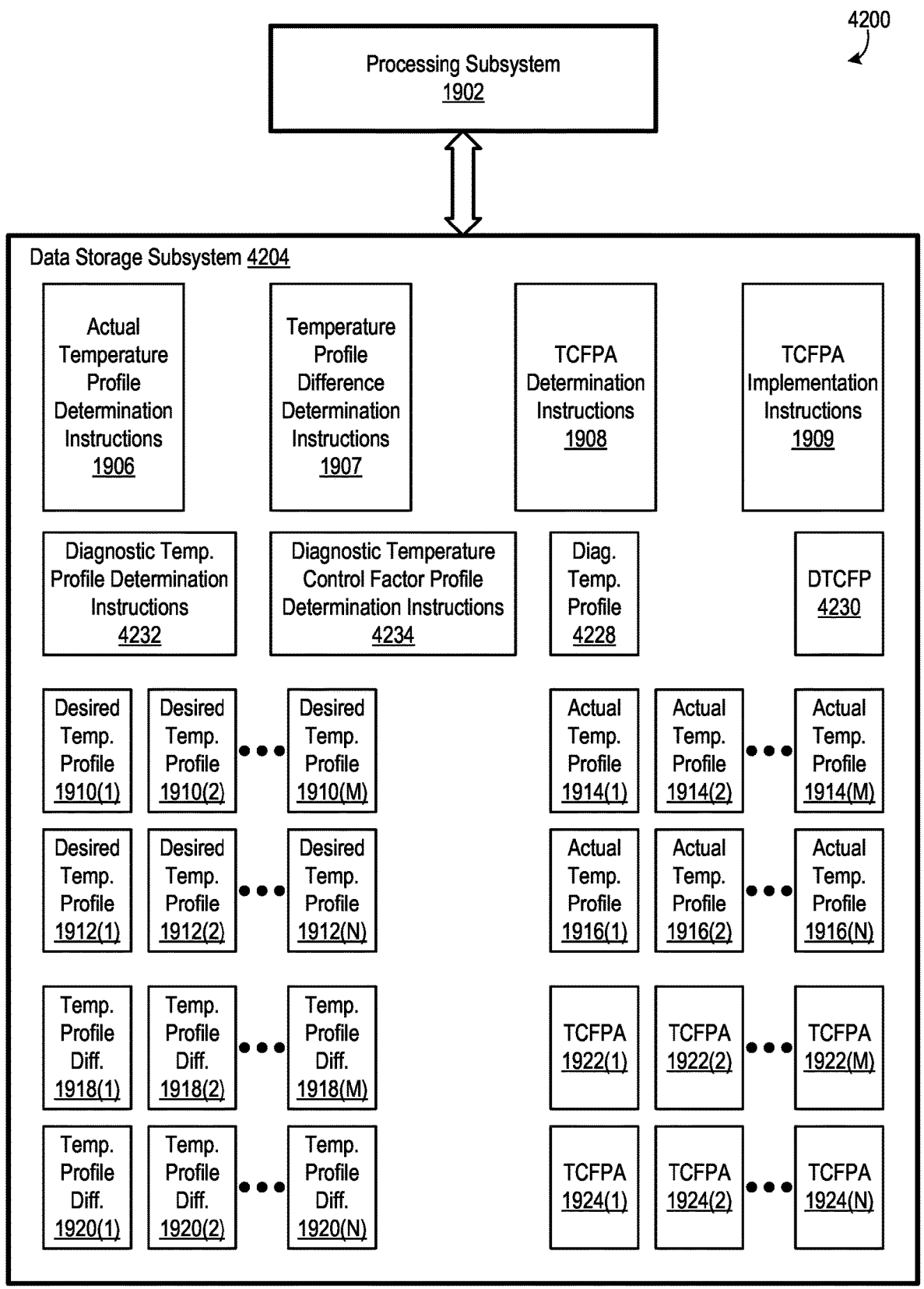
FIG. 42 is a block diagram of an alternate embodiment of the FIG. 19 controller that is further configured to maintain a diagnostic temperature profile of battery modules.

FIG. 42 is a block diagram of a controller 4200, which is an alternate embodiment of controller 1900 (FIG. 19) that is further configured to maintain a diagnostic temperature profile of battery modules 116 and 124, as well as to maintain desired temperature profiles of battery modules 116 and 124 during normal operation of the battery modules, i.e., when the battery modules are not undergoing an diagnostic test. Controller 4200 differs from controller 1900 in that data storage subsystem 1904 is replaced with a data storage subsystem 4204, and data storage subsystem 4204 further includes one or more diagnostic temperature profiles 4228 (only one is shown in FIG. 42), one or more diagnostic temperature control factor profiles (DTCFP) 4230 (only one is shown in FIG. 42), diagnostic temperature profile determination instructions 4232, and diagnostic temperature control factor profile determination instructions 4234, along with the elements of data storage subsystem 1904 of FIG. 19.

Controller 4200 is configured to maintain a given battery module 116 or 124 at the battery module's desired temperature profile 1910 or 1912 when the battery is not undergoing a diagnostic test, in the manner discussed above with respect to FIG. 19. Additionally, processing subsystem 1902 is configured to execute diagnostic temperature profile determination instructions 4232 to determine one or more diagnostic temperature profiles 4228. Each diagnostic temperature profile 4228 specifies a temperature profile of a battery module 116 or 124 that is appropriate for performing a particular in-situ diagnostic test on the battery module. For example, a diagnostic temperature profile 4228 may specify a constant diagnostic temperature profile of a battery module for measuring leakage current of the battery module, or the diagnostic temperature profile 4228 may specify a diagnostic temperature profile of a battery module that varies over time to enable measurement of open circuit voltage of the battery module at multiple temperatures. Although FIG. 42 depicts data storage subsystem 4204 as including only a single diagnostic temperature profile 4228, data storage subsystem 4204 may include multiple diagnostic temperature profiles 4228. For example, data storage subsystem 4204 may include one diagnostic temperature profile 4228 for each type of diagnostic test that may be performed on a battery module 116 or 124. As another example, data storage subsystem 4204 may include respective diagnostic temperature profiles 4228 for two or more battery modules 116 and 124. Processing subsystem 1902 is configured to execute diagnostic temperature profile determination instructions 4232 to determine one or more diagnostic temperature profiles 4228, for example, by accessing a database or other information source (not shown) associating diagnostic tests with appropriate diagnostic temperature profiles.

Processing subsystem 1902 is further configured to execute diagnostic temperature control factor profile determination instructions 4234 to determine one or more DTCFPs 4230. Each DTCFP 4230 specifies a temperature control factor profile to be applied to a battery module 116 or 124 that is predicted to achieve a respective diagnostic temperature profile 4228. While FIG. 42 depicts data storage subsystem 4204 as including only one DTCFP 4230, data storage subsystem 4204 may include multiple DTCFPs 4230, e.g., a respective DTCFP 4230 for each diagnostic temperature profile and/or for each battery module 116 and 124. Processing subsystem 1902 is configured to determine one or more DTCFPs 4230 in accordance with diagnostic temperature control factor profile determination instructions 4234, for example, using a thermal model of a battery module 116 or 124, consulting a database relating diagnostic temperature profiles to DRTCPs, and/or using AI or a related technique.

Particular embodiments of controller 4200 are configured to simultaneously maintain one or more battery modules 116 and/or 124 at desired temperature profiles while maintaining one or more other battery modules 116 and/or 124 at diagnostic temperature profiles, such as to enable performing in-situ diagnostic tests one or more battery modules 116 and/or 124 while the rest of the battery modules 116 and/or 124 in energy storage system 102 operate normally. For example, assume a scenario where (a) battery module 116(1) is operating normally, i.e., battery module 116(1) is not undergoing a diagnostic test, and (b) battery module 116(2) is undergoing a diagnostic test. In this example scenario, controller 4200 may, for example, control BMS node 118(1) to help minimize a difference between actual temperature profile 1914(1) of battery module 116(1) and desired temperature profile 1910(1) of battery module 116(1), in a manner like discussed above with respect to FIG. 19. Additionally, in this example scenario, controller 4200 may control BMS node 118(2) to help minimize a difference between actual temperature profile 1914(2) of battery module 116(2) and diagnostic temperature profile 4228, in a manner similar to that discussed above with respect to method of FIG. 23, but with the desired temperature profile 1910(2) of battery module 116(2) replaced with diagnostic temperature profile 4228 in method 2300.

Figure 43:
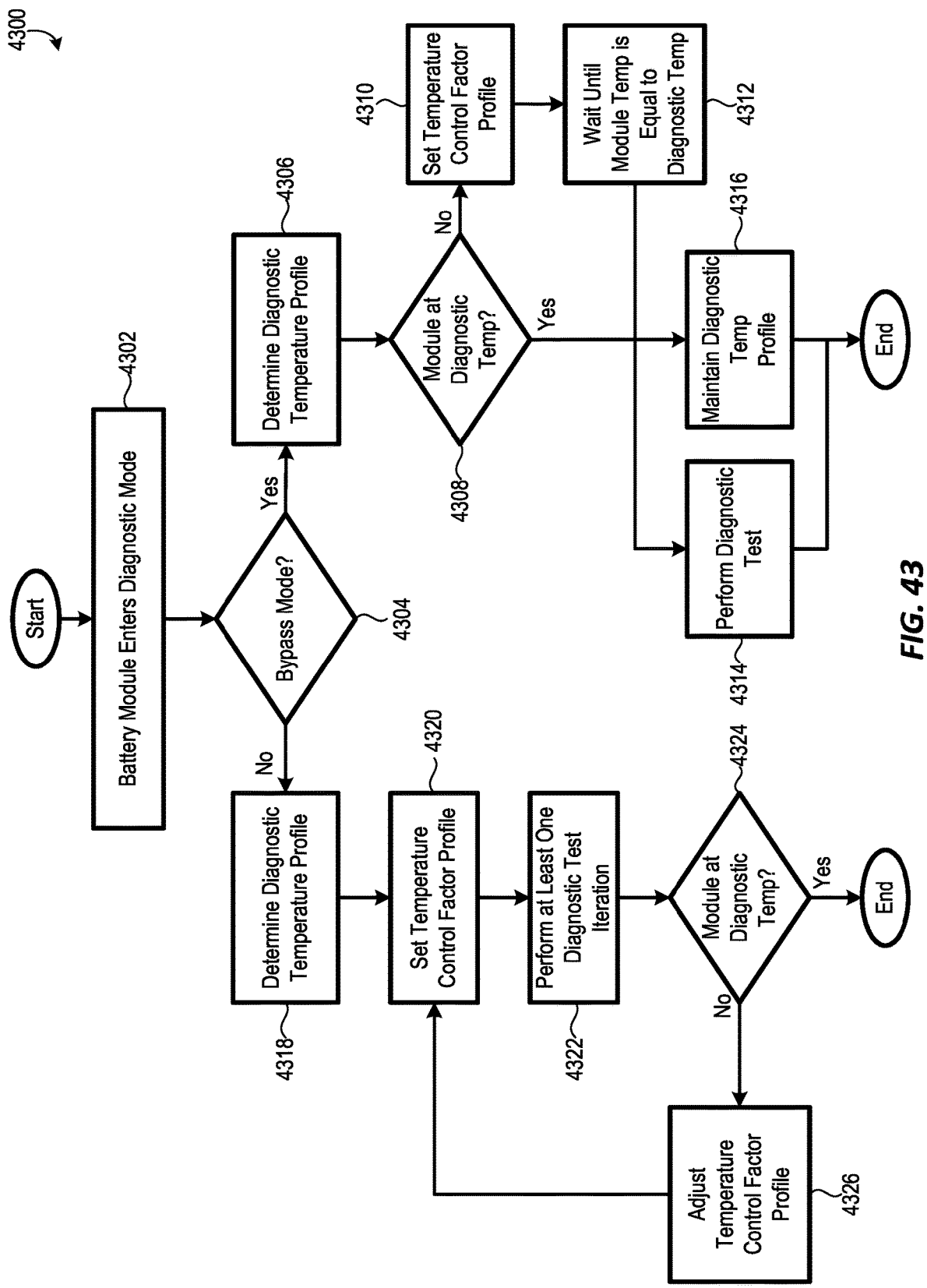
FIG. 43 is an illustration of a flow chart of an additional method for thermal management of an energy storage system performed by a controller of the energy storage system, according to an embodiment.

FIG. 43 is a flow chart of a method 4300 for thermal management performed by a controller of energy storage system 102, which is one example of how a controller of energy storage system 102 may maintain a diagnostic temperature profile of a battery module 116 or 124 while the battery module undergoes an in-situ diagnostic test. Method 4300 begins with a block 4302 where a battery module 116 or 124 enters a diagnostic mode. In one example of block 4302, controller 4200 (FIG. 42) receives a signal from an external source indicating that battery module 116(1) is entering a diagnostic mode. In another example of block 4302, controller 4200 causes battery module 116(1) to enter a diagnostic mode, such as in response to a predetermined amount of time having elapsed since battery module 116(1) last entered a diagnostic mode, or in response to receipt of signal indicating an anomaly with battery module 116(1).

Method 4300 proceeds from block 4302 to a decision block 4304 where the controller determines whether the battery module 116 or 124 entering the diagnostic mode is operating in a bypass operating mode. As discussed above, a battery module 116 or 124 operating in a bypass operating mode is electrically disconnected from other battery modules of energy storage system 102 such that no electric current flows through the battery module. Consequently, the temperature of a battery module operating in a bypass mode cannot be controlled by changing electrical operation of the battery module.

If the result of decision block 4304 is yes, method 4300 proceeds from decision block 4304 to a block 4306 where the controller determines a diagnostic temperature profile for the battery module that is appropriate for a diagnostic test that will be performed on the battery module. The controller may determine the diagnostic temperature profile, for example, by consulting a lookup table or other data structure associating appropriate diagnostic temperature profiles with various diagnostic tests. As another example, the controller may determine the diagnostic temperature profile based on a thermal model of the battery module and/or by using AI or a similar technique. In one example of block 4306, processing subsystem 1902 executes diagnostic temperature profile determination instructions 4232 to determine a diagnostic temperature profile 4228 that is appropriate for the combination of (a) battery module 116(1) and (b) an in-situ diagnostic test to be performed on battery module 116(1).

Method 4300 proceeds from block 4306 to a decision block 4308 where the controller determines whether the battery module 116 or 124 is at a temperature specified in the diagnostic temperature profile determined in block 4306. In one example of decision block 4308, controller 4200 determines whether a current temperature of battery module 116(1) is at least substantially equal to, e.g., within a predetermined tolerance range of, a temperature specified by the diagnostic temperature profile 4228 determined in block 4306. If the result of decision block 4308 is no, method 4300 proceeds from decision block 4308 to a block 4310 where the controller sets a temperature control factor profile of the battery module 116 or 124 that is estimated to achieve the diagnostic temperature profile determined in block 4306. In one example of block 4310, processing subsystem 1902 executes diagnostic temperature control factor profile determination instructions 4234 to determine a DTCFP 4230 for the diagnostic temperature profile determined in block 4306, and controller 4200 controls one or more BMS nodes 118 to implement the determined DTCFP 4230, such as by using one or more of the techniques discussed above with respect to FIGS. 5-11 and 18.

Method 4300 proceeds from block 4310 to a block 4312 where the controller waits until temperature of the battery module 116 or 124 is substantially equal to, e.g., within a predetermined tolerance of, the temperature specified by the diagnostic temperature profile 4228 determined in block 4310. In one example of block 4312, controller 4200 waits until temperature of battery module 116(1) reaches the temperature specified by the diagnostic temperature profile 4228 determined in block 4306.

Method 4300 proceeds from block 4312 to blocks 4314 and 4316. Additionally, if the result of decision block 4308 is yes, method 4300 proceeds from decision block 4308 to blocks 4314 and 4316. Blocks 4314 and 4316 are performed in parallel. A diagnostic test is performed on the battery module 116 or 124 in block 4314, and the controller controls one or more BMS nodes 118 and/or 126 in block 4316 to maintain the diagnostic temperature profile of the battery module for the duration of the diagnostic test performed in block 4314. In some embodiments, a controller of energy storage system 102 performs the diagnostic test of block 4314, and in some other embodiments, one or more elements separate from energy storage system 102 perform the diagnostic test of block 4314. In one embodiment of block 4316, controller 4200 periodically performs a method similar to method 2300 of FIG. 23 that is modified to replace the desired temperature profile with the diagnostic temperature profile 4228 determined in block 4306, to maintain the battery module 116 or 124 at the diagnostic temperature profile determined in block 4306.

Referring again to decision block 4304, if the result of decision block 4304 is no, e.g., the battery module is operating in a power transfer operating mode instead of in a bypass operating mode, method 4300 proceeds from decision block 4304 to a block 4318, where the controller determines a diagnostic temperature profile for the battery module that is appropriate for a diagnostic test that will be performed on the battery module. In some embodiments, the diagnostic temperature profile determined in block 4318 is an average desired operating temperature of the battery module while performing a diagnostic test on the battery module. In one example of bock 4318, processing subsystem 1902 executes diagnostic temperature profile determination instructions 4232 to determine a diagnostic temperature profile 4228 that is appropriate for the combination of (a) battery module 116(1) and (b) an in-situ diagnostic test to be performed on battery module 116(1).

Method 4300 proceeds from block 4318 to a block 4320 where the controller sets a temperature control factor profile of the battery module 116 or 124 that is estimated to achieve the diagnostic temperature profile determined in block 4318. In one example of block 4320, processing subsystem 1902 executes diagnostic temperature control factor profile determination instructions 4234 to determine a DTCFP 4230 for the diagnostic temperature profile determined in block 4318, and controller 4200 controls one or more BMS nodes 118 to implement the determined DTCFP 4230, such as by using one or more of the techniques discussed above with respect to FIGS. 5-18.

Method 4300 proceeds from block 4320 to a block 4322 where at least one diagnostic test iteration is performed on the battery module 116 or 124. In some embodiments, a controller of energy storage system 102 performs the diagnostic test of block 4322, and in some other embodiments, one or more elements separate from energy storage system 102 perform the diagnostic test of block 4322.

Method 4300 proceeds from a block 4322 to a decision block 4324 where the controller determines whether the battery module 116 or 124 is at a temperature specified in the diagnostic temperature profile determined in block 4318. In one example of decision block 4324, controller 4200 determines whether a current temperature of battery module 116(1) is at least substantially equal to, e.g., within a predetermined tolerance range of, a temperature specified by the diagnostic temperature profile 4228 determined in block 4318. If the result of decision block is yes, method 4300 ends, and if the result of decision block 4324 is no, method 4300 proceeds from decision block 4324 to a block 4326.

In block 4326, the controller adjusts a temperature control factor profile of the battery module 116 or 124 to reduce the difference between the actual temperature of the battery module and the desired temperature of the battery module. In one example of block 4326, processing subsystem 1902 again executes diagnostic temperature control factor profile determination instructions 4234 to determine a new DTCFP 4230. Method 4300 subsequently proceeds from block 4326 to block 4320 where the temperature control factor profile is set according to new value determined in block 4326.

Desired Temperature Range for Battery Module Charging

A temperature of a battery module may need to be maintained within a predetermined range to prevent damage to the battery module. For example, a battery module may need to be sufficiently warm while charging the battery module to prevent damage to the battery module. Accordingly, particular embodiments of energy storage system 102 are configured to heat one or more battery modules, such as to help ensure that the one or more battery modules are within a predetermined temperature range while charging the battery modules, by transferring energy between stacks of energy storage system 102.

Figure 44:
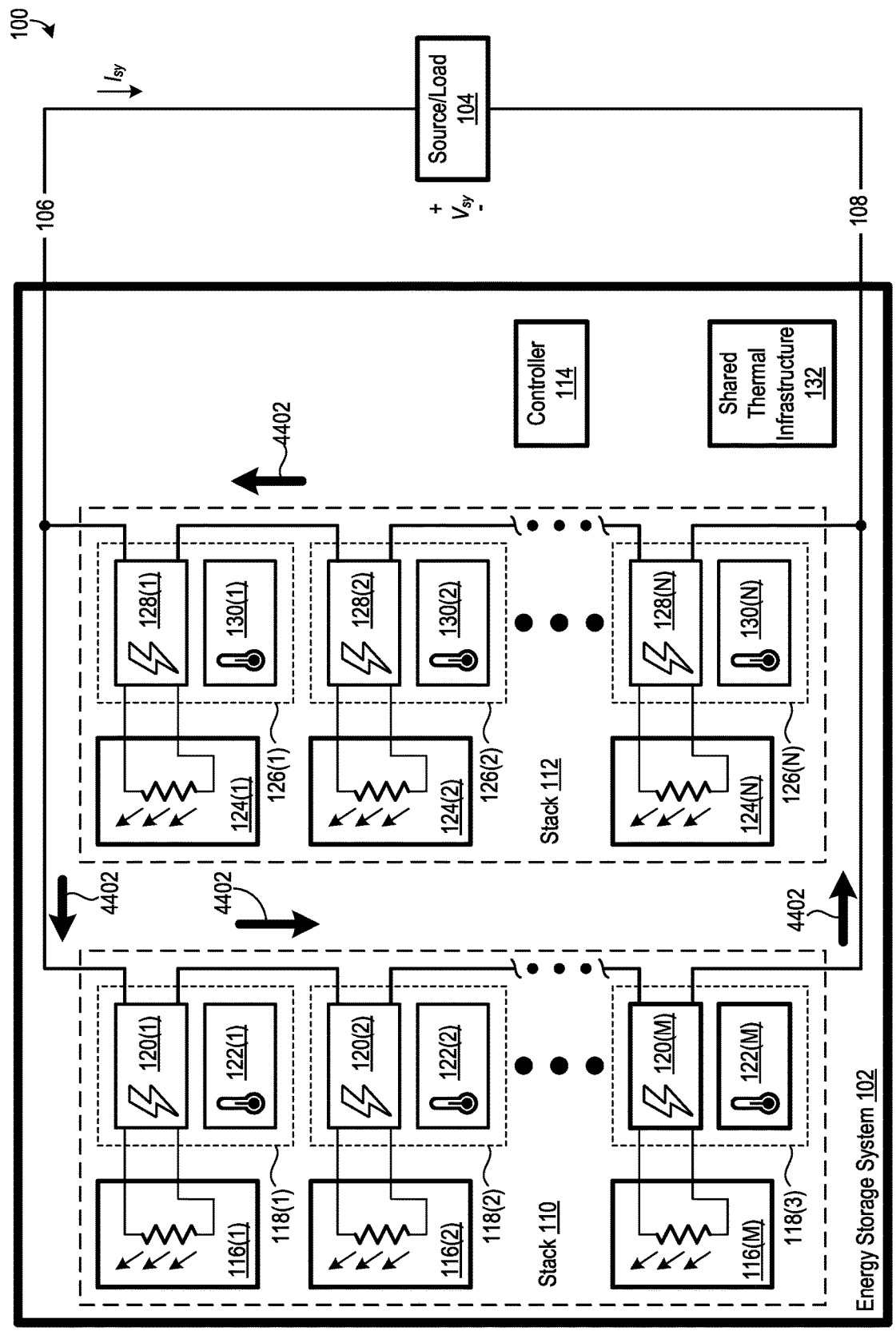
FIG. 44 is a schematic diagram of the FIG. 1 electrical environment illustrating an example of how some embodiments may warm stacks of battery modules by exchanging energy between the stacks.

For example, FIG. 44 is a schematic diagram of electrical environment 100 illustrating an embodiment of energy storage system 102 where controller 114 controls electrical control subsystems 120 and 128 to warm first stack 110 and second stack 112 by transmitting an electric current 4402 between the two stacks, thereby transmitting energy between the two stacks, such that the stacks are warmed by resistive power dissipation in stacks resulting from electric current 4402 flowing through the stacks. In certain embodiments, magnitude of current $I_{xy}$ is zero and current 4402 accordingly is solely supported by energy of battery modules 116 and 124 of energy storage system 102. Resistive power dissipation in battery modules 116 and 124 is symbolically shown in FIG. 44 by a resistor (not labeled) in each battery module 116 and 124 representing equivalent series resistance of the battery module. Electric current flowing through the equivalent series resistance of each battery module 116 and 124 generates heat in the battery module, as symbolically shown in FIG. 44 by arrows originating from each resistor. It should be noted that magnitude of electric current flowing through a given battery module 116 and 124 will not necessarily be equal to magnitude of electric current 4402 flowing through first stack 110 and second stack 112 in embodiments where first electrical control subsystems 120 and second electrical control subsystems 128 include respective power converters capable converting electric current magnitude.

It should additionally be noted that flow of electric current 4402 as illustrated in FIG. 44 will transfer energy from battery modules 124 to battery modules 116. Accordingly, certain embodiments of controller 114 are configured to control operation of electrical control subsystems 120 and 128 to change direction of electric current 4402 flow from time to time, such as periodically, to reduce, or even eliminate, net transfer of energy between first stack 110 and second stack 112.

Figure 45:
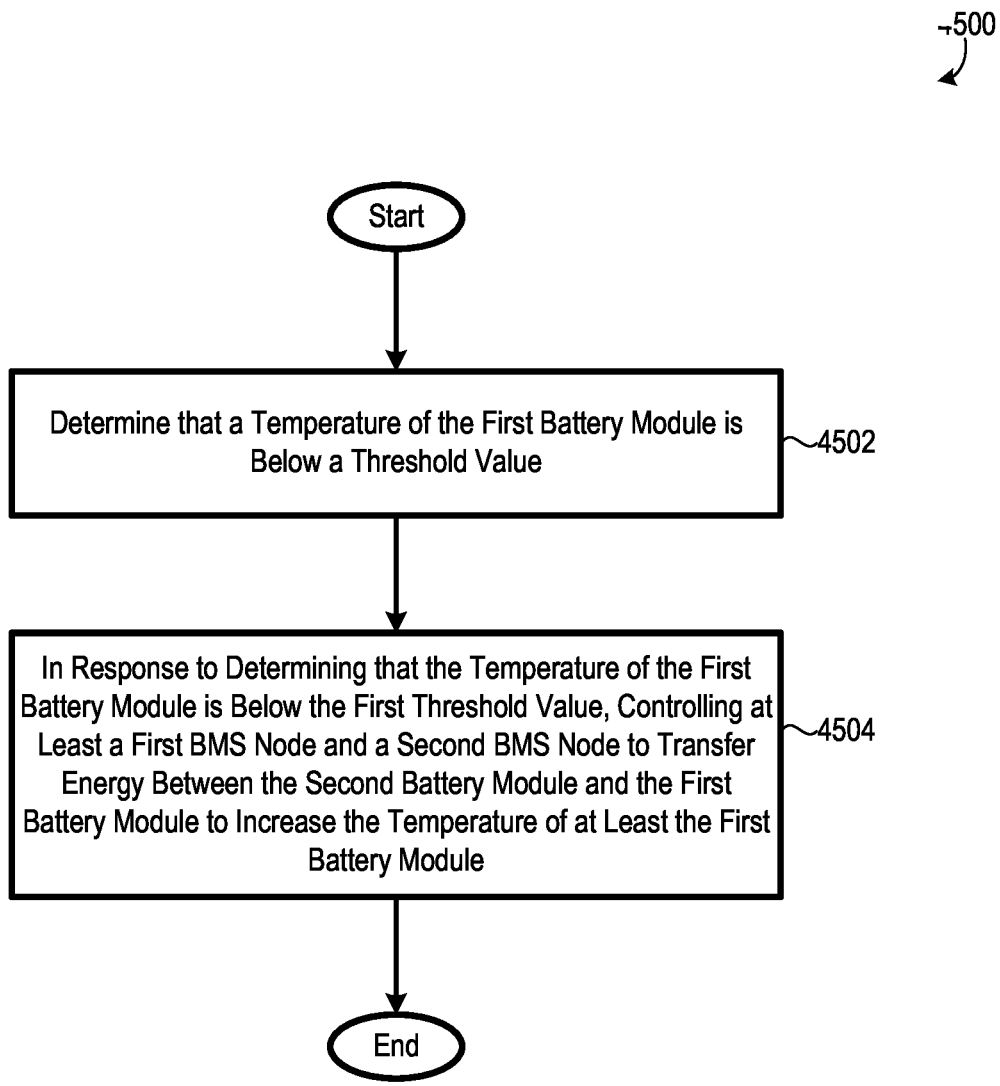
FIG. 45 is an illustration of a flow chart of a further method for thermal management of an energy storage system performed by a controller of the energy storage system, according to an embodiment.

FIG. 45 illustrates a flowchart of a method 4500 for thermal management performed by a controller of an energy storage system, where method 4500 is one example of how a controller of energy storage system 102 may control energy storage system 102 to warm battery modules 116 and 124, such as in preparation for charging the battery modules. Method 4500 assumes that energy storage system 102 includes at least a first battery module and a second battery module that are electrically coupled in parallel with each other. Battery modules 116 are electrically coupled in parallel with battery modules 124 via electrical control subsystems 120 and 128, in energy storage system 102. Accordingly, each battery module 116 may be considered a first battery module of method 4500, and each battery module 124 may be considered a second battery module of method 4500.

In a block 4502 of method 4500, the controller determines that a temperature of the first battery module is below a threshold value. The threshold value includes, for example, a desired temperature range of the first battery module while charging the first battery module or a minimum desired temperature of the first battery module while charging the first battery module. In one example of block 4502, controller 114 determines that a temperature of battery module 116(1) is below a minimum desired temperature range for charging battery module 116(1).

Method 4500 proceeds from a block 4502 to a block 4504 where the controller, in response to determining that the temperature of the first battery module is below the threshold value, controls at least a first BMS node and a second BMS node to transfer energy between a second battery module and the first battery module to increase the temperature of at least the first battery module. In some example of block 4504, controller 114 controls electrical control subsystems 120 and 128 to cause electric current 4402 to flow between first stack 110 and second stack 112, as illustrated in FIG. 44, to transfer energy, in part, between battery module 116(1) and battery module 124(1), thereby increasing temperature of battery modules 116 and 124.

As discussed above, the stacks of energy storage system 102 could be modified to include a plurality of strings of batteries modules, each with a respective BMS node, where each string of the plurality of strings is electrically coupled in parallel between first load power bus 106 and second load power bus 108. In certain of these alternate embodiments, controller 114 is configured to control BMS nodes to transfer energy between two or more strings of a given stack to heat battery modules of the stack by resistive power dissipation in the stack.

Figure 46:
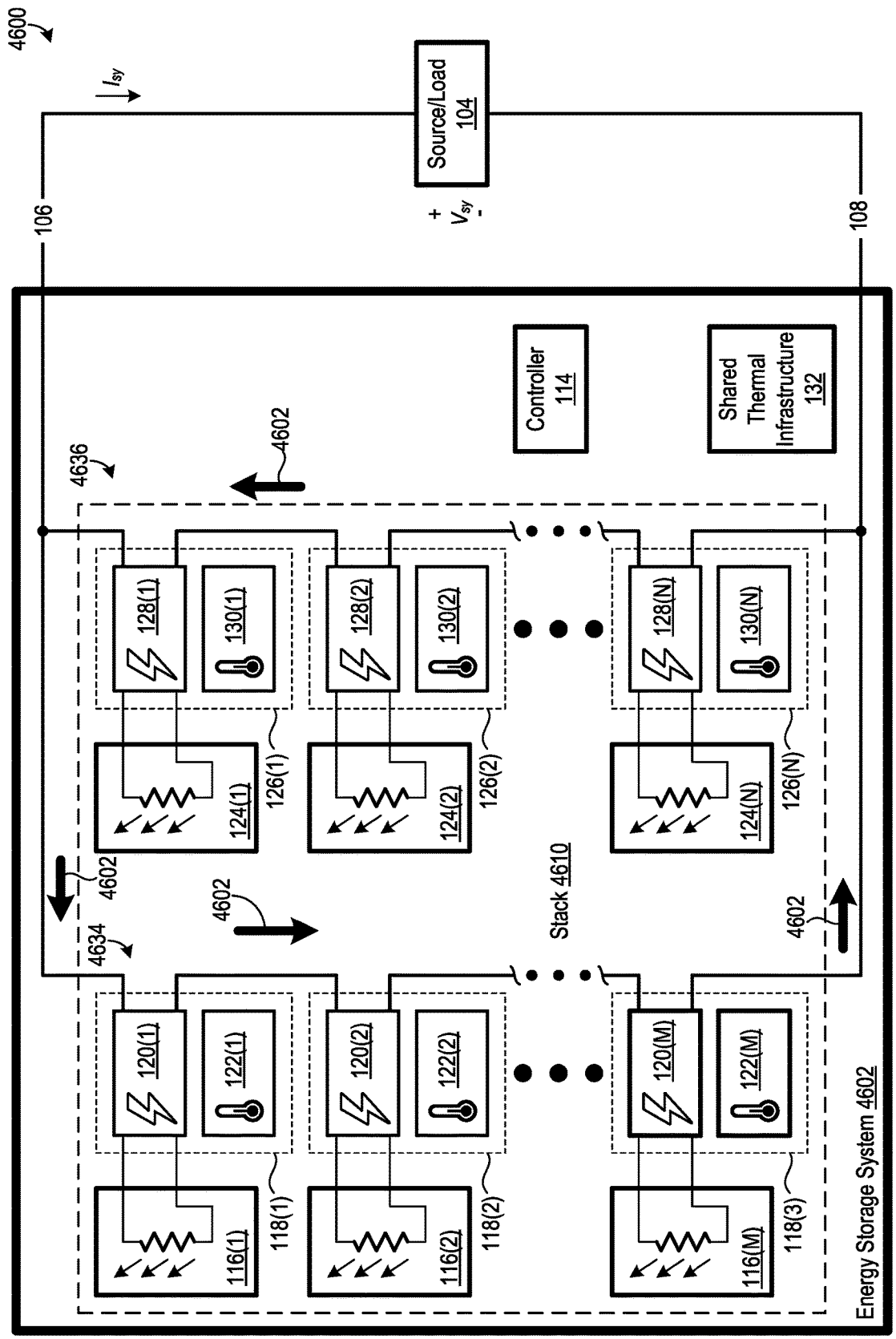
FIG. 46 is a schematic diagram of an alternate embodiment of the FIG. 1 electrical environment where a single stack includes two strings of battery modules.

For example, FIG. 46 is a schematic diagram of an electrical environment 4600 including an energy storage system 4602 in place of energy storage system 102. Energy storage system 4602 differs from energy storage system 102 in that it includes a single stack 4610 in place of first stack 110 and second stack 112. Stack 4610 includes a first string 4634 and a second string 4636 of battery modules. First string 4634 include M battery modules 116 and respective BMS nodes 118, where battery modules 116 are electrically coupled in series via first electrical control subsystems 120 between first load power bus 106 and second load power bus 108. Second string 4636 include N battery modules 124 and respective BMS nodes 126, where battery modules 124 are electrically coupled in series via first electrical control subsystems 128 between first load power bus 106 and second load power bus 108. Controller 114 is configured to warm battery modules 116 and 124 of common stack 4610 in energy storage system 4602 by controlling first electrical control subsystems 120 and second electrical control subsystems 128 to cause an electric current 4602, which is analogous to electric current 4402 of FIG. 44, to flow between first string 4634 and second string 4636. Flow of electric current 4602 warms battery modules 116 and 124 in a manner analogous to how flow of electric current 4402 warms battery modules 116 and 124 in FIG. 44.

Figure 47:
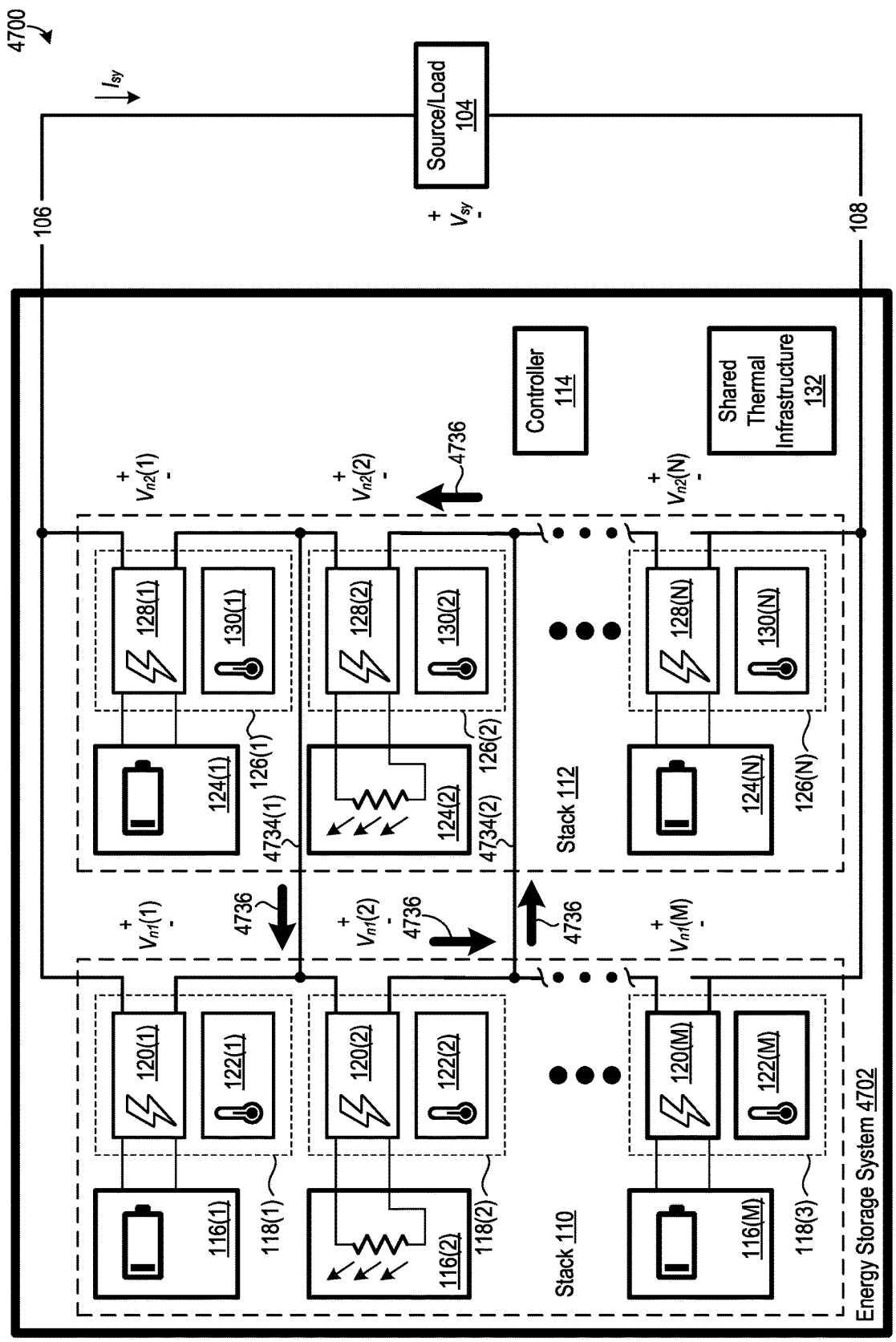
FIG. 47 is a schematic diagram of an alternate embodiment of the FIG. 1 electrical environment further including electrical connections between stacks.

Additionally, as discussed above, certain alternate embodiments of energy storage system 102 further include electrical connections between first stack 110 and second stack 112 to enable transfer of electrical energy between individual battery modules 116 of first stack 110 and individual battery modules 124 of second stack 112. For example, FIG. 47 is a schematic diagram of an electrical environment 4700 including an energy storage system 4702 in place of energy storage system 102. Energy storage system 4702 differs from energy storage system 102 in that energy storage system 4702 further includes electrical connections 4734 between first stack 110 and second stack 112 such that electrical energy can be individually transferred between a battery module 116 of first stack 110 and a battery module 124 of second stack 112. In particular embodiments, controller 114 is configured to control a BMS node 118 of first stack 110 and a BMS node 126 of second stack 112 to transfer energy between respective battery modules 116 and 124 of the BMS nodes, such as for warming the battery modules. For example, FIG. 47 depicts an example operating scenario where controller 114 is controlling each of electrical control subsystem 120(2) and electrical control subsystem 128(2) to cause an electric current 4736 to flow between battery module 116(2) and battery module 124(2), thereby warming battery modules 116(2) and 124(2) without affecting operation of other battery modules 116 and 124. Flow of electric current 4736 warms battery modules 116(2) and 124(2) in a manner analogous to how flow of electric current 4402 warms battery modules 116 and 124 in FIG. 44.

Combinations of Features

Features described above may be combined in various ways without departing from the scope hereof. The following examples illustrate some possible combinations.

(A1) A method for thermal management performed by a controller of an energy storage system, where (i) the energy storage system includes at least a first battery module, a second battery module, a first battery management system (BMS) node, and a second BMS node, (ii) the first BMS node is configured to control operation of the first battery module, and (iii) the second BMS node is configured to control operation of the second battery module. The method includes (a) determining a first temperature profile difference representing a difference between an actual temperature profile of the first battery module and a desired temperature profile of the first battery module, (b) determining a first operation adjustment representing a desired change in operation of the first battery module for decreasing the first temperature profile difference, and (c) controlling the first BMS node to change operation of the first battery module according to the first operation adjustment.

(A2) The method denoted as (A1) may further include (i) determining a second temperature profile difference representing a difference between an actual temperature profile of the second battery module and a desired temperature profile of the second battery module, (ii) determining a second operation adjustment representing a desired change in operation of the second battery module for decreasing the second temperature profile difference, and (iii) controlling the second BMS node to change operation of the second battery module according to the second operation adjustment.

(A3) In the method denoted as (A2), the desired temperature profile of the second battery module may be different from the desired temperature profile of the first battery module.

(A4) In the method denoted as (A2), the desired temperature profile of the second battery module may be the same as the desired temperature profile of the first battery module.

(A5) In any one of the methods denoted as (A1) through (A4), the desired temperature profile of the first battery module may be a function of state of charge of the first battery module.

(A6) In any one of the methods denoted as (A1) through (A5), the desired temperature profile of the first battery module may be a function of a state of degradation of the first battery module.

(A7) In any one of the methods denoted as (A1) through (A6), the desired temperature profile of the first battery module may be a function of a state of health of the first battery module.

(A8) In any one of the methods denoted as (A1) through (A7), the desired temperature profile of the first battery module may be a function of a state of safety of the first battery module.

(A9) In any one of the methods denoted as (A1) through (A8), the desired temperature profile of the first battery module may represent a desired temperature range of the first battery module while charging the first battery module.

(A10) In any one of the methods denoted as (A1) through (A8), the desired temperature profile of the first battery module may be a soaking temperature profile of the first battery module.

(A11) In any one of the methods denoted as (A1) through (A8), the desired temperature profile of the first battery module may be a diagnostic temperature profile the first battery module.

(A12) In any one of the methods denoted as (A1) through (A11), the desired temperature profile of the first battery module may be static.

(A13) In any one of the methods denoted as (A1) through (A11), the desired temperature profile of the first battery module may be dynamic.

(A14) In any one of the methods denoted as (A1) through (A13), controlling the first BMS node to change operation of the first battery module according to the first operation adjustment may include controlling the first BMS node to change magnitude of current flowing through the first battery module.

(A15) In any one of the methods denoted as (A1) through (A14), controlling the first BMS node to change operation of the first battery module according to the first operation adjustment may include controlling the first BMS node to change a waveform of current flowing through the first battery module.

(A16) In any one of the methods denoted as (A1) through (A15), controlling the first BMS node to change operation of the first battery module according to the first operation adjustment may include controlling a heating device of the first BMS node.

(A17) In any one of the methods denoted as (A1) through (A16), controlling the first BMS node to change operation of the first battery module according to the first operation adjustment may include controlling the first BMS node to change an operating efficiency of a power converter of the first BMS node to change an amount of heat generated by the power converter.

(A18) In any one of the methods denoted as (A1) through (A17), controlling the first BMS node to change operation of the first battery module according to the first operation adjustment may include controlling the first BMS node to control operation of a fan affecting airflow at the first battery module.

(A19) In the method denoted as (A18), the fan may be in series with each of the first battery module and the first BMS node.

(A20) In any one of the methods denoted as (A1) through (A19), controlling the first BMS node to change operation of the first battery module according to the first operation adjustment may include controlling the first BMS node to change a path of a heat transfer fluid that is thermally coupled with the first battery module.

(A21) In the method denoted as (A20), changing the path of the heat transfer fluid that is in thermal communication with the first battery module may include causing the heat transfer fluid to exchange heat with an electrical control subsystem of the first BMS node before the heat transfer fluid exchanges heat with the first battery module.

(A22) In any one of the methods denoted as (A1) through (A21), controlling the first BMS node to change operation of the first battery module according to the first operation adjustment may include controlling the first BMS node to change a flow rate of a heat transfer fluid that is thermally coupled with the first battery module.

(A23) In any one of the methods denoted as (A1) through (A22), controlling the first BMS node to change operation of the first battery module according to the first operation adjustment may include controlling the first BMS node to change a temperature of a heat transfer fluid that is thermally coupled with the first battery module.

(A24) Any one of the methods denoted as (A1) through (A23) may further include performing an in-situ diagnostic test on the first battery module.

(A25) In any one of the methods denoted as (A1) through (A24), (i) the actual temperature profile of the first battery module may represent actual temperature of the first battery module over a duration of time, and (ii) the desired temperature profile of the first battery module may represent desired temperature of the first battery module over the duration of time.

(A26) In the method denoted as (A25), the difference between the actual temperature profile of the first battery module and the desired temperature profile of the first battery module may represent a difference between actual temperature of the first battery module and desired temperature of the first battery module over the duration of time.

(B1) A method for thermal management performed by a controller of an energy storage system, where (i) the energy storage system includes at least a first battery module, a second battery module, a first battery management system (BMS) node, and a second BMS node, (ii) the first BMS node is configured to control operation of the first battery module, (iii) the second BMS node is configured to control operation of the second battery module, and (iv) the first battery module is thermally coupled with the second battery module. The method includes (a) determining a first temperature profile difference representing a difference between an actual temperature profile of the first battery module and a desired temperature profile of the first battery module, (b) determining an operation adjustment representing a desired change in operation of the second battery module for decreasing the first temperature profile difference, and (c) controlling the second BMS node to change operation of the second battery module according to the operation adjustment.

(B2) In the method denoted as (B1), controlling the second BMS node to change operation of the second battery module according to the operation adjustment may include controlling the second BMS node to change magnitude of current flowing through the second battery module.

(B3) In either one of the methods denoted as (B1) or (B2), controlling the second BMS node to change operation of the second battery module according to the operation adjustment may include controlling the second BMS node to change a waveform of current flowing through the second battery module.

(B4) In any one of the methods denoted as (B1) through (B3), the first battery module may be bypassed such that current does not flow through the first battery module.

(B5) Any one of the methods denoted as (B1) through (B4) may further include performing an in-situ diagnostic test on the first battery module.

(B6) In any one of the methods denoted as (B1) through (B5), the first battery module may be thermally coupled with the second battery module at least partially by transfer of heat between the first battery module and the second battery module via one or more of thermal radiation, thermal convection, and thermal conduction.

(B7) In any one of the methods denoted as (B1) through (B6), the first battery module may be thermally coupled with the second battery module at least partially by transfer of heat via a heat transfer fluid flowing between the first battery module and the second battery module.

(C1) A method for thermal management performed by a controller of an energy storage system, where (i) the energy storage system includes at least a first battery module, a second battery module, a first battery management system (BMS) node, and a second BMS node, (ii) the first BMS node is configured to control operation of the first battery module, (iii) the second BMS node is configured to control operation of the second battery module, and (iv) the first battery module is electrically coupled in parallel with the second battery module. The method includes (a) determining that a temperature of the first battery module is below a threshold value and (b) in response to determining that the temperature of the first battery module is below the threshold value, controlling at least the first BMS node and the second BMS node to transfer energy between the second battery module and the first battery module to increase temperature of at least the first battery module.

(C2) In the method denoted as (C1), the threshold value may include a desired temperature range of the first battery module while charging the first battery module.

(C3) In the method denoted as (C1), the threshold value may be a minimum desired temperature of the first battery module while charging the first battery module.

(C4) In any one of the methods denoted as (C1) through (C3), (i) the first battery module may be part of a first stack of a plurality of battery modules electrically coupled together, and (ii) the second battery module may be part of a second stack of a plurality of battery modules electrically coupled together.

(C5) In any one of the methods denoted as (C1) through (C3), the first and second battery modules may be part of a common stack of a plurality of battery modules electrically coupled together.

(D1) A method for thermal management performed by a controller of an energy storage system, where the energy storage system includes at least a first battery module and a second battery module. The method includes (i) determining that the first battery module is operating in a bypass operating mode, (ii) in response to determining that the first battery module is operating in the bypass operating mode, controlling temperature of an environment of the first battery module at least partially based on a desired temperature profile of the first battery module, and (iii) performing at least one of (a) an in-situ diagnostic test on the first battery module and (b) thermal soaking of the first battery module.

(D2) In the method denoted as (D1), (i) the first battery module may be thermally coupled with the second battery module, and (ii) controlling temperature of the environment of the first battery module at least partially based on the desired temperature profile of the first battery module may include controlling a battery management system (BMS) node associated with the second battery module.

(D3) In either one of the methods denoted as (D1) or (D2), controlling temperature of the environment of the first battery module at least partially based on the desired temperature profile of the first battery module may include controlling a path of a thermal control fluid that is in thermal communication with the first battery module.

(D4) In any one of the methods denoted as (D1) through (D3), controlling temperature of the environment of the first battery module at least partially based on the desired temperature profile of the first battery module may include controlling flow rate of a thermal control fluid that is thermally coupled with the first battery module.

(D5) In any one of the methods denoted as (D1) through (D4), controlling temperature of the environment of the first battery module at least partially based on the desired temperature profile of the first battery module may include controlling temperature of a thermal control fluid that is thermally coupled with the first battery module.

(D6) In any one of the methods denoted as (D1) through (D5), controlling temperature of the environment of the first battery module at least partially based on the desired temperature profile of the first battery module may include controlling a heating device that is thermally coupled with the first battery module.

(D7) Any one of the methods denoted as (D1) through (D6) may further include controlling a battery management system (BMS) node associated with the second battery module at least partially based on a desired temperature profile of the second battery module, where the desired temperature profile of the second battery module is different from the desired temperature profile of the first battery module.

(E1) A method for thermal management performed by a controller of an energy storage system, where (i) the energy storage system includes a plurality of battery modules and a respective battery management system (BMS) node for each battery module, and (ii) each BMS node is configured to control operation of its respective battery module. The method includes (a) determining, for each battery module, whether the battery module is operating in a power transfer operating mode or in a bypass operating mode, and (b) determining, for each battery module, a respective temperature control method for the battery module at least partially based on whether the battery module is operating in the power transfer operating mode or in the bypass operating mode.

(F1) A method for thermal management performed by a controller of an energy storage system, where (i) the energy storage system includes a plurality of battery modules and a respective battery management system (BMS) node for each battery module, and (ii) each BMS node is configured to control operation of its respective battery module. The method includes (a) determining, for each battery module, a respective magnitude of current flowing through the battery module, and (ii) determining, for each battery module, a respective temperature control method for the battery module at least partially based on the respective magnitude of current flowing through the battery module.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for thermal management performed by a controller of an energy storage system, the energy storage system including at least a first battery module, a second battery module, a first battery management system (BMS) node, and a second BMS node, the first BMS node being configured to control operation of the first battery module, and the second BMS node being configured to control operation of the second battery module, the method comprising:
setting a desired temperature profile of the first battery module according to one or more of a degradation vector of the first battery module, a state of health vector of the first battery module, and a state of safety vector of the first battery module, the desired temperature profile of the first battery module representing desired temperature of the first battery module over a duration of time;
determining a first temperature profile difference representing a difference between an actual temperature profile of the first battery module and the desired temperature profile of the first battery module;
determining a first operation adjustment representing a desired change in operation of the first battery module for decreasing the first temperature profile difference; and
controlling the first BMS node to change operation of the first battery module according to the first operation adjustment.

2. The method of claim 1, further comprising:
determining a second temperature profile difference representing a difference between an actual temperature profile of the second battery module and a desired temperature profile of the second battery module;
determining a second operation adjustment representing a desired change in operation of the second battery module for decreasing the second temperature profile difference; and
controlling the second BMS node to change operation of the second battery module according to the second operation adjustment.

3. The method of claim 2, wherein the desired temperature profile of the second battery module is either (i) different from the desired temperature profile of the first battery module or (ii) the same as the desired temperature profile of the first battery module.

4. The method of claim 1, wherein the desired temperature profile of the first battery module is further a function of state of charge of the first battery module.

5. The method of claim 1, wherein the desired temperature profile of the first battery module represents a desired temperature range of the first battery module while charging the first battery module.

6. The method of claim 1, wherein the desired temperature profile of the first battery module is one of (i) a soaking temperature profile of the first battery module and (ii) a diagnostic temperature profile the first battery module.

7. The method of claim 1, wherein the desired temperature profile of the first battery module is either static or dynamic.

8. The method of claim 1, wherein controlling the first BMS node to change operation of the first battery module according to the first operation adjustment comprises controlling the first BMS node to change one or more of (i) magnitude of current flowing through the first battery module and (ii) a waveform of current flowing through the first battery module.

9. The method of claim 1, wherein controlling the first BMS node to change operation of the first battery module according to the first operation adjustment comprises controlling a heating device of the first BMS node.

10. The method of claim 1, wherein controlling the first BMS node to change operation of the first battery module according to the first operation adjustment comprises controlling the first BMS node to change an operating efficiency of a power converter of the first BMS node to change an amount of heat generated by the power converter.

11. The method of claim 1, wherein controlling the first BMS node to change operation of the first battery module according to the first operation adjustment comprises controlling the first BMS node to control operation of a fan affecting airflow at the first battery module.

12. The method of claim 1, wherein controlling the first BMS node to change operation of the first battery module according to the first operation adjustment comprises controlling the first BMS node to change a path of a heat transfer fluid that is thermally coupled with the first battery module.

13. The method of claim 12, wherein changing the path of the heat transfer fluid that is in thermal communication with the first battery module comprising causing the heat transfer fluid to exchange heat with an electrical control subsystem of the first BMS node before the heat transfer fluid exchanges heat with the first battery module.

14. The method of claim 1, wherein controlling the first BMS node to change operation of the first battery module according to the first operation adjustment comprises controlling the first BMS node to change one or more of (i) a flow rate of a heat transfer fluid that is thermally coupled with the first battery module and (ii) a temperature of the heat transfer fluid that is thermally coupled with the first battery module.

15. The method of claim 1, further comprising performing an in-situ diagnostic test on the first battery module.

16. The method of claim 1, wherein the actual temperature profile of the first battery module represents actual temperature of the first battery module over the duration of time.

17. The method of claim 1, further comprising:
determining whether the first battery module is operating in a power transfer operating mode or in a bypass operating mode; and
determining a temperature control method for the first battery module at least partially based on whether the first battery module is operating in the power transfer operating mode or in the bypass operating mode.

18. A method for thermal management performed by a controller of an energy storage system, the energy storage system including at least a first battery module, one or more second battery modules, a first battery management system (BMS) node, and one or more second BMS nodes, the first BMS node being configured to control operation of the first battery module, each second BMS node being configured to control operation of a respective one of the one or more second battery modules, the first battery module being thermally coupled with the one or more second battery modules, the method comprising:
determining a temperature profile difference of the first battery module, the temperature profile difference of the first battery module representing a difference between an actual temperature profile of the first battery module and a desired temperature profile of the first battery module;
determining an operation adjustment representing a desired change in operation of the one or more second battery modules to change an amount of heat generated by the one or more second battery modules that flows to the first battery module, for decreasing the temperature profile difference of the first battery module; and
controlling the one or more second BMS nodes to change operation of the one or more second battery modules according to the operation adjustment.

19. The method of claim 18, wherein controlling the one or more second BMS nodes to change operation of the one or more second battery modules according to the operation adjustment comprises controlling the one or more second BMS nodes to change one or more of (i) magnitude of current flowing through the one or more second battery modules and (ii) a waveform of the current flowing through the one or more second battery modules.

20. The method of claim 18, further comprising performing an in-situ diagnostic test on the first battery module.

21. The method of claim 18, wherein the first battery module is thermally coupled with the one or more second battery modules at least partially by transfer of heat between the first battery module and the one or more second battery modules via one or more of thermal radiation, thermal convection, and thermal conduction.

22. The method of claim 18, wherein the first battery module is thermally coupled with the one or more second battery modules at least partially by transfer of heat via a heat transfer fluid flowing between the first battery module and the one or more second battery modules.

23. A method for thermal management performed by a controller of an energy storage system, the energy storage system including at least a first battery module, a second battery module, a first battery management system (BMS) node, and a second BMS node, the first BMS node being configured to control operation of the first battery module, the second BMS node being configured to control operation of the second battery module, the first battery module being electrically coupled in parallel with the second battery module, the method comprising:
determining that a temperature of the first battery module is below a threshold value; and
in response to determining that the temperature of the first battery module is below the threshold value, controlling at least the first BMS node and the second BMS node to transfer energy between the second battery module and the first battery module to increase temperature of at least the first battery module from at least resistive heating of the first battery module resulting from an electric current associated with the transfer energy between the second battery module and the first battery module.

24. The method of claim 23, wherein the threshold value comprises one of (i) a desired temperature range of the first battery module while charging the first battery module and (ii) a minimum desired temperature of the first battery module while charging the first battery module.

25. The method of claim 23, wherein the first battery module and the second battery module are configured such that:

(i) the first battery module is part of a first stack of a plurality of battery modules electrically coupled together, and the second battery module is part of a second stack of a plurality of battery modules electrically coupled together; or
(ii) the first and second battery modules are part of a common stack of a plurality of battery modules electrically coupled together.

26. A method for thermal management performed by a controller of an energy storage system, the energy storage system including a least a first battery module and a second battery module, the method comprising:
determining that the first battery module is operating in a bypass operating mode; and
in response to determining that the first battery module is operating in the bypass operating mode;
determining a desired temperature profile of the first battery module that represents a desired temperature of the first battery module over a duration of time, the desired temperature profile including at least one of:
(i) a diagnostic temperature profile that is appropriate for the first battery module while performing an in-situ test on the first battery module, and
(ii) a soaking temperature profile for maintaining a temperature of the first battery module while the first battery module is at rest, for at least one of (a) preparing the first battery module for an in-situ test and (b) achieving a desired electrochemical response of the first battery module, and
controlling temperature of an environment of the first battery module at least partially based on the desired temperature profile of the first battery module.

27. The method of claim 26, wherein:
the first battery module is thermally coupled with the second battery module; and
controlling temperature of the environment of the first battery module at least partially based on the desired temperature profile of the first battery module comprises controlling a battery management system (BMS) node associated with the second battery module.

28. The method of claim 26, wherein controlling temperature of the environment of the first battery module at least partially based on the desired temperature profile of the first battery module comprises controlling a path of a thermal control fluid that is in thermal communication with the first battery module.

29. The method of claim 26, wherein controlling temperature of the environment of the first battery module at least partially based on the desired temperature profile of the first battery module comprises one or more of (i) controlling flow rate of a thermal control fluid that is thermally coupled with the first battery module and (ii) controlling temperature of the thermal control fluid that is thermally coupled with the first battery module.

30. The method of claim 26, wherein controlling temperature of the environment of the first battery module at least partially based on the desired temperature profile of the first battery module comprises controlling a heating device that is thermally coupled with the first battery module.

* * * * *